US012381982B2

(12) United States Patent
Singla et al.

(10) Patent No.: US 12,381,982 B2
(45) Date of Patent: Aug. 5, 2025

(54) SYSTEMS AND METHODS FOR IMPROVED AGENT-CUSTOMER COMMUNICATION AND INSURANCE ENROLLMENT

(71) Applicant: Integrity, LLC, Dallas, TX (US)

(72) Inventors: Harsh Singla, Dallas, TX (US); Jake Christensen, Dallas, TX (US); Eric Wade, Dallas, TX (US)

(73) Assignee: Integrity, LLC, Dallas, TX (US)

( * ) Notice: Subject to any disclaimer, the term of this patent is extended or adjusted under 35 U.S.C. 154(b) by 169 days.

(21) Appl. No.: 18/450,025

(22) Filed: Aug. 15, 2023

(65) Prior Publication Data

US 2024/0080390 A1 Mar. 7, 2024

Related U.S. Application Data

(60) Provisional application No. 63/403,567, filed on Sep. 2, 2022.

(51) Int. Cl.
*H04M 3/51* (2006.01)
*G06F 3/0482* (2013.01)
*G06Q 40/08* (2012.01)
*H04M 3/42* (2006.01)

(52) U.S. Cl.
CPC ........ *H04M 3/5191* (2013.01); *G06F 3/0482* (2013.01); *G06Q 40/08* (2013.01); *H04M 3/42221* (2013.01); *H04M 3/42365* (2013.01); *H04M 3/5175* (2013.01)

(58) Field of Classification Search
CPC ........... H04M 3/5191; H04M 3/42365; H04M 3/5175; G06F 3/0482; G06Q 40/08

USPC ........... 379/265.04, 265.03, 265.01, 265.05, 379/265.09, 265.11, 265.07

See application file for complete search history.

(56) References Cited

U.S. PATENT DOCUMENTS

| | | |
|---|---|---|
| 2009/0089086 A1 | 4/2009 | Schoenberg |
| 2010/0223078 A1 | 9/2010 | Willis et al. |
| 2019/0385126 A1* | 12/2019 | Morrow ............. G06Q 10/1057 |

OTHER PUBLICATIONS

International Search Report and Written Opinion in International Appln. No. PCT/US2023/030240, mailed on Dec. 5, 2023, 18 pages.

(Continued)

*Primary Examiner* — Thjuan K Addy
(74) *Attorney, Agent, or Firm* — Fish & Richardson P.C.

(57) ABSTRACT

The document generally describes improved platform interfaces and solutions for agents, including agents having mobile computing devices that interact with platform via a network. Embodiments are configured to provide a number of improved platform interfaces and solutions for agents, including one or more improvements to: selectively receive leads when they are online (e.g., designated as on duty or otherwise working and available to receive leads), communicating with potential and existing customers about insurance plans when the agents are online, facilitating a customer's ability to review and sign insurance plans from their computing device when their agent is offline, automatically recording inbound and outbound calls according to regulatory requirements, providing call scripts to be recited during those calls in compliance with the regulations, and uniquely tag customers to assist the agents in organizing their customer contact records and tasks associated with their customers.

20 Claims, 28 Drawing Sheets

(56) References Cited

OTHER PUBLICATIONS

International Preliminary Report on Patentability on International Appln. No. PCT/IB2023/000718, mailed on Mar. 13, 2025, 11 pages.

* cited by examiner

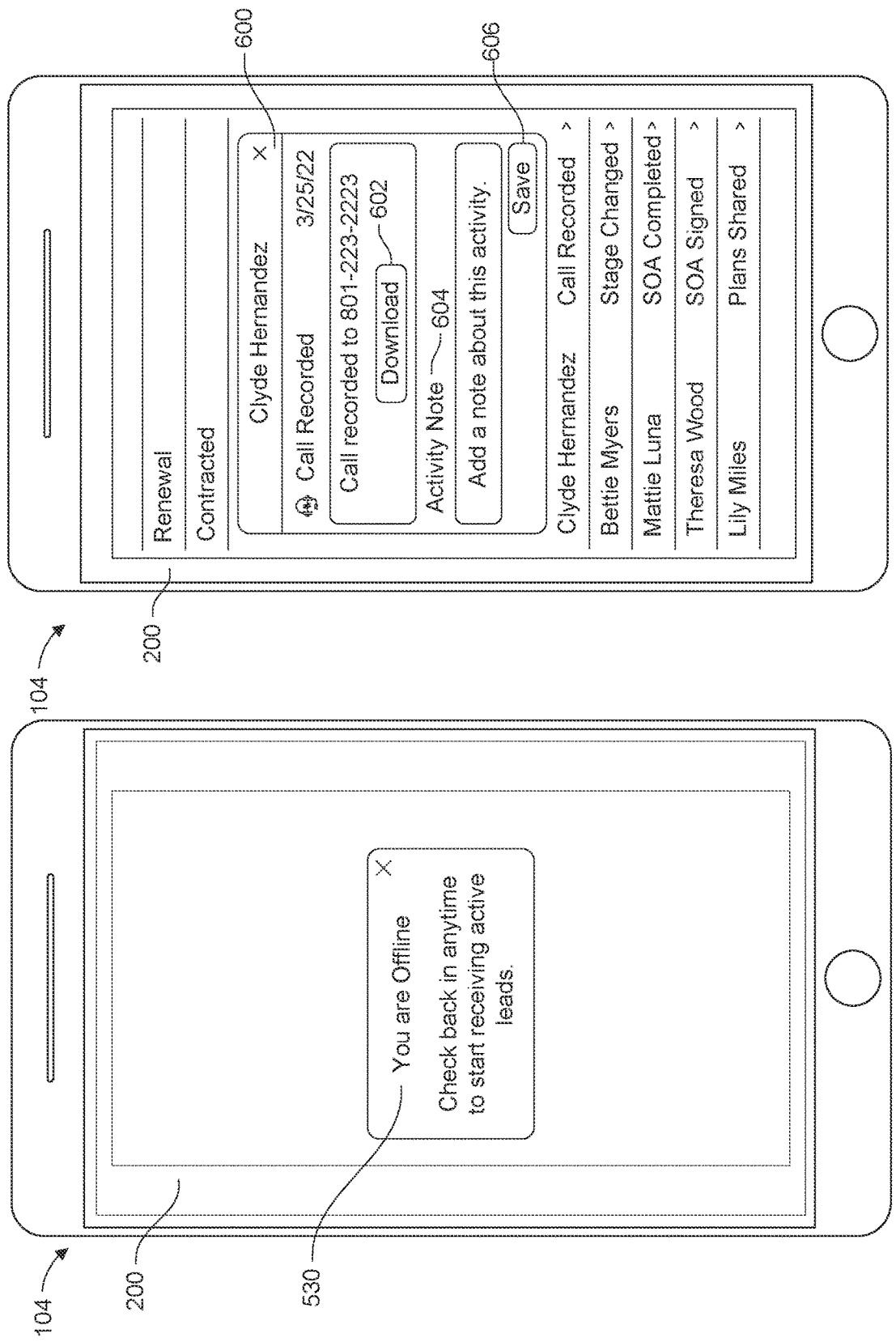

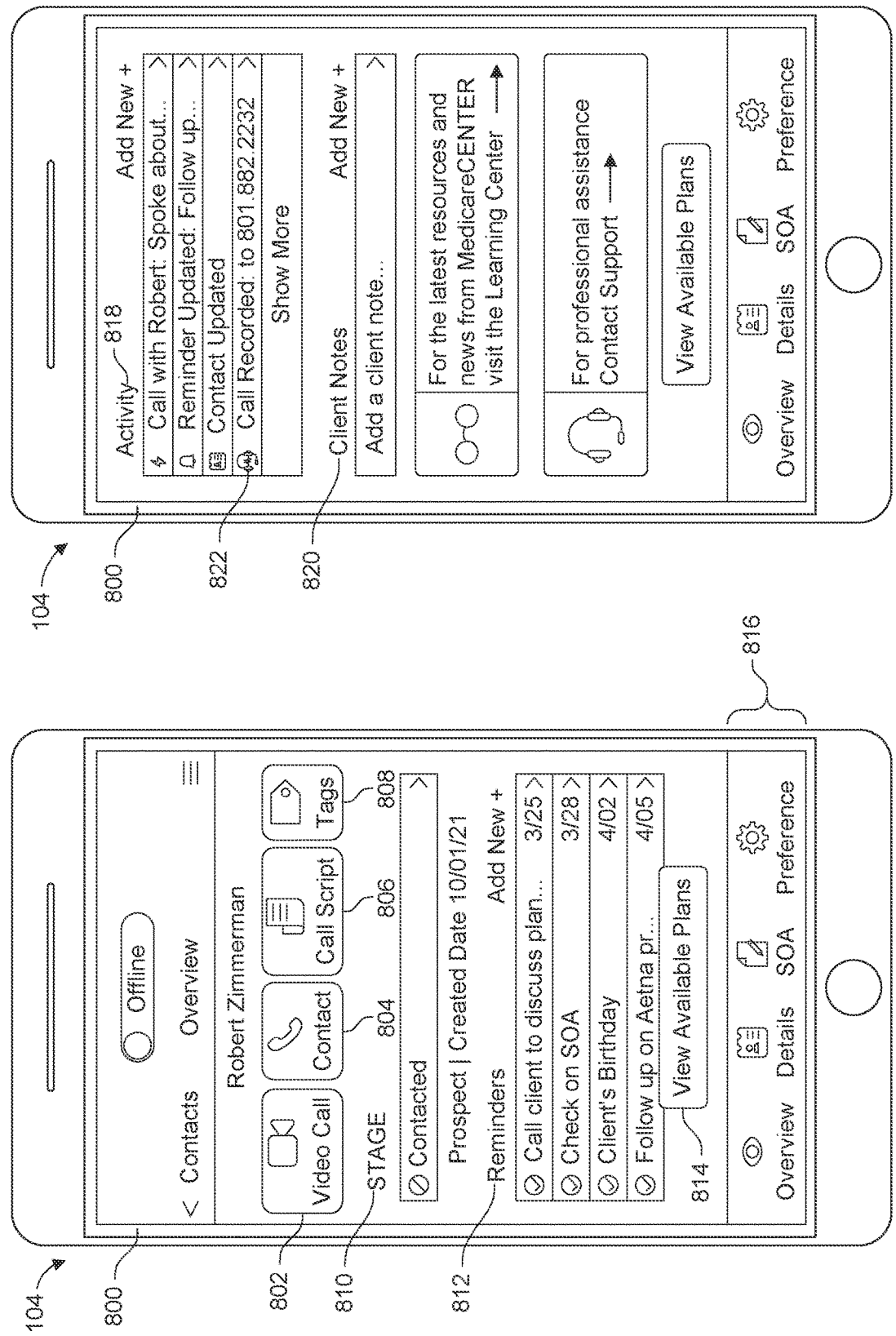

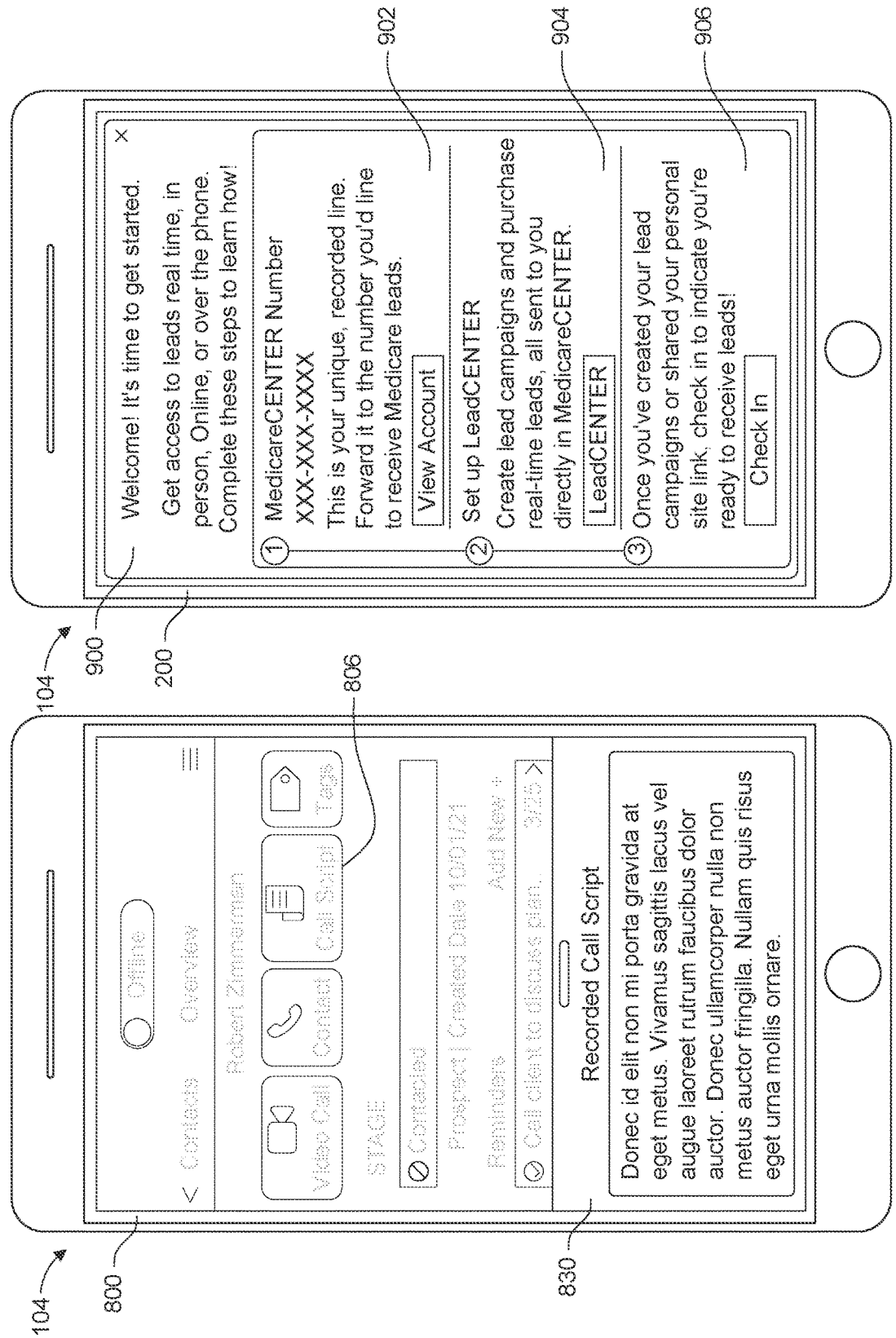

SYSTEMS AND METHODS FOR IMPROVED AGENT-CUSTOMER COMMUNICATION AND INSURANCE ENROLLMENT

CROSS-REFERENCE TO RELATED APPLICATIONS

This application claims the benefit of the U.S. Provisional Patent Application No. 63/403,567, filed on Sep. 2, 2022. The disclosures of the prior applications are incorporated by reference in their entirety.

TECHNICAL FIELD

This document describes computer systems, user interfaces, and computer-implemented methods for providing improved interactions between, for example, providers, agents, and customers, and optionally for providing an insurtech platform that achieves technological solutions to achieve such interactions.

BACKGROUND

Insurance providers may often work through an insurtech provider, such as a field marketing organization ("FMO") that provides an insurtech platform, for purposes of selecting and contracting with any of thousands of insurance agents in particular geographic or product categories. Alternatively or additionally, insurance agents, insurance providers, or a combination thereof may work through an insurtech provider for purposes of accessing information about or communicating with customers, including some customers that seeking to select insurance coverage plans from among a range of insurance policy options. Some insurtech providers can employ a computer-implemented system that facilitates intermediate communications between the insurance carriers and the contacted insurance agents, for example, when an insurance agent communicates with a customer regarding a selection of a new health insurance plan, and the insurance carrier must then evaluate the proposed plan for a decision to formally issue that plan as a policy to the customer.

When interacting with potential and existing customers regarding available insurance coverage plans, an insurance agent is often faced with a complex set of options, prices, and limits for communicating to such customers. Further, agents may often memorialize their meetings with potential and current customers for purposes of ensuring compliance with regulations or other obligations. Several regulations impose requirements on communications between agents and customers, such as requiring an agent to recite a call script during calls and recording inbound and outbound calls. Moreover, the agents may receive or find leads, which are potential customers looking for insurance plans. The leads can come from different types of data sources, such as via phone call or web-based data forms, and can often come at various times of day, whether or not the agents are working and/or available to address the leads.

SUMMARY

The document generally describes techniques, methods, systems, and other technology for improving interactions among insurance agents, insurance providers, and insurance customers and, optionally, for achieving technological solutions that increase the likelihood such interactions comply with regulatory requirements. In some embodiments described herein, the disclosed technology includes providing unique graphical user interfaces (GUIs) that facilitate efficient communication between computing devices operated by insurance agents and computing devices operated by insurance customers to ensure that a variety of activity can be performed in compliance with regulatory requirements. For example, particular embodiments are configured to provide a number of improved platform interfaces and solutions for agents, including one or more improvements to: selectively receive leads when they are online (e.g., designated as on duty or otherwise working and available to receive leads), communicate with potential and existing customers about insurance plans when the agents are online, facilitate a customer's ability to review and sign insurance plans from their computing device when their agent is offline, automatically record inbound and outbound calls according to regulatory requirements, provide call scripts to be recited during those calls in compliance with the regulations, and uniquely tag customers to assist the agents in organizing their customer contact records and tasks associated with their customers.

One or more embodiments described herein can include a computer-implemented method for toggling activity status, the method comprising: receiving, by a computing system from a first remote computing device, user selection of a graphical toggle feature to switch from an offline status to an online status, the graphical toggle feature being presented in a graphical user interface (GUI) display of the first remote computing device, determining, by the computing system and responsive to the received user selection of the graphical toggle feature at the first remote computing device, lead settings for the user including instructions, that when executed, cause one or more insurance enrollment leads to be delivered to and presented in the GUI display of the first remote computing device, retrieving, by the computing system, the insurance enrollment leads, filtering, by the computing system, the insurance enrollment leads based on the lead settings for the user to provide one or more filtered leads, and transmitting, by the computing system to the first computing device, information to be presented in the GUI display that includes at least one of the filtered leads.

In some embodiments, the embodiments described herein can optionally include one or more of the following features. For example, the method can include receiving, by the computing system and based on the received user selection of the graphical toggle feature, online settings for the user of the first remote computing device, the lead settings for the user being determined based upon the online settings. The online settings can include a mapping between a recording service number and a call number at which the user can be called by customers, the recording service number being used, by a call service system, to record a call between the first remote computing device and a second remote computing device, the second remote computing device being used by a customer. The online settings for the user may include a user-selected lead-type, the lead-type being at least one of a call lead-type and a data lead-type. The online settings for the user may include a user-selected lead-source, the lead-source being at least one of a group of services that provide leads to the user. The method can also include transmitting, by the computing device to a second remote computing device of a customer, information to be presented in a GUI display at the second remote computing device indicating that the user at the first computing device is online, the information including at least one selectable option to contact the user at the first remote computing device. The at least one selectable option can be unavailable for user selection when the graphical toggle feature is switched to the offline status at the first remote computing device. The method may also include updating, by the computing system and based on receiving the user selection of the graphical toggle feature, an activity status of the user to the online status for at least one service provided by the computing system to the user at the first remote computing device. The at least one service can include a first insurance provider service and a second insurance provider service, and each of the first and second insurance provider services can include different sets of leads. The method may also include transmitting, by the computing system to the first remote computing device, information to cause the first remote computing device to present the graphical toggle feature in other GUI displays presented at the first remote computing device.

One or more embodiments described herein can include a system for improved communication for facilitation of insurance enrollment, the system including: an insurtech provider server system that can be configured to provide a mobile application interface to first and second remote computing devices for providing communication between an insurance customer user of the first remote computing device and an insurance agent user of the second remote computing device. The insurtech provider server system can include a data repository of recorded calls and can be in communication with a call service system that can be configured to route and record calls between the first and second remote computing devices. The insurtech provider server system can provide, to the call service system, call routing information based on an inbound call from the first remote computing device being received at the call service system and being associated with a phone number of the insurance agent user. The inbound call can be routed to a phone number of the second remote computing device of the insurance agent user based upon the call routing information, and a recording of the routed call can be stored in the data repository of the insurtech provider server system.

In some implementations, the system can optionally include one or more of the following features. For example, the system can also include the call service system, which can be configured to: receive the inbound call from the first remote computing device, the inbound call including the phone number of the insurance agent user, request, from the insurtech provider server system, the call routing information, in which the insurtech provider server system can be configured to determine the call routing information based on associating the phone number of the inbound call with the insurance agent user, receive, from the insurtech provider server system, the call routing information, route the inbound call to the phone number of the second remote computing device based on the call routing information, record the routed call during performance of the routed call between the first and second remote computing devices, and store, in a second data repository of the call service system, the recorded call in association with the insurance agent profile for a threshold period of time. The call server system can also temporarily store the routed call while the routed call is performed and transmit the recorded call to the insurtech provider server system after the routed call ends, in which the insurtech provider server system can be configured to store the recorded call in the data repository of the insurtech provider server system. Sometimes, the insurtech provider server system can also be configured to: retrieve the recorded call from the data repository based on receiving a request for the recorded call from the second remote computing device and provide, to the second remote computing device, the retrieved call for at least one of playback or download. The insurtech provider server system may also transmit, based on the routed call being performed, information to the second remote computing device that causes the second remote computing device to output, in a GUI display presented at the second remote computing device, a call script.

One or more embodiments described herein can include a computer-implemented method including: transmitting, by a computing system to a first remote computing device of a customer, instructions that, when executed, cause the first remote computing device to display insurance plan information in a graphical user interface of the first remote computing device, in which the insurance plan information includes displayed options in the graphical user interface (i) to enroll in an insurance plan, (ii) to view rates associated with the insurance plan, and (iii) to communicate with an insurance agent at a second remote computing device, polling, by the computing system, the second remote computing device of the insurance agent for an activity status of the insurance agent, and in response to a determination that the activity status of the insurance agent indicates that the insurance agent is online, transmitting by the computing system to the first remote computing device instructions that, when executed, cause the first remote computing device to dynamically update in the graphical user interface so that the displayed option (iii) changes from a non-selectable option to a user-selectable option.

The method can optionally include one or more of the following features. For example, the method can also include transmitting, by the computing system to the first remote computing device, a notification with a personalized URL associated with the insurance plan, in which the notification is generated by the second remote computing device, and in which user-selection, received at the first remote computing device, of the personalized URL in the notification causes the insurance plan information to be outputted in the graphical user interface at the first remote computing device. The method can also include retrieving, by the computing system from an insurance provider computing system, the insurance plan information to be outputted in the graphical user interface at the first remote computing device. The method may include in response to a determination that the activity status of the insurance agent indicates that the insurance agent is offline, transmitting by the computing system to the first remote computing device instructions that, when executed, cause the first remote computing device to present the displayed option (iii) as a non-selectable option in the graphical user interface at the first remote computing device. The method can also include receiving, by the computing system from the first remote computing device, user input indicating selection of the displayed option (i) to enroll in the insurance plan, transmitting, by the computing system to an insurance provider system, enrollment information for the customer, in which the enrollment information includes at least a customer-provided payment method for the insurance plan and a customer-signed insurance plan policy, generating, by the computing system, a customer contact profile including information about the customer, the insurance plan, and the enrollment information, and providing, by the computing system to the second remote computing device, the customer contact profile for presentation in a graphical user interface at the second remote computing device. The method may also include assigning, by the computing system, the customer to the insurance agent as a client of the insurance agent. The user-selectable option can be a button.

In some implementations, the method can also include transmitting, by the computing system to the second remote computing device and in response to the determination that the activity status of the insurance agent indicates that the insurance agent is online, instructions that, when executed, cause the second remote computing device to output in the graphical user interface of the second remote computing device the insurance plan information that is concurrently being outputted in the graphical user interface of the first remote computing device. The first and second remote computing devices can be configured to present the same insurance plan information at a same time. The method may also include receiving, by the computing system from the second remote computing device, user-selection of an option to share the insurance plan information with the customer at the first remote computing device, and in response to receiving the user-selection of the option to share the insurance plan information, transmitting, by the computing system to the first remote computing device, the instructions that, when executed, cause the first remote computing device to output in the graphical user interface the insurance plan information. The instructions can include a personalized URL that, when selected by the user at the first remote computing device, causes the first remote computing device to output the insurance plan information in the graphical user interface. The instructions may cause the first remote computing device to output the insurance plan information in a web browser launched at the first remote computing device.

The devices, system, and techniques described herein may provide one or more of the following advantages. For example, the streamlined and efficient user interfaces described herein allow for agents and customers to easily navigate a complex and confusing system, thereby improving user experiences and reducing an amount of time that both agents and customers need to navigate a set of (often complex or multi-layer) options. This reduction in time spent navigating the automated system can also reduce power consumption and communication bandwidth at computing devices of the agents and customers in comparison to traditional systems. The disclosed technology may also ensure that insurance quote and enrollment processes, as well as other insurance-related processes, are performed accordingly to increase likelihood of improving compliance with relevant regulatory requirements, to facilitate a smooth user experience for both agents and customers.

As another example, the disclosed technology provides a more intuitive experience for insurance customers that allow them to better understand current and/or prospective insurance plans. The disclosed technology allows for a customer to conveniently review and sign an insurance plan at their computing device with or without their agent being available or otherwise online. When the agent becomes available or online, a GUI presented at the customer's computing device can be updated to provide the customer with an ability to contact the agent about the insurance plan. Accordingly, the disclosed technology streamlines an insurance enrollment process by providing intuitive and user-friendly ways for the customer to efficiently and easily sign up for insurance plans whenever they desire and at the convenience of their computing device while also providing communication with their agent when the agent is available/online.

Similarly, the disclosed technology provides user-friendly mechanisms that allow insurance agents to manage insurance records for numerous customers such that the customers can be provided with various insurance options while increasing likelihood of complying with relevant regulatory requirements. Similarly, the disclosed technology provides for improved recordkeeping, thereby improving insurances agents' ability to search, access, and/or review previous calls with customers to make better and informed decisions about providing services and/or future communication with the customers. Such recordkeeping techniques may also facilitate improved compliance with relevant regulations.

The details of one or more embodiments are set forth in the accompanying drawings and the description below. Other features and advantages will be apparent from the description and drawings, and from the claims.

BRIEF DESCRIPTION OF THE DRAWINGS

FIGS. 5A-E are example GUIs for toggling between an offline status and an online status at an agent computing device of FIGS. 1A-D.

FIG. 6 is an example pop-out window displayed in a GUI for viewing call information at an agent computing device of FIGS. 1A-D.

FIGS. 8A-C illustrate an example GUI for accessing a profile for a customer contact using at a computing device within the system of FIGS. 1A-D.

FIG. 9 is an example pop-out window for providing instructions to an insurance agent about setting up their account for interaction with the system of FIG. 1A-D.

Like reference symbols in the various drawings indicate like elements.

DETAILED DESCRIPTION OF ILLUSTRATIVE EMBODIMENTS

This document generally relates to technology for improving interactions between insurance agents, insurance providers, and insurance customers and, optionally, for achieving technological solutions that increase the likelihood such interactions comply with regulatory requirements. Some implementations of systems and methods described herein include providing improved GUIs at computing devices operated by an insurtech provider (e.g., such as a FMO in particular implementations) to facilitate seamless and intuitive experiences, communication, and improved compliance with the regulatory requirements between insurance agents and insurance customers. For example, the disclosed technology can provide an availability toggle (e.g., offline/online) feature presented in the GUIs at agent computing devices for agents to advantageously self-select when, how, and what information is received at his or her computing device. As another example, the disclosed technology can provide customers with the ability to review, select, and/or sign up for insurance products from their computing devices using different types interfaces that are dynamically responsive to the designated availability of their agents (e.g., based on whether an agent toggles to being offline versus online). The disclosed technology can also provide for an improved technology solution that automatically records and archives (for selective search and access in the future) the inbound and outbound calls between an agent and each of his or her customers. Moreover, an agent can interact with the insurtech platform to add customized and or automated tags to customer contacts to facilitate improved organization and review of the contacts and associated activity at the agent computing devices.

Figure 1A:
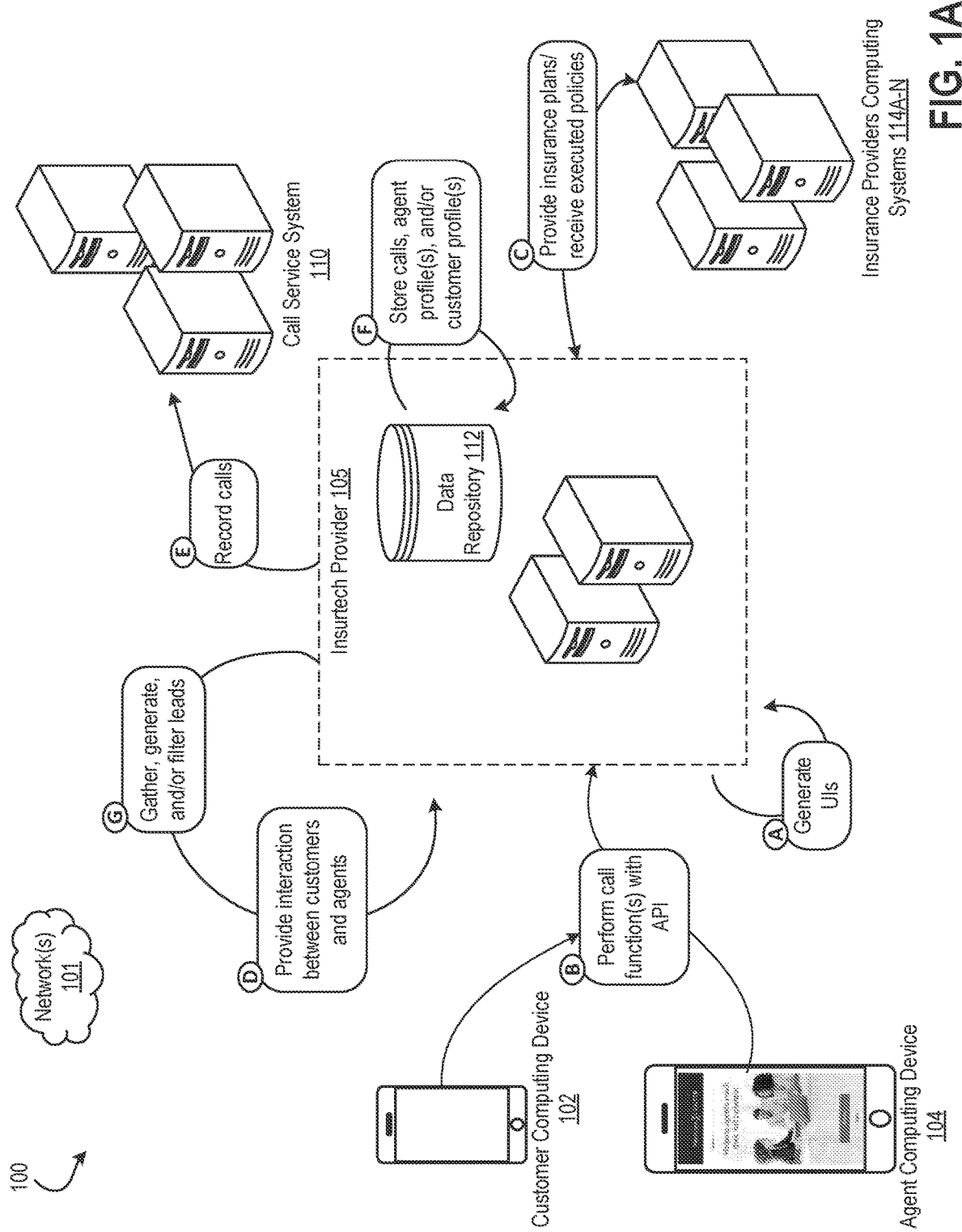
FIGS. 1A-D are conceptual diagrams of an example computing environment including interactions with an insurtech provider platform, in accordance with some embodiments.

Referring to FIGS. 1A-D, an example computing environment 100 can facilitate interactions with an insurtech provider platform, in accordance with some embodiments. FIG. 1A is a conceptual diagram of the example computing environment 100 for facilitating improved agent communications, for example, in a process that achieves insurance enrollment. The computing environment 100 can be used to provide mobile and web-based applications and interfaces to computing devices of insurance agents and insurance customers (e.g., potential and existing customers) to provide communication between agents and customers for insurance enrollment, preferably in a manner that provides an increased likelihood of compliance with relevant regulatory requirements.

An insurtech provider 105, customer computing device(s) 102, agent computing device(s) 104, call service system 110, and insurance providers computing systems 114A-N can communicate (e.g., wired, wireless) via network(s) 101 in the computing environment 100. The insurtech provider 105 can be implemented as a cloud-based computing system, a server system, a network of computing systems/devices, or a combination thereof. The insurtech provider 105 can be configured to generate a mobile application to be used by insurance agents and customers. Once developed, the mobile application can be deployed in online application stores so that insurance agents and customers can download the mobile application at their respective computing devices 104 and 102. Once the mobile application is downloaded at the computing devices 104 and 102, the computing devices can perform call functions with one or more APIs to interact with features of the mobile application. Although this disclosure is described in reference to a mobile application that is executed at the computing devices 104 and 102 (depicted as portable smartphone devices in this example in FIG. 1A), the technology described herein can also be deployed in other applications and/or interfaces, such as a web-based interface, application, or software that can be deployed at laptops, tablets, and/or other computer systems. The insurtech provider 105 can also be configured to provide communication between the insurance agents, customers, and other computing systems to facilitate compliant insurance enrollment. For example, the insurtech provider 105 can act as a gateway of communication between the computing devices 102 and 104 and the call service system 110, the insurance providers computing systems 114A-N, and the data repository 112.

The insurtech provider 105 can include one or more computing systems, servers, and/or storage systems. As an illustrative example, the insurtech provider 105 can include one or more servers and a data repository 112. In some embodiments, one or more of the components mentioned above can be separate from the insurtech provider 105 and in communication (via the network(s) 101) with the insurtech provider 105. The insurtech provider 105 may also include additional or fewer components, systems, etc. For example, the insurtech provider 105 can include an API server, which can provide for communication of information between the insurtech provider 105 and the agent computing devices 104 (e.g., presentation of and interaction with the mobile application described herein).

The insurtech provider 105 can also be configured with a mobile application developer engine, module, software, cloud-based system, environment, and/or computing system. The insurtech provider 105 can also be configured with a web server for development of a web application of the disclosed techniques and/or an application server for development of the mobile application of the disclosed techniques. The insurtech provider 105 can generate graphical user interface (GUI) displays for the mobile application. The insurtech provider 105 can release the mobile application to the online application stores to then be downloaded by the computing devices 102 and 104. Once downloaded and installed, for example, the computing devices 102 and 104 can make call functions with an API via the mobile application to provide the respective users with GUI displays for viewing information about insurance products (currently enrolled plans, available plans, etc.), communicating with insurance agents or other users, and maintaining customer insurance profiles.

The data repository 112 can be a memory storage system/device, including but not limited to a data store, database, and/or cloud-based storage, or any combination thereof. The data repository 112 can be configured to store information about insurance agents and insurance customers. For example, the data repository 112 can be configured to store enrollment information for each insurance customer, lead settings for each insurance agent, and/or recorded inbound and outbound insurance sales calls.

The customer computing device(s) 102 can be mobile phones, smartphones, laptops, tablets, wearable devices, or a combination thereof. The customer computing device 102 can be used by an insurance customer, such as an existing customer and/or a potential customer.

Similarly, the agent computing device(s) 104 can be mobile phones, smartphones, laptops, tablets, wearable devices, or a combination thereof.

The call service system 110 can be implemented as a cloud-based computing system, a server system, a network of computing systems/devices, or a combination thereof configured to record and store inbound and outbound insurance calls to increase likelihood of improving compliance with relevant regulatory requirements. The call service system 110 can also be configured to assign a call routing number to each insurance agent's phone number(s). As a result, whenever the agent places a call with their phone number or they receive a call to their phone number, the call can be (i) automatically routed, via the call routing number, to a phone number of the agent, which the agent can pick up at their computing device 104, and (ii) automatically recorded. Although the call service system 110 is shown as a separate component from the insurtech provider 105, in some embodiments, the call service system 110 can be part of the insurtech provider 105.

The insurance providers computing systems 114A-N can be implemented as a cloud-based computing system, a server system, a network of computing systems/devices, or a combination thereof and configured to generate and provide information about insurance products, such as insurance plans. Each of the insurance provider computing systems 114A-N can be operated by a different insurance provider, in some embodiments. The insurance provider computing systems 114A-N may generate insurance plans, store the insurance plans in one or more data repositories, and make the insurance plans available for retrieval and display at the computing devices 102 and 104. In some embodiments, one or more of the insurance providers computing systems 114A-N may be part of the insurtech provider 105.

Still referring to FIG. 1A, the insurtech provider 105 can generate UIs for the mobile application in block A. The insurtech provider 105 can generate any of the UIs described herein. As part of generating the UIs, the insurtech provider 105 can also develop the mobile application (or web-based interface/application) described herein and deploy the mobile application in online application stores.

Once the mobile application is downloaded at the agent computing device(s) 104, users at the computing devices 104 can access the mobile application to manage insurance enrollment tasks/activities. The computing devices 104 can perform call functions with an API, via the mobile application, in order to display and interact with the GUIs of the mobile application (block B).

The insurance providers computing systems 114A-N can provide insurance products, such as plans, via the insurtech provider 105, to the computing devices 102 and/or 104 for display in the mobile application (block C). As an illustrative example, the agent at the computing device 104 can select an option in the GUI displayed at their device to view available insurance plans for a particular customer. Selecting the option can cause the computing device 104 to make a call function to retrieve insurance plans for the particular customer. Those insurance plans can be provided by the insurance providers computing systems 114A-N, via the insurtech provider 105, and to the agent computing device 104 for display in the GUI.

The insurance providers computing systems 114A-N can also receive executed insurance policies, via the insurtech provider 105, from the computing devices 102 and/or 104 (block C). As an illustrative example, the customer at the computing device 102 can decide that they want to enroll in an insurance plan presented in a GUI at their device (e.g., accessible via the web). The customer can sign, pay, and execute a policy for the insurance plan at the computing device 102. Once these actions are performed, information can be transmitted, from the customer computing device 102, via an API call and the insurtech provider 105 to the insurance providers computing systems 114A-N. The insurance providers computing systems 114A-N can maintain information about the enrolled customer and their insurance policy and provide any of that information to the insurtech provider 105 to then be outputted/displayed at the computing devices 102 and/or 104 at one or more other times.

The insurtech provider 105 can also perform one or more functions. For example, the insurtech provider 105 can provide interaction between the customers and agents via the mobile application at the respective computing devices 102 and 104 (block D). As described in reference to the GUIs in FIGS. 5A-E, when the agent toggles their activity status to being "online" using graphical elements presented in the mobile application at the agent computing device 104, the insurtech provider 105 can essentially open up a communication pathway between the agent at the computing device 104 and customers (potential and/or existing) at their computing devices 102. For example, selectable options to contact the agent can be presented in the mobile application at the computing devices 102. The customer can select the option to contact (e.g., call, email, message) the agent. The insurtech provider 105 can facilitate this communication.

Figure 1B:
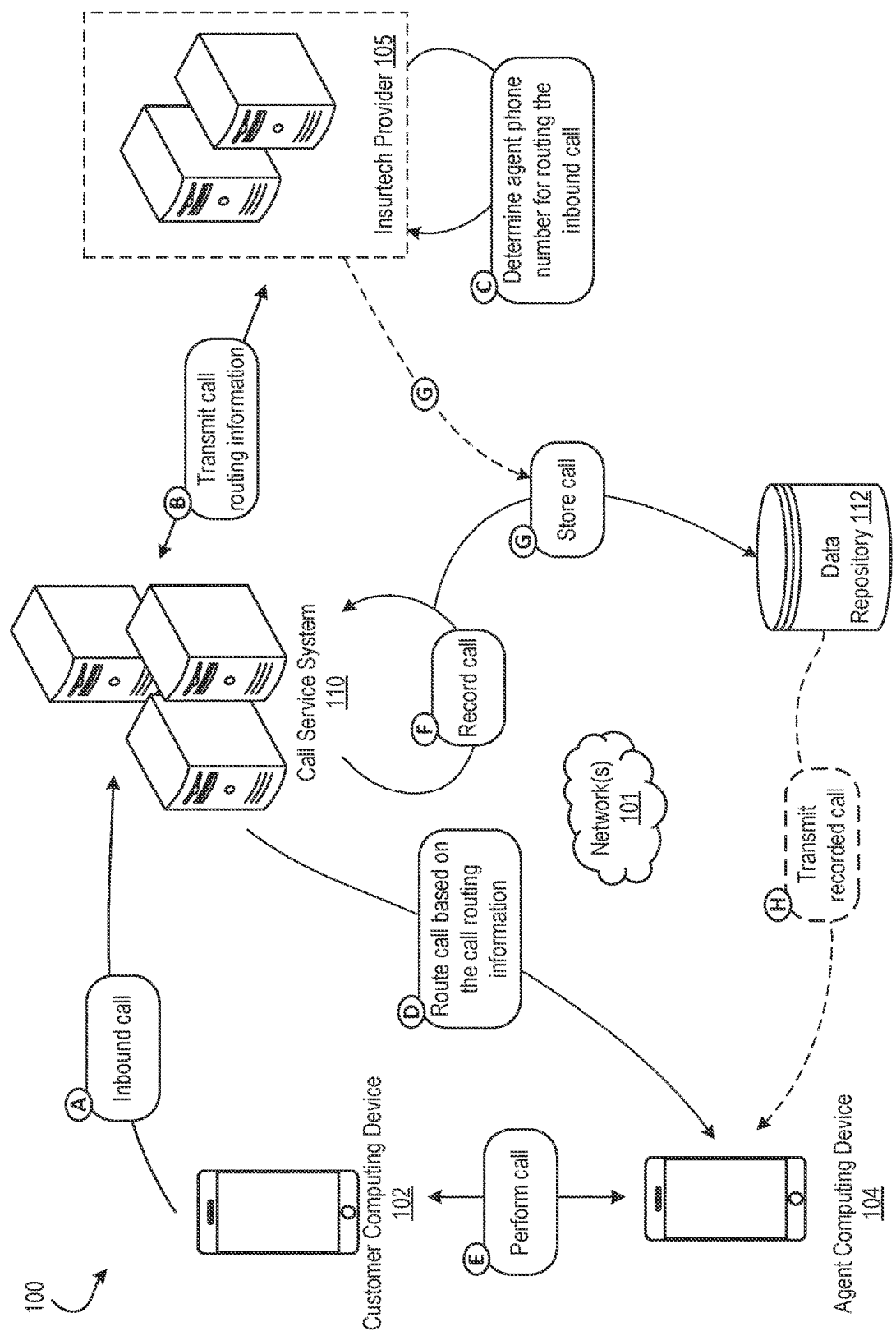

The insurtech provider 105 can also interact with the call service system 110 to record calls between the customer computing device 102 and the agent computing device 104 (block E). Refer to FIG. 1B for further discussion about recording the calls.

The insurtech provider 105 can also store calls, agent profiles, and/or customer profiles information in the data repository 112 (block F). Information inputted in the mobile application by the customer and/or agent at their respective computing devices 102 and 104 can be transmitted to the insurtech provider 105 for storage. Calls recorded by the call service system 110 can also be transmitted to the insurtech provider 105 for long-term storage. As an illustrative example, during the call between the computing devices 102 and 104, the call service system 110 can temporarily store the call in local storage. Once the call ends, the insurtech provider 105 can retrieve the recorded call from local storage of the call service system 110 and store the recorded call in the data repository 112 for long-term storage. A length of the long-term storage can vary depending on the relevant regulatory requirements. For example, some regulations may require the call to be stored for 10 years. Once the 10 years end, the insurtech provider 105 can remove the recorded call from the data repository 112.

The insurtech provider 105 can also gather, generate, and/or filter leads for the insurance agent at the agent computing device 104 (block G). As described in reference to FIGS. 5A-E, the insurance agent can provide information in the mobile application at their computing device 104 indicating leads that they want to receive. The insurance agent can provide information to establish data leads and/or real-time call leads. Based on the information provided by the insurance agent, the insurtech provider 105 can identify what leads to send to the agent at their computing device 104 when the agent has an activity status of "online."

As an illustrative example, when the agent is online and accepting data leads, the insurtech provider 105 can make a contact for a customer associated with a data lead, store the customer contact in the data repository 112, and transmit a push notification (or other alert, message, etc.) to the agent computing device 104 with lead information. The agent can then choose to accept the data lead in the mobile application at their computing device 104 and perform actions in response to the data lead (e.g., calling the customer associated with the lead, contacting the customer via email, text, and/or message).

As another illustrative example, when the agent is online and accepting call leads, a call lead can first be transmitted, from the customer computing device 102, to an inbound call center service, then routed to the insurtech provider 105. The insurtech provider 105 can review the inbound call and determine whether it satisfies the information provided by the agent seeking to receive call leads. If the inbound call satisfies the agent-provided information (e.g., the call originates within a state where the agent is licensed), then the insurtech provider 105 can generate a contact for the customer associated with the call lead, store the customer contact in the data repository 112, route the call to a phone number of the agent, which the agent can receive at their computing device 104 via the agent's designated phone number, and transmit a push notification (or other alert, message, etc.) to the agent computing device 104 with lead information. The agent can then choose to accept the call lead in the mobile application at their computing device 104 and perform actions in response to the call lead (e.g., picking up the call).

The blocks A-G can be performed in any order. In some embodiments, block A can be performed at a first time and blocks B-G can be performed at one or more other times that are later than the first time. Moreover, the computing devices 102 and 104 can perform call functions with the API (block B) at one or more various times in order to communicate with any of the components described herein, transmit information between the components, and/or receive information from the components. As another example, the insurtech provider 105 may only perform block G (gathering, generating, and/or filtering leads) whenever the agent at the computing device 104 requests leads (e.g., the agent changes their activity status from "offline" to "online"). Calls may also be recorded (block E) whenever the customer at the computing device 102 and/or the agent at the computing device 104 initiates a call with the other party, regardless of whether insurance plans have been provided/displayed at the devices 102 and/or 104 (block C) and/or whether leads have been provided to the agent computing device 104 (block G). The blocks A-G can be performed in one or more other orders.

Referring now to FIG. 1B, the computing environment 100 can be configured to record and archive audio (or, optionally audio and video) of calls or other communications performed via the system. FIG. 1B is described from the perspective of an inbound call, such as a call being made by the customer at the customer computing device 102 to contact the agent at the agent computing device 104. The techniques described in FIG. 1B are also applicable to outbound calls (e.g., when the agent places a call with their computing device 104 to contact the customer at the computing device 102) and applicable to recordings of in-person conversations gathered via the device 104 (e.g., as described in FIGS. 16A-16H below). In some embodiments, the call service system 110 can also be part of the insurtech provider 105.

Referring to FIG. 1B, the customer computing device 102 can place an inbound call (block A). The inbound call can be made to a particular insurance agent. When the call is placed, inbound call information can be transmitted from the computing device 102 to the call service system 110 (block A). The inbound call information can include, for example, a unique identifier (e.g., username) assigned to the agent to whom the call is intended. The unique identifier can be used to determine what phone number of the agent for which to route and record the inbound call.

The call service system 110 can request call routing information from the insurtech provider 105 in response to receiving the inbound call information (block B). For example, the call service system 110 can provide the unique identifier for the agent to the insurtech provider 105.

The insurtech provider 105 can then determine a phone number for the agent for which to route the inbound call (block C). The insurtech provider 105 can retrieve, from the data repository 112 and using the unique identifier, an agent profile or other information about the agent. The agent profile or other agent information can indicate one or more phone numbers of the agent that inbound calls can be routed to. The agent can set their contact preferences in the mobile application presented at their computing device 104. For example, as described in reference to FIGS. 5A-B, the agent can input, in one of the GUIs presented at the agent computing device 104, what phone number(s) they would like to be reached at by customers (e.g., cell number, home number, office number). The insurtech provider 105 can identify that phone number in the agent profile or other agent information in block C, then transmit the phone number as part of the call routing information back to the call service system 110 (block B).

In some embodiments, the insurtech provider 105 can determine in block C whether the agent has an activity status of "online." If the agent is online, then the inbound call can be routed to a phone number of the agent. The agent can then pick up the call at their computing device 104 using the techniques described herein. If the agent is not online (e.g., their activity status is set of "offline"), then the insurtech provider 105 can determine that the inbound call should not be routed to the phone number of the agent.

As an illustrative example, the insurtech provider 105 can receive the request to route the call from the call service system 110 in block B. The insurtech provider 105 can then poll the agent computing device 104 for updates to an activity toggle feature that is presented in the GUIs at the agent computing device 104. The updates can include the agent toggling the feature between an "offline" and "online" activity status. If the agent computing device 104 returns an indication that the activity toggle feature has been updated to the "online" activity status, then the insurtech provider 105 can determine in block C that the agent is available to receive the inbound call at the agent computing device 104 (block C). The insurtech provider 105 can then transmit the call routing information to the call service system 110 (block B). On the other hand, if the agent computing device 104 returns an indication that the activity toggle feature is set to the "offline" activity status, then the insurtech provider 105 can determine in block C that the agent is unavailable to receive the inbound call at the agent computing device 104 (block C). As a result, the insurtech provider 105 may not transmit the call routing information (block B) to the call service system 110.

In some implementations, the insurtech provider 105 can include a call routing engine configured to determine to which agent to route a call. The routing engine can determine the agent based on whether the agent is online and other criteria, such as the agent's campaign preferences for receiving calls, their area code, etc. Sometimes, when no agent is available to receive the call (e.g., no agent has a campaign for an area or zip code from which the call originates, all agents with campaigns for that area or zip code are toggled to offline status), the routing engine can send the call to call center agents rather than a field agent. In some implementations, only some types of calls may be routed to the call center agents. Purchased calls (e.g., leads), on the other hand, can be rejected so that they are not transmitted to any field agent or call center agent. Similarly, if a call is sent to a qualified agent and the agent does not pick up the call or accept the call, then the call can be routed to a call center agent. If that call is a purchased call (e.g., lead), on the other hand, then the call can be rejected.

Once the insurtech provider 105 determines the call routing information (and/or determines whether the agent is available to receive calls) and provides the call routing information to the call service system 110, the call service system 110 can route the call based on the call routing information (block D). Therefore, the call service system 110 can route the inbound call from the customer computing device 102 to the phone number of the agent, which can be received/picked up at the agent computing device 104. When the inbound call is routed to the phone number of the agent (such that the inbound call may be selectively received at the computing device 104), a recording phone number can also be embedded in the inbound call. The recording phone number permits the call service system 110 to automatically record the inbound call while the call is occurring between the customer computing device 102 and the agent computing device 104.

Once the call is routed to the phone number of the agent, the agent can pick up the call at their computing device 104 and the call can be performed between the customer computing device 102 and the agent computing device 104 (block E). In other words, the agent can pick up the call at the computing device 104 and speak to the customer at the computing device 102.

While the call is taking place (block E), the call service system 110 can record the call (block F). The call can be recorded to improve likelihood of compliance with relevant regulatory requirements and similar standards. The call service system 110 can optionally temporarily store the call in local storage at the call service system 110.

Once the call is completed (e.g., the customer and/or the agent hang up at their respective computing devices 102 and 104), the recorded call can be moved to the data repository 112 for storage (block G). For example, the call service system 110 can transmit the recorded call from local storage to the data repository 112. As another example, the insurtech provider 105 can request the recorded call and/or receive/retrieve the recorded call from the call service system 110. Once the insurtech provider 105 receives the recorded call, the insurtech provider 105 can transmit the recorded call to the data repository 112 for long-term storage. The recorded call can be stored in the data repository 112 for a threshold amount of time, the threshold amount of time being determined based on the regulatory requirements. In some embodiments, for example, the threshold amount of time can be 10 years. After 10 years pass since the call is initially recorded, the insurtech provider 105 can remove the call from storage in the data repository 112.

In block G, the recorded call can be stored in association with the unique identifier of the agent. The recorded call can also be stored in association with a unique identifier of the customer. In some embodiments, the recorded call can be stored in association with the agent's phone number or other call routing information for the agent. The recorded call can also be stored within other information associated with the agent and/or the customer so that the call can later be retrieved from the data repository 112 and provided to the agent computing device 104 for output in one or more GUIs.

Optionally, the recorded call can also be transmitted to the agent computing device 104 at one or more later times (block H). For example, as described further below, the agent can select an option presented in a GUI at the computing device 104 to download the recorded call. The agent can make this selection at any time after the call has been made and subsequently recorded. Selecting the option to download the call causes a call function to be made via an API in which a notification can be transmitted to the insurtech provider 105 to provide the recorded call to the computing device 104. The insurtech provider 105 can retrieve the recorded call from the data repository 112 and transmit the call back to the agent computing device 104 to be presented and downloadable at the agent computing device 104.

As previously mentioned, blocks A-H can similarly be performed for outbound calls (e.g., calls made by the agent at the computing device 104 to the customer at the computing device 102). One or more of the blocks A-H may be performed differently for outbound calls. For example, the outbound call can be transmitted from the agent computing device 104 to the call service system 110 in block A. The call service system 110 can transmit a request for call routing information to the insurtech provider 105 in block B. Then, the insurtech provider 105 can determine a customer phone number for routing the call to the customer computing device 102 in block C. The insurtech provider 105 can also optionally embed the outbound call with the recording phone number or otherwise include the recording phone number in the call routing information transmitted back to the call service system 110 (block B). Then, the call service system 110 can route the outbound call to the particular customer computing device 102 based on the call routing information in block D. When the call is performed between the computing devices 102 and 104, the call service system 110 can automatically record the call using the recording phone number in block F. The call can then be stored in the data repository 112 in block G and optionally transmitted to the agent computing device 104 at a later time (block H).

As another example for outbound calls, a transaction can be sent to the call service system 110 indicating that the outbound call is being requested using a call service system number that has been assigned to the agent. The call service system 110 can identify the agent's phone number that is associated with the call service system number assigned to the agent. The call service system 110 can then call the agent's phone number. The call can appear, at the agent computing device 104, as incoming from the call service system number assigned to the agent. The agent can pick up the call. The call service system 110 can then call the customer using a phone number associated with a customer contact profile or record. At the customer's computing device 102, the call can appear to be coming from the call service system number assigned to the agent. The customer can then pick up the call, and the call service system 110 can connect the agent and the customer to communicate with each other. Once connected, the call service system 110 can begin recording the call.

Figure 1C:
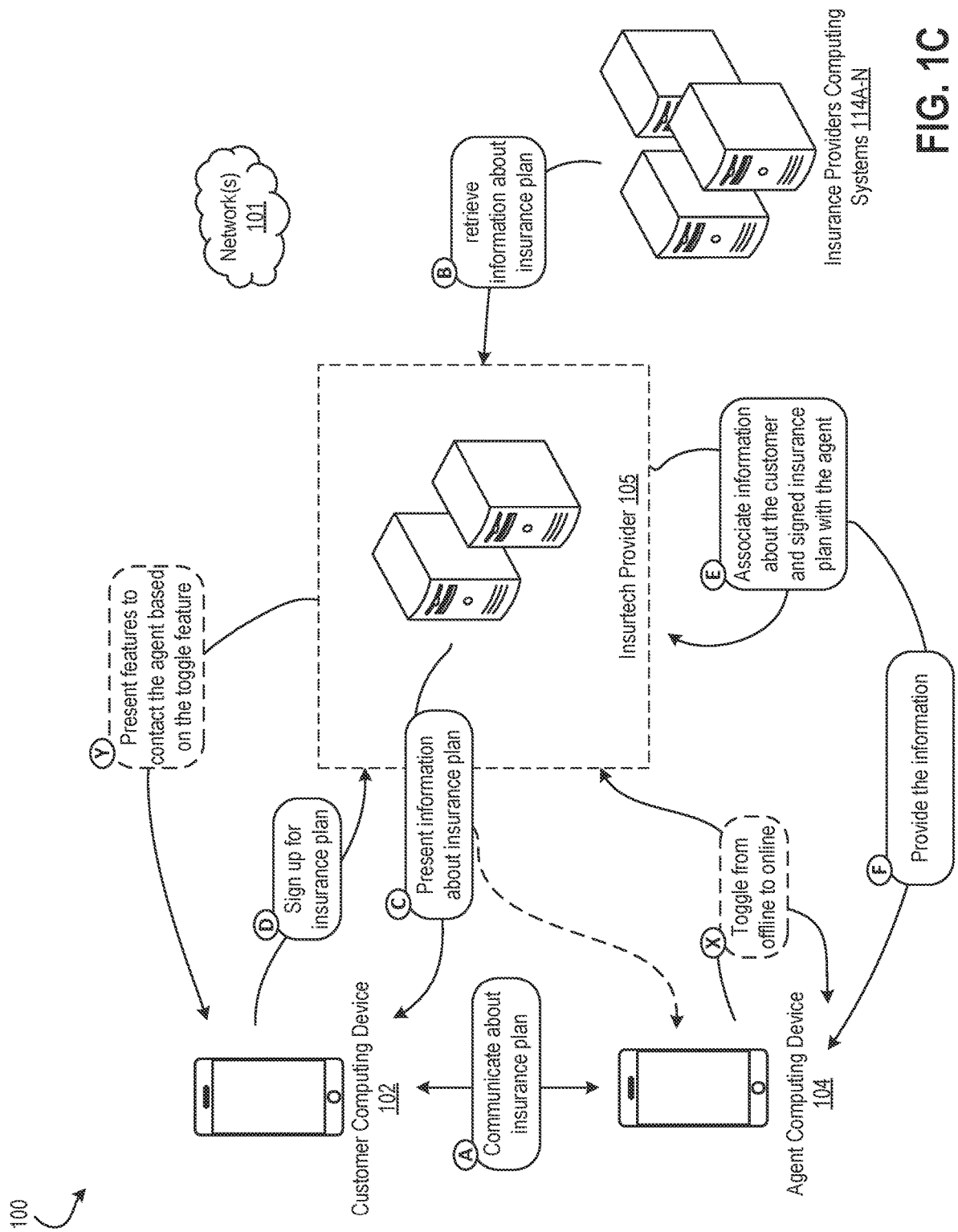

Referring now to FIG. 1C, the computing environment 100 can be configured to provide insurance enrollment information at the computing device 102 of the insurance customer. The insurance enrollment information can be provided to the computing device 102 using personalized URL ("pURL"). The pURL can be a unique web address created for a specific target of a campaign (e.g., a marketing campaign). Each agent can have their own pURL, which they can share with their customers. The pURL can render a unique landing page or microsite for the specific target (e.g., a customer that has previously interacted with the particular agent) when the pURL is selected by the specific target at their respective computing device. For example, the agent can provide their pURL to a potential insurance customer (e.g., via a communication from the agent computing device 104 during or after a call with a particular customer). When the insurance customer selects the pURL, their computing device 102 can present a uniquely customized insurance quoting/enrollment website in a web browser at the computing device 102, including for example, the website being personalized with the particular agent's information and personalized enrollment options for that customer based upon the information gathered in the previous communications between that particular agent and the customer.

Accordingly, in some embodiments, pURL leads allow the customer to view insurance policies and take actions based on the policies from their computing device 102 with or without the agent being online. For example, the customer and the agent can simultaneously view the same insurance policy information at their respective computing devices 102 and 104. The customer and agent can also communicate about that insurance policy while the agent is online. If the agent is offline, the customer can continue to view the insurance policy information at their computing device 102 and take actions, such as executing the insurance policy, renewing their insurance policy, paying for their insurance policy, etc. Any actions taken by the customer at their computing device 102 (e.g., via the pURL website displayed at the browser of the customer device 102) with respect to the insurance policy can be transmitted to the insurtech provider 105 and linked to/associated with the agent who acted upon the lead for this customer and handled an earlier consultation. In such circumstances, an agent who invested time in communicating with a particular customer about various insurance options can further provide the option for that particular customer to consider such options (e.g., via the pURL displayed at the computing device 102) even after the call between the agent and the particular customer is terminated, and when the particular customer enrolls in one of the insurance options (e.g., presented at the customized landing page of the pURL for that customer), the system can readily recognize and credit that agent's role in the new enrollment of that customer (e.g., even if the agent is offline or otherwise not actively working with the particular customer at that time).

As an illustrative example, if the customer signs and pays for the insurance policy at their computing device 102, the executed policy can be transmitted from the computing device 102 to the insurtech provider 105. The insurtech provider 105 can then transmit the executed policy to an insurance provider computing system that provides the insurance plan under the executed policy. The computing device 102 can also transmit notification of the executed/paid for policy to the insurtech provider 105 so that the insurtech provider 105 can provide commission information and updated customer/client information to the agent at the agent computing device 104.

Using such pURL embodiments, the disclosed technology provides user-friendly interfaces and techniques for the customer to more readily and efficiently make decisions at their computing device 102 about enrolling in insurance plans or other insurance products with or without real-time communication with the agent. Moreover, if the agent is offline, once the agent toggles their activity status to being "online," the insurtech provider 105 can cause a GUI (e.g., accessible via the web or Internet) presented at the computing device 102 of the customer to be dynamically updated in real-time with a selectable option to contact the agent. Therefore, the customer can have real-time communication with the agent about the insurance plan they are viewing at the customer computing device 102. In fact, the customer and the agent can view the same information about the insurance plan in real-time at their respective computing devices 102 and 104. The customer can also continue to maintain autonomy and perform actions in response to the insurance plan (e.g., execute an insurance policy) at the customer computing device 102 even while the agent is online, the agent is viewing the same insurance plan at their computing device 104, and/or the customer is communicating with the agent (e.g., talking on the phone).

Still referring to FIG. 1C, the agent computing device 104 and the customer computing device 102 can communicate about an insurance plan or other insurance product (block A). For example, a data and/or call lead can be established between the agent and the customer. The customer can indicate that they would like to review/view/sign an insurance policy. The agent computing device 104 can transmit a notification (e.g., text message, email, or other type of notification) to the customer computing device 102 with the agent's pURL information. The notification can include a selectable link, such as a URL. The customer can select the link at their computing device 102, which triggers display of information about the insurance plan at the customer computing device 102. The information, which can include insurance plan quotes and/or plan quote comparisons, can be presented and accessible via the Internet or web at the computing device 102.

More particularly, the insurtech provider 105 can retrieve the information about the insurance plan from the insurance providers computing systems 114A-N (block B).

The insurtech provider 105 can then provide the retrieved information to be presented at the customer computing device 102 (block C). Optionally, the insurtech provider 105 can also provide the retrieved information to be presented at the agent computing device 104 in block C. As a result, the information about the insurance plan can be concurrently presented and viewed at both the customer computing device 102 and the agent computing device 104.

Once the information about the insurance plan is presented/outputted at the customer computing device 102, the customer computing device 102 can receive various user inputs from the customer. An example user input can include selection of an option to sign up for the insurance plan (e.g., enroll in the insurance plan). This user input can be transmitted from the customer computing device 102 to the insurtech provider 105 (block D). One or more other user inputs may also be received at the customer computing device 102, such as providing signatures of the customer, providing payment information for enrolling in the insurance plan, and/or providing any other information needed to enroll in the insurance plan. Advantageously, the pURL allows for the customer to have autonomy in what insurance plan they enroll in and what information they provide for enrollment. Therefore, the customer may not be required to go through the agent at the agent computing device 104 to enroll in an insurance plan of the customer's choosing. The customer can enroll in the insurance plan even when the agent's activity status is offline or the agent is otherwise unavailable to communicate with the customer.

Once the insurtech provider 105 receives the user input indicating that the customer has signed up for the insurance plan, the insurtech provider 105 can associate information about the customer and the signed insurance plan with the agent of the agent computing device 104 (block E). For example, the insurtech provider 105 can generate a customer contact profile for the customer and assign the customer to the agent as the agent's customer. The insurtech provider 105 can make this association, regardless of whether the agent was online when the customer signed up for the insurance plan and/or whether the agent assisted the customer in reviewing the information about the insurance plan and making the decision to enroll. The agent can be assigned the customer for one or many associations, which can include the fact that the agent accepted the lead for this customer, the agent provided this customer with the pURL, and/or the customer initiated communication with the agent.

The insurtech provider 105 can also provide the association information to the agent computing device 104 (block F). For example, the agent computing device 104 can output the customer contact profile for review by the agent. Additionally or alternatively, the agent computing device 104 can output information about the signed insurance plan. The agent computing device 104 can output any other information described in the below GUIs for the particular customer who enrolled in the insurance plan (e.g., reminders, activity, recorded calls).

In some implementations, the agent may toggle from offline activity status to online activity status at the agent computing device 104 (e.g., refer to FIGS. 2A-B and 5A-E) (block X). User input received at the agent computing device 104 indicating the agent's toggle of activity status can be transmitted to the insurtech provider 105.

When the agent changes their activity status, the insurtech provider 105 can provide information to the customer computing device 102 that causes the customer computing device 102 to present one or more features (or change presentation of those features) to contact the agent (block Y). For example, if the agent changes from offline to online status, the information provided to the customer computing device 102 can cause the customer computing device 102 to dynamically update a GUI currently outputted at the customer computing device 102 to include a selectable option, such as a button, to contact the agent. The customer can then provide user input to select the option, thereby causing a communication (e.g., phone call, text message, email) to be established between the customer and the agent so that the parties can discuss the insurance plan. As another example, if the agent changes their status from online to offline, the insurtech provider 105 can provide information to the customer computing device 102 that causes the contact option to indicate that the user is offline or otherwise unavailable. In some implementations, the contact option can be updated to be non-selectable for as long as the agent is offline. Sometimes, the information can cause the customer computing device 102 to dynamically update the current GUI by removing the contact option from the GUI. Sometimes, the information can cause the customer computing device 102 to dynamically update the current GUI by greying out the contact option and therefore making the contact option non-selectable. Regardless of the current activity status of the agent, the information about the insurance plan can continue to be presented/outputted at the customer computing device 102. The customer can also continue to maintain autonomy and provide one or more user inputs to interact with the information presented about the insurance plan (e.g., sign up for the insurance plan, provide payment information for the insurance plan).

Figure 1D:
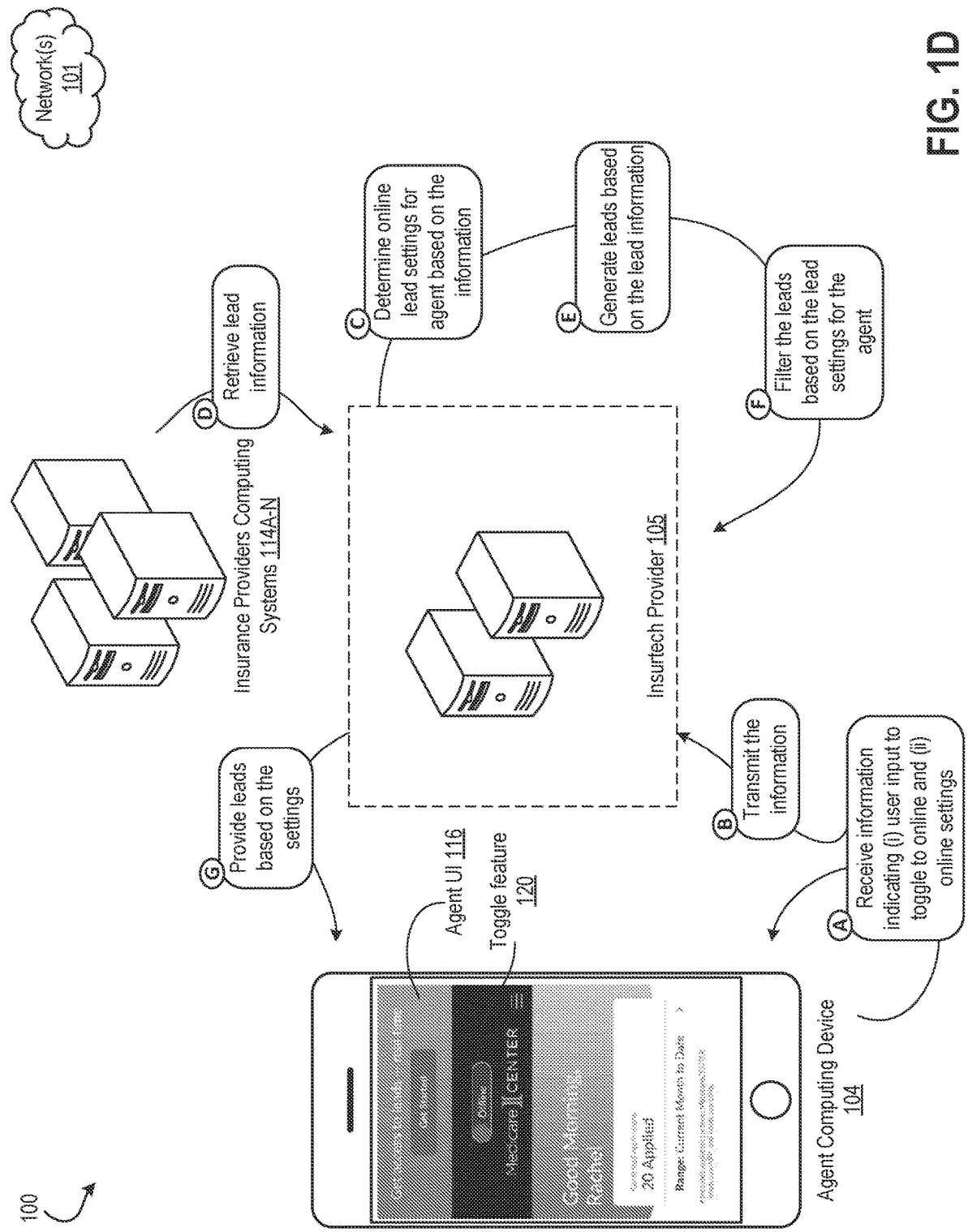

Referring to FIG. 1D, the computing environment 100 can be configured to provide for the insurance agent to toggle between being offline and online. As described herein, the agent can change their activity status from being offline to being online and vice versa. The agent can toggle between offline and online activity status using graphical elements presented in a GUI 116 at the agent computing device 104. For example, the GUI 116 can include a toggle feature 120, such as a button or slider. The agent can select/click on the toggle feature in the GUI 116 at the computing device 104 to change their activity status. Refer to FIGS. 2A-B and 5A-E for further discussion about the GUIs for toggling between offline and online activity status.

As shown in FIG. 1D, the agent computing device 104 can receive information indicating (i) user input to toggle to the online activity status and (ii) online settings (block A). The user input can be selecting or clicking on the toggle feature 120 presented in the GUI 116 at the computing device 104. The online settings can include information provided by the agent about what leads the agent would like to receive. For example, the agent can indicate what kind of leads they currently want to toggle on for (e.g., data, such as text and email, and/or phone leads). The agent can also indicate whether they would like to toggle on for different types of leads and/or pURL communications. In some implementations, the agent can indicate additional information, such as how many leads and an area or zip code where the agent wants the leads from when they set up a leads campaign through another service, such as a call center. Refer to FIGS. 5A-E for further discussion about the input that the agent provides in the GUIs presented at the agent computing device 104, the input being the agent's online settings. The information received in block A can be transmitted to the insurtech provider 105 in block B.

Using the information, the insurtech provider 105 can determine online lead settings for the agent (block C). The insurtech provider 105 can, for example, determine, based on the information, a lead provider from which to generate/filter leads for the agent. As another example, the insurtech provider 105 can determine, based on the information, how many leads to send to the agent and/or what type of leads to send to the agent (e.g., call leads, data leads such as emails, forms, and text messages).

Based on the lead settings, the insurtech provider can retrieve lead information in block D. The lead information can include contact information for customers having questions about insurance coverage/plans and/or seeking insurance coverage. The lead information can also include phone calls.

The insurtech provider 105 can generate one or more leads based on the lead information in block E. The insurtech provider 105 can continuously generate leads and/or generate leads at predetermined time periods (e.g., once every 24 hours, once every 32 hours, once every 48 hours, whenever new lead information becomes available). The insurtech provider 105 can generate the leads regardless of whether the agent toggled their activity status to online or other agents toggled their respective activity status to online. A lead can be generated once a customer called or filled out a form on a website to indicate that they want to talk to an agent based on landing on the website. A lead can also be generated if the customer interacted with a third party vendor and indicated that they desire to purchase insurance, then the vendor sold that lead to the insurtech provider 105.

The insurtech provider 105 can filter the generated leads based on the lead settings for the agent of the computing device 104 (block F). The insurtech provider 105 can identify a set of leads that match filtering criteria for the particular agent. The filtering criteria can be based on the lead settings for the agent. As an illustrative example, the agent can indicate what criteria must be met for the agent to receive a lead. If the criteria is met (e.g., data leads in a particular zip code indicated by the agent), then the lead can be delivered to the computing device 104 of that agent. Moreover, as described herein, when a lead comes in, the insurtech provider 105 can determine whether any agent has a campaign set up that matches information about the lead (e.g., the zip code), whether that agent has met their maximum number of lead requirements yet, and/or whether that agent has toggled to an online activity status. This information can be used to determine which agent to route the lead to.

As mentioned above, the lead that matches the filtering criteria (e.g., the campaign) for the particular agent can be provided to the agent computing device 104 based on the lead settings of the agent (block G). The leads can be provided to the agent computing device 104 at different times. For example, the agent computing device 104 can receive one lead at a time, with a threshold amount of time passing between each lead. As another example, the agent computing device 104 can receive multiple leads at a time, with a threshold amount of time passing between each multiple leads. As another example, the agent computing device 104 can receive all the filtered leads, then the agent computing device 104 can present one or more leads at a time or at other predetermined periods of time in the GUI 116.

When the agent clicks on the toggle feature 120 to toggle from the online activity status to the offline activity status, a notification indicating such change can be transmitted to the insurtech provider 105. The insurtech provider 105 can then stop generating, filtering, and/or providing leads to the agent computing device 104. The insurtech provider 105 can resume any one or more of generating, filtering, and/or providing the leads to the agent computing device 104 once the agent clicks on the toggle feature 120 to change their activity status to being online.

Figures 2A, 2B:
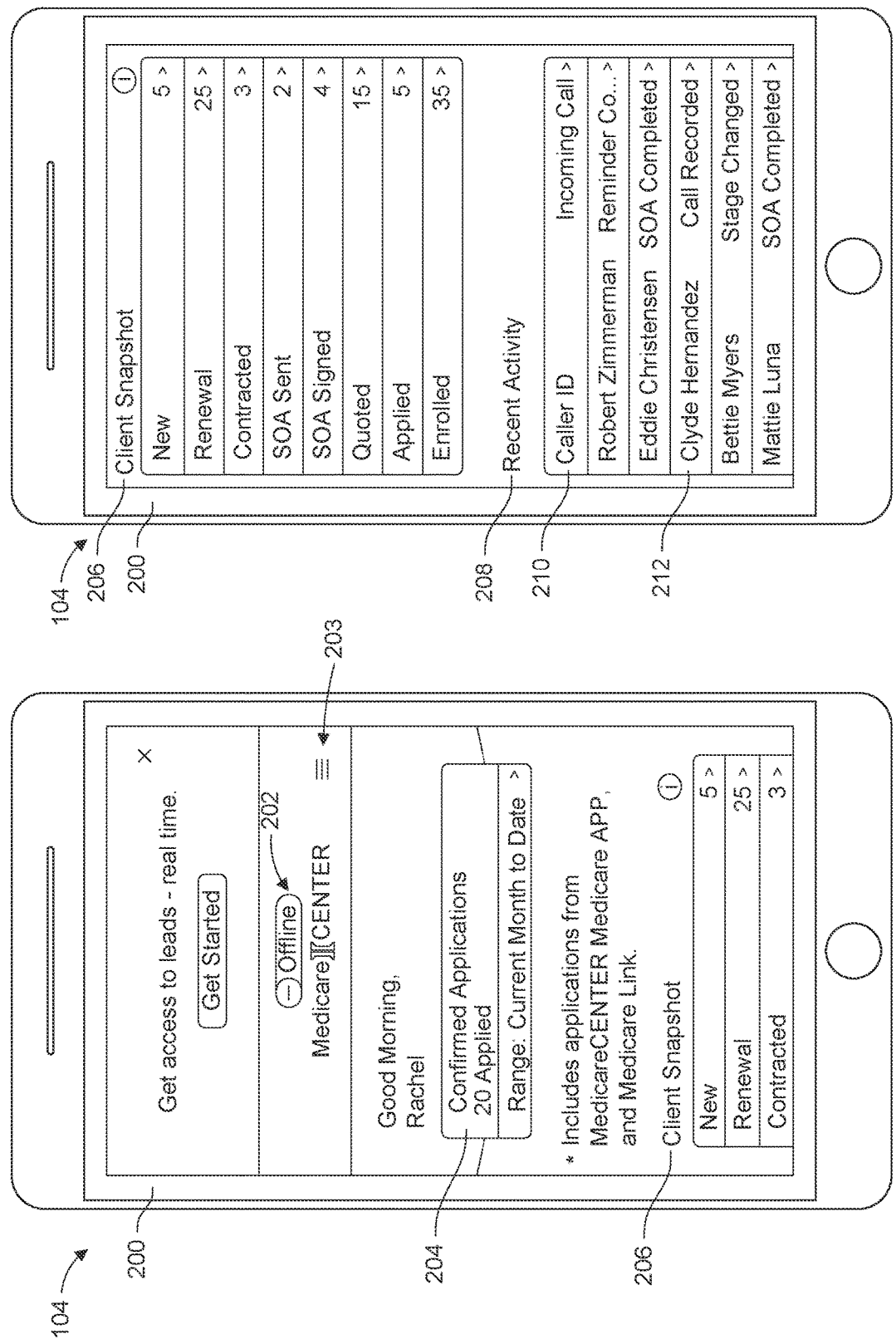
FIGS. 2A-B illustrate example GUIs for viewing tasks and activity at an agent computing device of FIGS. 1A-D.

FIGS. 2A-B illustrate example GUIs 200 for viewing tasks and activity at the agent computing device 104 of FIGS. 1A-D. The GUIs 200 can be presented in a mobile application, web interface, or other application at the agent computing device 104 described herein. The GUIs 200 can also be presented in a web interface of another type of computing device, such as a laptop, tablet, and/or computer. Referring to the GUIs 200 in both FIGS. 2A-B, the GUIs 200 can be a home screen or dashboard presented to the agent when they open the mobile application and log into their account at their computing device 104. The GUIs 200 can include an activity toggle feature 202, a selectable menu option 203, and fields 204, 206, and 208. The agent can view any of these graphical elements 202, 203, 204, 206, and 208 in the GUI 200 by scrolling up and down (in a vertical dimension) on a screen of their computing device 104.

The activity toggle feature 202 can be selected by the agent change their current activity status. As shown in FIG. 2A, the agent currently has an activity status of "offline." The agent can select or click on the activity toggle feature 202 to switch from being "offline" to being "online." Once the agent toggles to an activity status of "online," the agent can receive leads from one or more lead-providing services (e.g., the insurtech provider 105). In some embodiments, when the agent is "online," existing customers and/or potential customers of the agent may also see the status of the agent and have a selectable option, presented in one or more GUIs at their respective computing devices, to contact (e.g., call, message, text, email) the agent to discuss their current and/or potential insurance plan(s) with the agent.

The activity toggle feature 202 can advantageously be used to control the activity status of the agent across various platforms used by the agent in the mobile application and provided to the agent via the insurtech provider 105. In other words, the activity toggle feature 202 is a universal toggle that can be accessed from one GUI in one platform in order to uniformly affect the agent's activity status in all other connected platforms. The agent can control and field when and from where they receive leads as calls or data (e.g., emails, messages). As an illustrative example, an agent can sell both Medicare and life insurance. The agent can receive leads for Medicare through a first platform and leads for life insurance through a second platform. Selecting the activity toggle feature 202 to switch from "offline" to "online" can trigger the system (e.g., the insurtech provider 105) to notify systems/servers hosting both the first and second platforms to transmit Medicare leads and life insurance leads, respectively, to the agent computing device 104. Accordingly, the agent can field their leads for both platforms through a single control feature, thereby improving user-friendliness, efficiency, and intuitiveness of the mobile application described herein.

In some embodiments, the activity toggle feature 202 can control only whether and when new leads are transmitted to the agent computing device 104 by the one or more lead-providing services. In some embodiments, the activity toggle feature 202 can additionally or alternatively control whether a customer can contact (e.g., call) the agent. Additionally or alternatively, the activity toggle feature 202 can control whether the agent receives inbound calls (e.g., call leads) and/or inbound emails/messages (e.g., data leads), but may not affect the agent's ability to make outbound calls. For example, the agent's activity status can be "offline," meaning the agent will not receive any inbound call leads or data leads, but the agent can still make outbound calls/ messages to existing or potential customers. When the agent is offline, the lead may not be sent to the agent. Instead, the lead can be sent to a call center or rejected, depending on a lead source.

The activity toggle feature 202 can also be presented in a top portion of one or more other GUIs presented at the agent's computing device 104. Therefore, the agent can easily and quickly toggle their activity status from multiple different screens in the mobile application without having to navigate to a particular screen/GUI to change their activity status. Refer to FIGS. 5A-E for further discussion about the activity toggle feature 202.

The selectable menu option 203 can present multiple options for the agent to select from. For example, when the menu option 203 is selected, a pop-out window can be presented overlaying a portion of the GUI 200. The pop-out window can include options to view the home screen (e.g., the GUI 200), view the agent's contacts (refer to FIGS. 7-8), view/change/update the agent's account information, and/or sign out of their account on the mobile application. One or more other options can also be presented and selectable from the pop-out window.

The fields 204, 206, and 208 can present information about statuses of the agent's existing and potential customers as well as statuses of tasks assigned to the agent regarding these customers. The field 204, for example, can indicate information about "Confirmed Applications" associated with the agent. The field 204 can present information such as a number of confirmed insurance applications for the agent in a specified time period. The agent can also select, in the field 204, a range of time for which to display the total number of confirmed applications in the field 204. When the user makes a selection of the range of time, the information presented in the field 204 can be updated to reflect the number of confirmed applications during the user-selected range of time.

The field 206 can indicate information about a "Client Snapshot." The field 206 can display a total number of customers (e.g., clients) for the agent broken down by stage/status for the customers. This information can indicate, for example, how many new customers the agent received, how many customers renewed insurance plans with the agent, how many customers have been contracted, how many scope of appointment forms (SOAs) have been sent, how many SOAs have been signed, how many customers have been quoted, how many customers applied, and how many customers have enrolled. Additional or few information can also be presented in the field 206. Moreover, the agent can select any of the information presented in the field 206 to view additional information associated with the user's selection. In some embodiments, the agent can select from among the listings in the field 206 to cause the system to display a list of customers having the indicated stage/status. For example, selection of the SOA sent listing in the field 206 can cause the system to show a card view or list view of customers having a status of SOA sent.

The field 208 includes listings of recent activities performed by the agent or by customers of the agent. More particularly, the field 208 shows recent activity related to all customers (e.g., clients, contacts) of the agent. When the agent performs actions with respect to a customer (such as enrolling the customer in a plan or sending an SOA to the client), the activity field 208 is automatically updated by the system to include a new listing for the new activity. In some embodiments, actions by the customer also may cause new activity listings to be automatically generated and displayed in the field 208. For example, when the system detects that the customer has signed an SOA, the system can generate a new activity listing in the activity field 208 indicating that the customer has signed the SOA.

The field 208 includes a number of listings showing recent activity for the agent that can include, but are not limited to, incoming call, reminder, SOA completed, call recorded, stage changed, SOA sent, SOA signed, enrollment application declined, enrollment application accepted, quote sent, renewed Medicare plan, recently added, contacted, etc. Each listing includes the name of the customer for the activity. Each listing can also be user-selectable so that the agent can select to take a next action for the customer. The next suggested action can be automatically identified by the system based on the current status/stage of the customer and/or the most recent activity for the customer.

For example, a first selectable listing 210 in the activity field 208 shows that the agent is receiving an incoming call from "Caller ID." "Caller ID" indicates that the customer is not yet a known/saved contact or client of the agent. Selecting the listing 210 causes a new GUI to be presented at the computing device 104, such as GUI 300 described further below in FIG. 3. In the GUI 300, the agent can take one or more next actions with regards to responding to the incoming call by the customer identified with "Caller ID."

As another example, another selectable listing 212 in the activity field 208 shows that a call was recorded for the customer "Clyde Hernandez." Selecting the listing 210 causes a new GUI to be presented at the computing device 104, such as described further below in FIG. 6. In the new GUI that is displayed, the agent can take one or more next actions, such as listening to the recording, downloading the recording, and/or inputting notes/comments about the call.

As other examples, if a selectable listing indicates that an SOA was signed, the agent can select that listing to view the signed SOA. Selecting some of the listings in the field 208 may also cause a profile associated with the customer in the listing to be presented in a GUI at the computing device 104. Sometimes, selecting a listing in the field 208 can cause the system to display, in another GUI, a quote that was sent to the associated customer. In some embodiments, the agent can select the name of any of the displayed customers in the activity field 208 to cause the system to display the profile for the selected customer in another GUI at the computing device 104.

Figure 3:
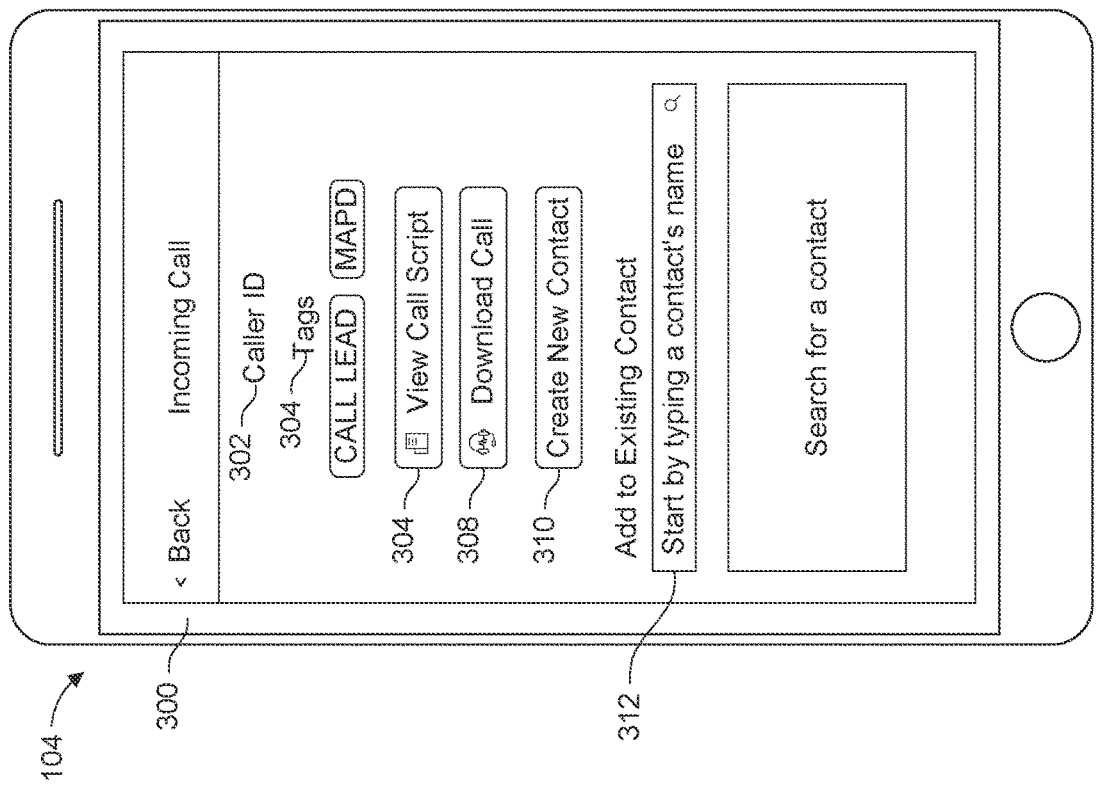
FIG. 3 is an example GUI for an incoming call at an agent computing device of FIGS. 1A-D.

FIG. 3 is an example GUI 300 for an incoming call at the agent computing device 104 of FIGS. 1A-D. The GUI 300 can be presented in a mobile application, web interface, or other application at the agent computing device 104 described herein. The GUI 300 can also be presented in a web interface of another type of computing device, such as a laptop, tablet, and/or computer. As described above in reference to FIGS. 2A-B, the agent can select a listing (e.g., the listing 210) in the activity field 208 of the GUI 200 that indicates "Incoming Call." Selecting that listing can cause the system to display the GUI 300 of FIG. 3. The GUI 300 can also be presented at the computing device 104 during a call and/or in response to the agent picking up/accepting a call at their computing device 104.

The GUI 300 can include a text field 302, field 304, selectable options (e.g., buttons) 306, 308, and 310, and a search function 312. Additional or fewer graphical elements may be included in the GUI 300. The text field 302 can indicate a name of the customer. Here, the customer is not yet associated with a contact of the agent. Therefore, the text field 302 indicates "Caller ID." Optionally, the agent can click on or select the text field 302 to create a contact with the customer's information and/or associate the "Caller ID" with an existing contact of the agent. Once a contact has been created and/or updated, the incoming call can be associated with the particular contact rather than "Caller ID." Therefore, the system can update the text field 302 to indicate a name of the customer associated with the particular contact.

Figure 10:
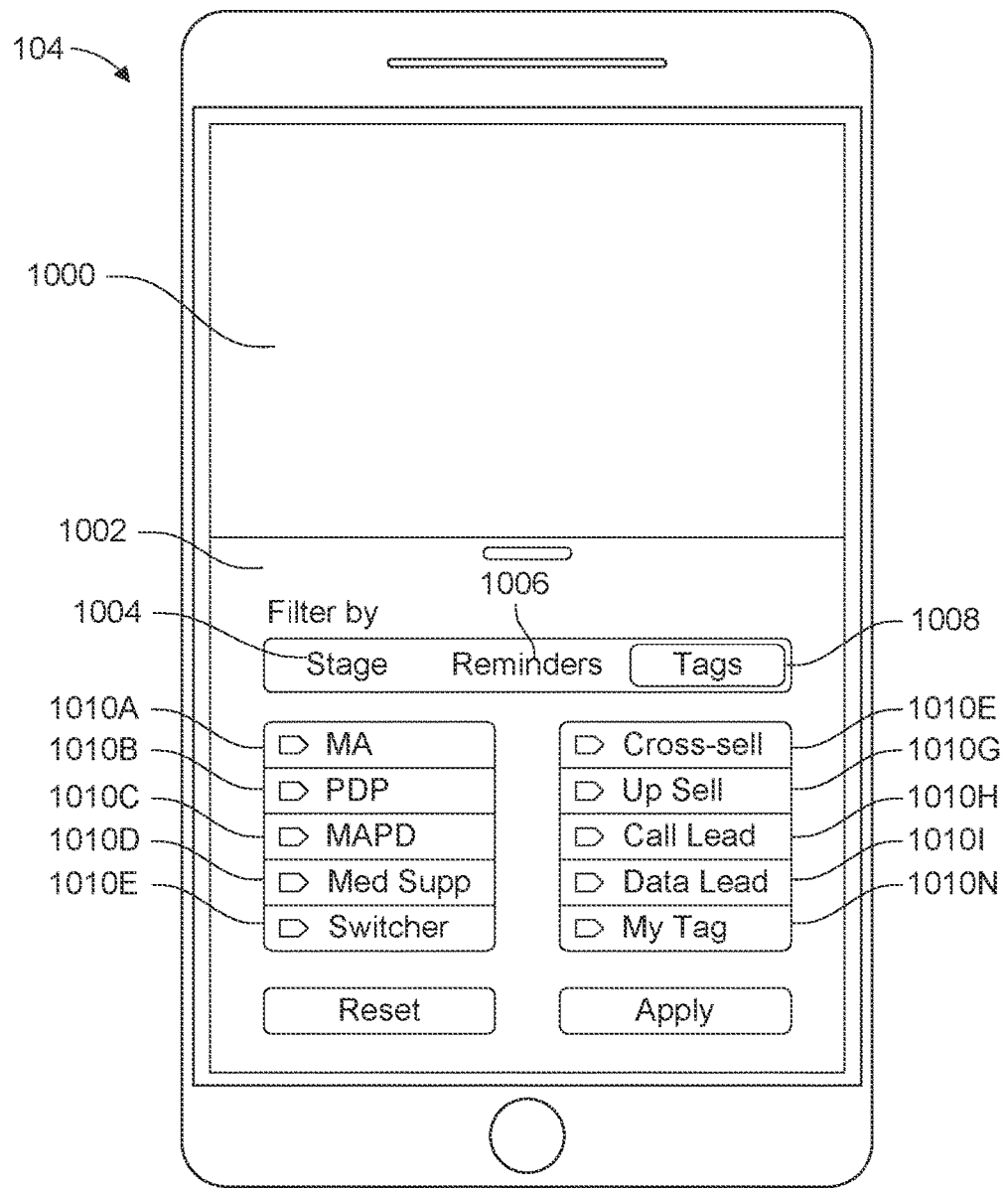
FIG. 10 is an example pop-out window for filtering customer information according to tags while using computing device within the system of FIGS. 1A-D.

The field 304 can indicate one or more tags that have been assigned to the particular customer associated with "Caller ID." The tags can be manually assigned by the agent. For example, the agent can click on or select the field 304 to cause the system to display another GUI or a pop-out window. The another GUI and/or pop-out window can present options for the agent to assign and/or generate one or more tags to associate with the particular contact. The system can also automatically assign tags to the particular contact. The system can employ artificial intelligence (AI) or other automated analysis techniques to assess information about the particular contact (e.g., a recorded call, current insurance plan information, pending application, inquiries, SOAs) and determine appropriate tags for the contact. Any of the tags assigned to the contact can be presented in the field 304. Refer to FIG. 10 for further discussion about tagging a contact.

The option 306 can be selected to view a call script. Selecting the option 306 can cause the system to present pop-out window 402 shown and described below in FIG. 4. The agent may be required to recite a specific script at the beginning of each call, whether the call is with an existing customer or a potential customer. Therefore, the option 306 can be presented to the agent in the GUI 300 when the agent is on a call or accepting a call. This provides ease of access to quickly view and recite the script, thereby increasing likelihood of compliance with the relevant regulatory requirements.

The option 308 can be selected to view and download a recording of the call. Selecting the option 308 can cause a pop-out window 600 shown and described in FIG. 6 to be presented overlaying at least a portion of the GUI 300.

The option 310 can be selected to create a new contact for the "Caller ID." Selecting the option 310 can cause the system to display another GUI at the computing device 104. The another GUI can include input fields that the agent can complete to create the new contact. Upon saving the new contact information, the system can automatically update the text field 302 to indicate a name of the contact, as inputted by the agent when creating the new contact.

The search function 312 can receive input from the agent to search existing contacts of the agent. For example, the agent can input, into the search function 312, text such as a first or last name of a contact. The system can automatically search a data repository or other data storing system for the inputted text, as the text is being inputted into the search function 312. Therefore, the system can populate, in real-time, the search function 312 with one or more search results. The agent can then select any of the returned search results to view contact information and/or associate the "Caller ID" with the selected contact.

Figure 4:
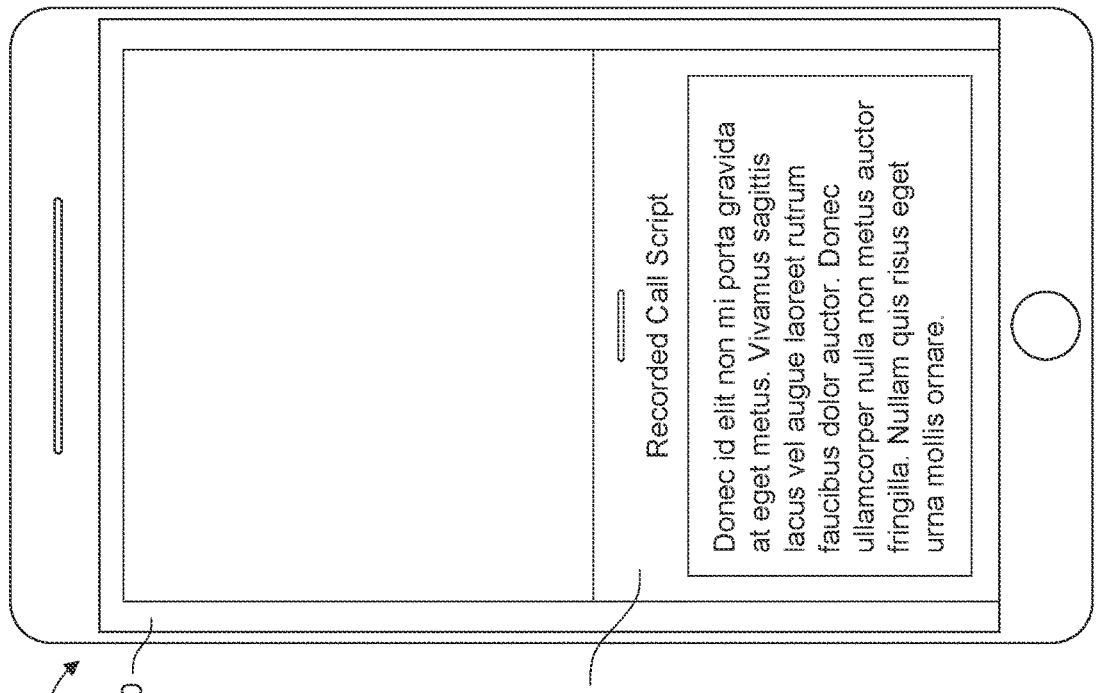
FIG. 4 is an example GUI for a call script at an agent computing device of FIGS. 1A-D.

FIG. 4 is an example GUI 400 for a call script at the agent computing device 104 of FIGS. 1A-D. The GUI 400 can be presented in a mobile application, web interface, or other application at the agent computing device 104 described herein. The GUI 400 can also be presented in a web interface of another type of computing device, such as a laptop, tablet, and/or computer.

More particularly, a pop-out window 402 can be presented in one or more of the GUIs described herein, for example, when the agent is on a call with a customer and needs to recite a particular call script. As described in reference to FIG. 3, the agent can select an option to view the call script (e.g., the option 306 in FIG. 3) from a GUI (e.g., the GUI 300). Selecting the option causes the system to display the pop-out window 402 over at least a portion of the current GUI that the agent is viewing at their computing device 104. Therefore, the GUI 400 can indicate any of the GUIs that the agent can currently be viewing at their computing device 104 (such as the GUI 300 in FIG. 3).

The pop-out window 402 can include the call script, which the agent may be required to recite during a call. The agent can also close the pop-out window 402 by sliding down on the pop-out window 402. This input can cause the system to automatically slide the pop-out window 402 down towards a bottom of a screen of the computing device 104 until the pop-out window 402 is no longer visible. In some embodiments, the pop-out window 402 may also have a selectable option (e.g., a button, an "x") that, when selected/clicked on by the agent, causes the system to close or otherwise remove the pop-out window 402 from being displayed over the portion of the GUI 400 (or whatever GUI the agent is currently viewing at their computing device 104).

In some embodiments, when the pop-out window 402 is displayed, the GUI 400 can be displayed in lower brighter settings than the pop-out window 402. Sometimes, for example, a semi-transparent grey, black, or other dark overlay can be presented over the GUI 400 such that the pop-out window 402 is a center of focus of the agent. When the pop-out window 402 is closed or otherwise removed from the display by the system, the GUI 400 can be automatically returned, by the system, to its full brightness settings (or the semi-transparent overlay can be automatically removed from the GUI 400).

FIGS. 5A-E are example pop-out windows for toggling between an offline status and an online status at the agent computing device 104 of FIGS. 1A-D. The pop-out windows can be presented in a mobile application, web interface, or other application at the agent computing device 104 described herein. The pop-out windows can also be presented in a web interface of another type of computing device, such as a laptop, tablet, and/or computer.

The pop-out windows can be displayed, by the system (e.g., insurtech provider 105) as visually overlaying one or more of the GUIs described herein. For example, the pop-out windows described in FIGS. 5A-E are shown as visually overlaying the GUI 200 of FIGS. 2A-B. The pop-out windows of FIGS. 5A-E can also visually overlay any other GUIs that present the activity toggle feature 202 described in reference to FIGS. 2A-B.

Figure 5B:
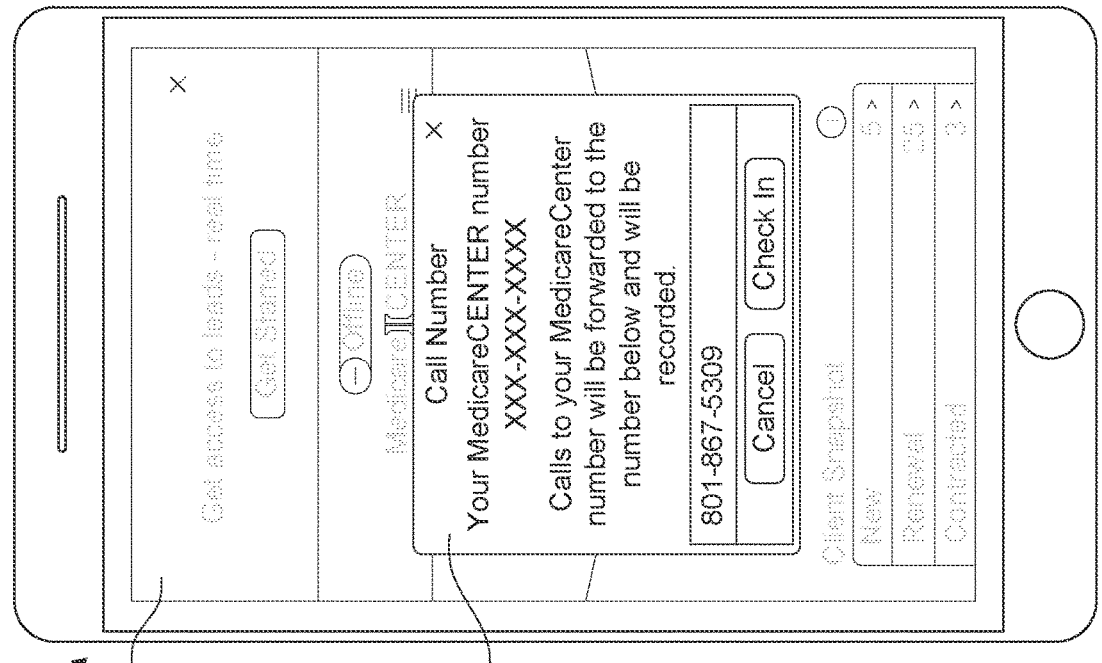
Figure 5A:
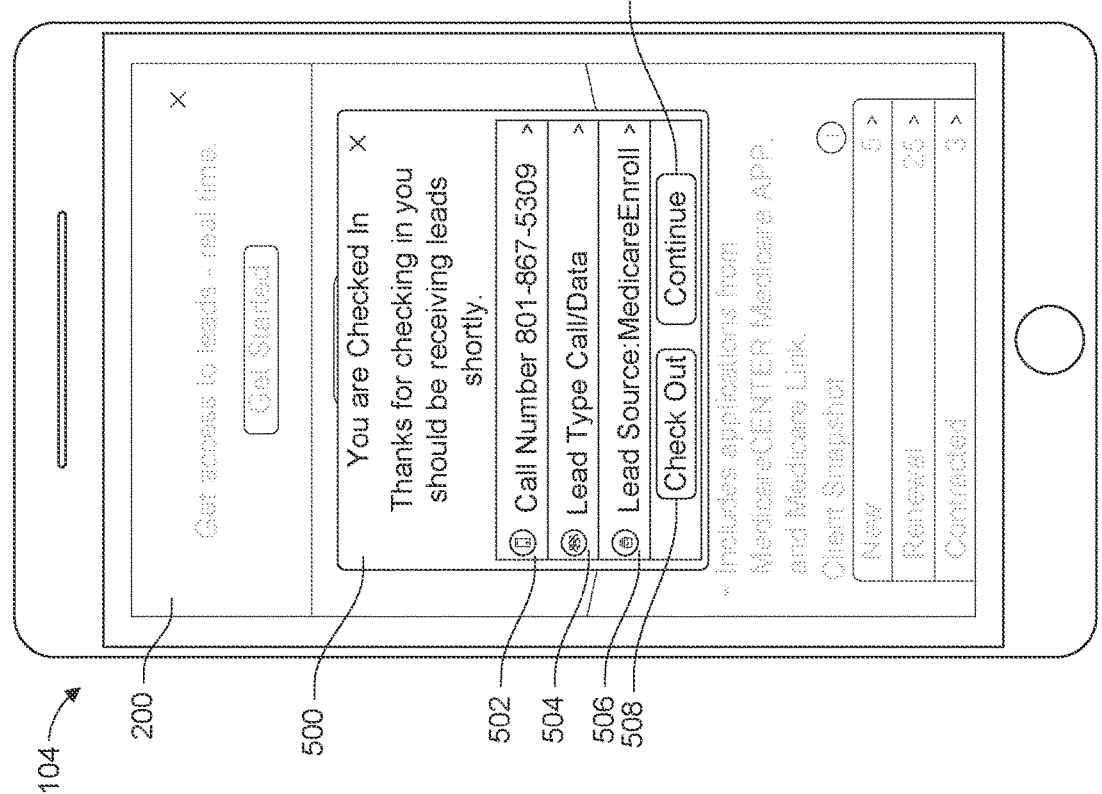

Referring to FIG. 5A, in response to selecting (e.g., clicking on) the activity toggle feature 202 in the GUI 200 of FIGS. 2A-B, the system can display pop-out window 500. The pop-out window 500 can visually overlay a portion of the GUI 200. The pop-out window 500 displays information about the activity status of the agent. For example, the agent can select the activity toggle feature 202 in the GUI 200 to switch from an "offline" activity status to an "online" activity status. This user-selection can cause the system to display the pop-out window 500 with information indicating that the agent is now checked in (e.g., the agent is online) and that the agent will begin receiving leads. In response to the user-selection of the activity toggle feature 202, the system can also transmit a notification to one or more computing systems and/or servers indicating that the activity status of the agent has changed and that the computing systems and/or servers can begin transmitting leads to the agent computing device 104. More particularly, the notification can include instructions indicating what type(s) of leads to transmit to the agent computing device 104. The type(s) of leads can be determined by the agent at their computing device 104, using one or more of the fields outputted in the pop-out window 500 and the other pop-out windows described in FIGS. 5A-E.

The pop-out window 500 can include selectable fields 502, 504, and 506 from which the agent can view, update, and/or establish settings associated with their "online" activity status. Any selections/inputs made by the agent in the mobile application at the computing device 104 can then be transmitted to the system (e.g., the insurtech provider 105) to update the agent's working preferences and initiate communications (e.g., finding and/or sending of leads to the agent's computing device 104) with other systems/servers described herein.

The field 502 can provide information about the agent's phone number, which can be used for receiving leads and calling or otherwise contacting customers. The field 502 can also include information about a recording phone number, which can be used by the system to automatically route a call to a call recording service. Selecting the field 502 can cause the system to display another pop-out window, as described further in reference to FIG. 5B.

The field 504 provides information about one or more types of leads that the agent selected. Selecting the field 504 causes the system to display another pop-out window, as described further in reference to FIG. 5C.

The field 506 provides information about one or more lead sources that the agent selected. Selecting the field 506 causes the system to display another pop-out window, as described further in reference to FIG. 5D.

As described herein, the agent can select one or more options for any of the fields 502, 504, and 506 in order to define what leads the agent receives when their activity status is "online." The agent can make these selections and/or update their selections whenever they desire and/or as frequently as they desire. Thus, the system can use the user-inputted information for each of the fields 502, 504, and 506 to determine which lead-service providers to transmit notifications to when the agent is "online," and to determine what information/leads should be provided by those lead-service providers to the agent when the agent is online.

The pop-out window 500 also can present controls 508 and 510. The controls can be selectable buttons, for example. The control 508 can provide the agent with an option to "Check out." Checking out indicates that the user is changing their activity status from "online" to "offline." Thus, selection of the control 508 causes the system to update the agent's activity status to "offline" and send a notification to lead-service providers indicating that the agent should no longer receive leads. The notification can include instructions to stop transmitting the leads to the agent computing device 104.

The control 510 can provide the agent with an option to "Continue" with the check in process. Selecting the control 510 can cause the system to update the activity status of the agent from "offline" to "online." Selecting the control 510 can also cause the system to transmit a notification to the lead-service providers defined by the agent in the field 506 indicating that the agent is now online and ready to receive leads based on the lead type defined by the agent in the field 504.

FIG. 5B illustrates pop-out window 512, which can be displayed, by the system, as a result of the agent selecting the field 502 in the pop-out window 500 of FIG. 5A. The pop-out window 512 provides information about the agent's call number used for receiving call leads. The agent can provide their call number to existing and potential customers to contact the agent. The agent's call number can also be made available online or on other platforms or otherwise provided to customers to that they can contact the agent. The pop-out window 512 can also include information about a recording call number, which is used by the system to route any inbound or outbound calls to a call recording service. The call recording service, as described herein, can record and store the calls. The agent's call number is linked to/embedded with the recording call number. Therefore, whenever the call number is used (e.g., in a customer-initiated call or an agent-initiated call), the system is automatically triggered to route the call, via the recording call number embedded in the call number, to the call recorded service. As a result, every insurance-related call can be automatically recorded and stored.

FIG. 5C illustrates pop-out window 514, which can be displayed, by the system, as a result of the agent selecting the field 504 in the pop-out window 500 of FIG. 5A. The pop-out window 514 provides information about one or more lead types that the agent can select. The agent can select a call leads field 516 and/or a data leads field 518. Therefore, the agent can determine and select whether they would like to receive leads that are calls from lead-service providers and/or leads that are emails or messages from lead-service providers. Selecting either of the fields 516 and 518 causes the system to update the agent's lead preferences (which can be stored in a data repository, for example) and transmit the updated lead preferences to one or more lead-service providers when the agent's activity status is set to "online."

FIG. 5D illustrates pop-out window 520, which can be displayed, by the system, as a result of the agent selecting the field 506 in the pop-out window 500 of FIG. 5A. The pop-out window 520 provides information about one or more lead sources that the agent can select. The agent can select field 522 and/or 524. Each of the fields 522 and 524 can represent a different lead-source provider and/or platform for generating, aggregating, identifying, and/or providing leads to the agent.

In the example of FIG. 5D, the field 522 represents "LeadCENTER" and the field 524 represents "MedicareEnroll pURL." Selecting the field 522 causes the system to transmit a notification to the lead-service provider for "LeadCENTER" indicating that the agent would like to receive leads from "LeadCENTER" when the agent is online. Selecting the field 524 causes the system to transmit a notification to the lead-service provider for "MedicareEnroll pURL" indicating that the agent would like to receive leads from this platform when the agent is online (the agent may therefore receive leads specific to Medicare). The fields 522 and 524 can also represent one or more other platforms and/or lead-service providers that are supported by and offered via the mobile application of the insurtech provider 105.

In some embodiments, a control 526 can be presented along with one or more of the fields 522 and 524. The control 526 can be selectable and can provide the agent with the functionality to set up a lead campaign with the platform indicated by the respective field 522 or 524. Selecting the control 526 can cause the system to display another GUI or pop-out window at the computing device 104 with input fields and selectable options for the agent to set up a lead campaign. In the lead campaign, the agent can select and/or establish how many leads they would like to receive, a frequency of receiving the leads, geographic locations that leads should originate from, etc. As an illustrative example, the agent can set up a lead campaign with "LeadCENTER" in which the agent receives up to 10 calls while the agent's status is "online," in which those calls originate from a particular zip code in a state where the agent is licensed.

FIG. 5E illustrates pop-out window 530, which can be displayed, by the system, as a result of the agent selecting the control 508 in the pop-out window 500 of FIG. 5A. The pop-out window 530 provides information indicating that the agent has checked out. Selecting the control 508 causes the system to update the agent's activity status from "online" to "offline." As a result, the system can also transmit a notification to the lead-service providers described herein indicating that the agent is now offline and leads should no longer be sent to the agent. Here, the pop-out window 500 indicates that the agent is now offline and that they will no longer receive leads until they toggle their activity status to "online" using the activity toggle feature 202 described in reference to FIGS. 2A-B.

FIG. 6 is an example pop-out window 600 displayed in a GUI, such as the GUI 200, for viewing call information at the agent computing device 104 of FIGS. 1A-D. As described in reference to FIGS. 2A-B, when the agent selects a listing in the activity field 208 that indicates "Call recorded," the system can automatically display the pop-out window 600 visually overlaying at least a portion of the GUI 200. The pop-out window 600 can also be presented to visually overlay one or more other GUIs, such as the GUI 300 in FIG. 3, in response to the agent selecting the option 308 to download the call. Moreover, as shown in FIG. 6, when the pop-out window 600 is displayed, the system can automatically present the GUI 200 (or other GUI as mentioned above) in a brightness setting that is less than a brightness of the pop-out window 600. For example, the GUI 200 can be displayed with a semi-transparent black, grey, or other dark overlay, which can advantageously attract the agent's attention to information presented in the pop-out window 600. When the agent selects an option (e.g., button, "x") to close the pop-out window 600, the brightness setting of and/or the visual overlay on the GUI 200 can be returned to settings before the pop-out window 600 was displayed.

The threshold amount of time, for example, can be 10 years. One or more other threshold amounts of time can be established and used for purposes of maintaining the stored calls. The system can implement telephony and other computing techniques/systems, as described in reference to FIG. 1B, to route sales calls to another phone number that allows for the calls to be recorded and then stored in a data repository or other call memory. The recorded call can then be archived and retrievable for the threshold amount of time. Once the threshold amount of time ends, the system can remove or otherwise delete the recorded call from the data repository. Refer to FIG. 1B for further discussion about recording and storing the calls.

The pop-out window 600 can present information about a particular call that was recorded. For example, the pop-out window 600 can include a name of the customer, client, or customer. In some embodiments, the name can be "Caller ID" if the call is not associated with any contact of the agent. The pop-out window 600 can also include information indicating when the call was made and/or recorded. The pop-out window 600 can include a selectable option 602 to download the call that was recorded. The pop-out window 600 can also include information indicating what phone number the call was routed through in order to be recorded. The pop-out window can include an activity field 604, in which the agent can input text describing the call or any other notes the agent may have about the call. The pop-out window 600 can also include a selectable option 606 to save and close any changes/additions made in the pop-out window 600. Selecting the option 606 can cause the pop-out window 600 to be closed. Selecting the option 606 can also cause the system to save the information in the pop-out window 600 with a particular contact associated with the call. The information can be saved in a data repository described throughout this disclosure.

Figure 7A:
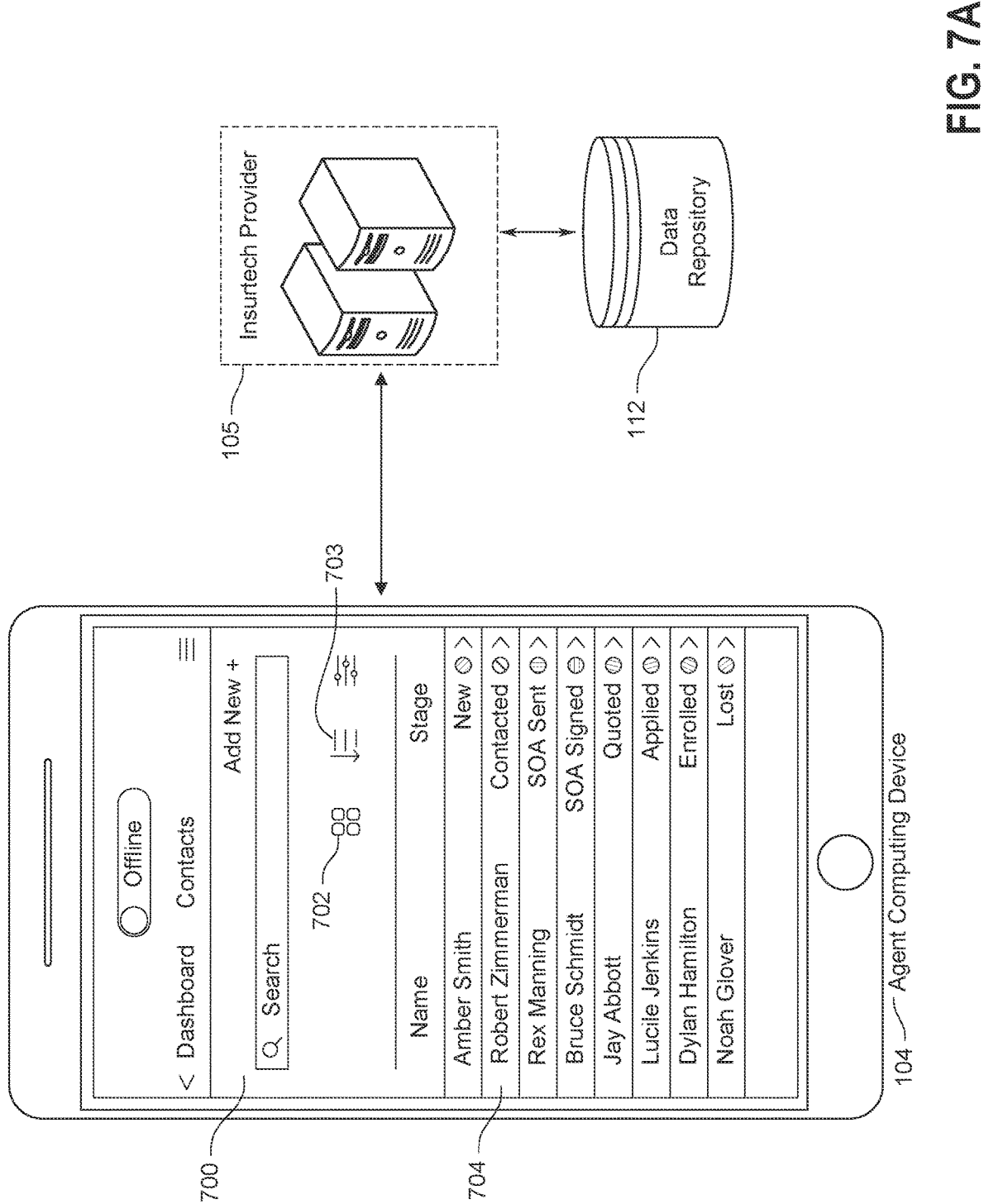
FIG. 7A is an example GUI displaying customer contacts in a list view at a computing device within the system of FIGS. 1A-D.

FIG. 7A is an example GUI 700 displaying customer contacts in a list view at a computing device within the system of FIGS. 1A-D. The GUI 700 can be displayed in response to the agent selecting a menu option to view their contacts. The menu option can be selected from the menu option 203 in FIGS. 2A-B, for example. The GUI 700 can also be displayed in response to the user selecting one or more other options presented in one or more other GUIs to view the agent's customer contacts.

The GUI 700 can be presented in a mobile application, web interface, or other application at the agent computing device 104 described herein. The GUI 700 can also be presented in a web interface of another type of computing device, such as a laptop, tablet, and/or computer.

Moreover, FIG. 7A shows the agent computing device 104 communicating with at least the insurtech provider 105 (refer to FIG. 1A). The insurtech provider 105 can provide the GUIs described throughout this disclosure to the computing device 104 for providing beneficial information to the agent, eliciting input from the agent, facilitating communications between the agent's computing device 104 and one or more devices of customers, and automatically identifying relevant insurance policy products based on information associated with a specific user. The insurtech provider 105 can have access to one or more data repositories 112 of information. The insurtech provider 105 can, for example, store customer information in the data repository 112 and then retrieve the customer information based on requests received from the computing device 104. For example, the insurtech provider 105 can retrieve the customer contacts from the data repository 112 and present the customer contacts in the GUI 700 at the computing device 104. The insurtech provider 105 can also automatically update information in the data repository 112 based on detected interactions of the agent and/or the customer with their respective computing devices and based on communications between the computing device 104 of the agent and computing devices of customers. Although communication between the computing device 104 and the insurtech provider 105 is described in reference to presenting the GUI 700, the same or similar communication can also be established to present any of the other GUIs described herein.

In the example shown in FIG. 7A, the GUI 700 displays a number of customer listings for the agent in a list view. The agent can select option 702 to switch from a list view to a card view. The card view is depicted and described in reference to FIG. 7B. Each customer listing can include a name of the customer and a current stage (e.g., status) for engagement activity/interaction between the agent and the customer. The stage can be visually represented with text and/or a graphical element represented in an indicia. The text can include, but is not limited to, "New" (e.g., for newly added customers), "Contacted" (e.g., agent has contacted the customer but the customer has not yet signed an electronic SOA form), "SOA Sent," "SOA Signed," "Quoted" (e.g., one or more insurance product plan quotes have been sent to the customer), "Applied" (e.g., the customer has applied for an insurance product plan or other product), "Enrolled" (e.g., customer is currently enrolled in a plan), and "Lost" (e.g., the customer has switched to another agent, the customer moved out of the country, the customer is deceased). The "Lost" status designation allows the agent to retain information for the customer while indicating that the customer is not currently an active customer (e.g., the agent does not have to delete the listing for the customer even though the customer is no longer an active customer). One or more other text can be used to indicate a current stage of activity/interaction with the customer. The graphical element can be a circle. The indicia can be a color. Each type of stage can correspond to a different indicia (e.g., a different color circle).

The agent can select any of the customer listings to cause the system to display another GUI with information about the selected customer. For example, selecting a customer listing 704 can cause the system to display GUI 800 (e.g., refer to FIG. 8A-C), or a profile associated with the selected customer.

In some embodiments, the GUI 700 can present additional or different information for each of the customer listings. For example, each customer listing can include a next reminder data, a preferred primary contact method, and/or one or more selectable controls/options to view, modify, and/or change information about the particular customer. The GUI 700 can also include a control 703 to sort the customer listings presented therein. Selecting the sort control 703 can, for example, cause a dropdown menu to be displayed that allows the agent to sort or filter the customer listings according to various selection criteria. This can include sorting or filtering by name, geography, product types of interest, status, follow-up date (e.g., listing customers in order of the next follow up reminder set for that customer), date the contact was added to the system, or any of the other fields for information for the customer or other criteria established by the agent or by the system. For example, the agent can sort the customer listings based on tags that have been assigned to the contacts (e.g., by the agent and/or automatically by the system).

Figure 7B:
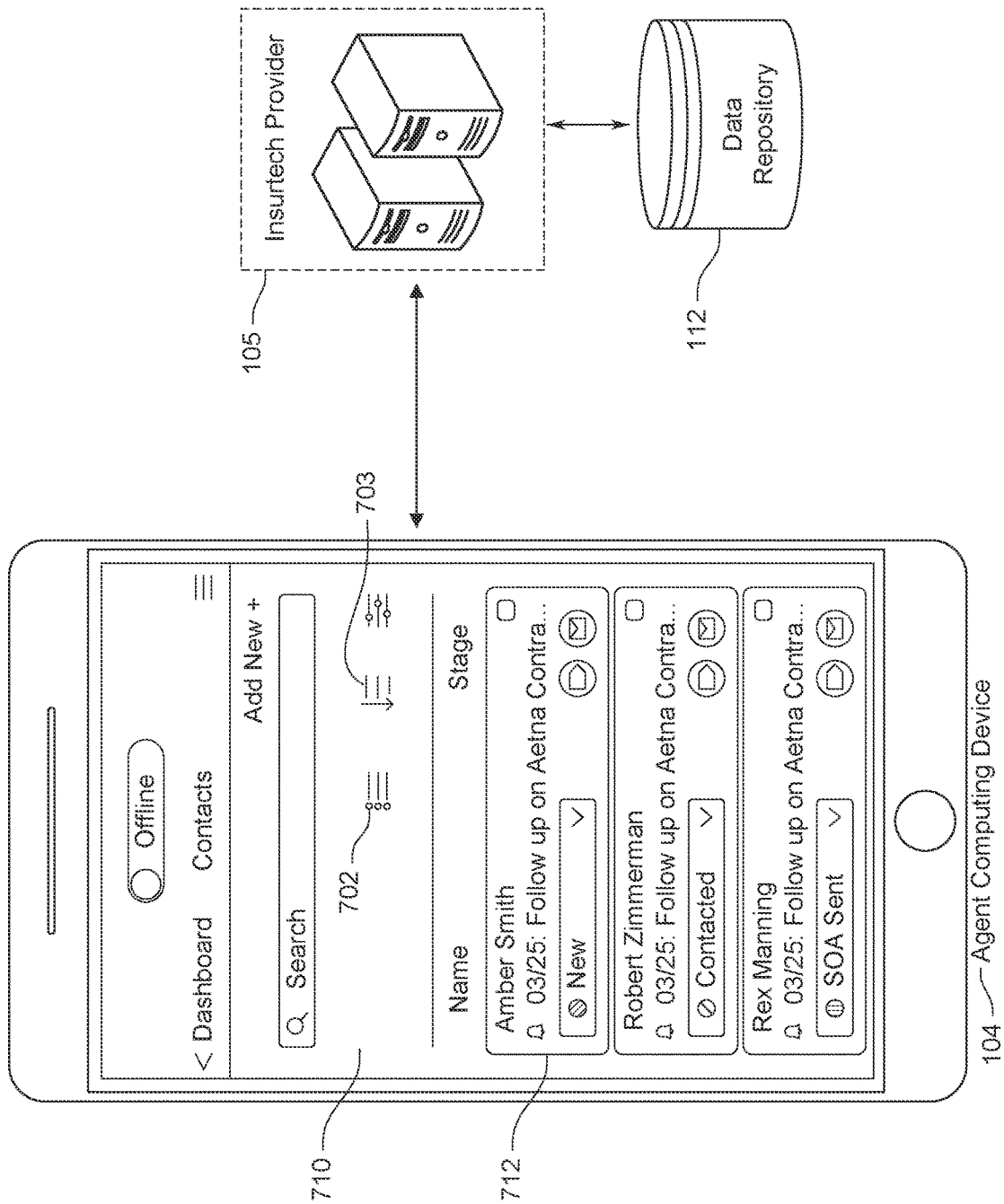
FIG. 7B is an example GUI displaying the customer contacts of FIG. 7A in a card view.

FIG. 7B is an example GUI 710 displaying the customer contacts of FIG. 7A in a card view. The GUI 710 can be displayed at the agent computing device 104 similarly to the GUI 700 described in FIG. 7A. Moreover, the GUI 710 can be displayed at the computing device 104 in response to the agent selecting the option 702 presented in the GUI 700 to view the customer contacts in the card view instead of the list view. In the GUI 710, the agent can also select the option 702 to toggle from viewing the customer contacts in the card view in the GUI 710 to the list view in the GUI 700. The agent can also select the sorting control 703 in the GUI 710 in order to cause the insurtech provider 105 to update a sort or filter of the customer contacts displayed in the GUI 710.

The GUI 710 can be presented in a mobile application, web interface, or other application at the agent computing device 104 described herein. The GUI 710 can also be presented in a web interface of another type of computing device, such as a laptop, tablet, and/or computer.

In the example GUI 710 of FIG. 7B, the customer listings described in FIG. 7A are shown in the card view. Each customer card displayed in the GUI 710 includes information about the customer, including the customer's first and last name, current stage (e.g., status), contact information (such as phone number, email address, etc.) and a date indicating when the agent should next follow up with the customer or when a reminder has been set for the customer. The agent can select an option presented in a card to edit information about the customer. The agent can also select a particular card to cause the system to display additional detailed information about the selected customer. For example, selection of the card can cause the insurtech provider 105 to present the GUI 800 (e.g., refer to FIGS. 8A-C) at the computing device 104. Selection of the card can also cause the insurtech provider 105 to present additional information about the customer in a pop-out window or other GUI, the additional information including but not limited to address, customer preferences, SOA information, insurance products or other products that the customer is interested in, a profile picture for the customer, the information included in the customer card, and/or any other relevant information about the customer.

In the GUI 710, a first contact card 712 includes information for a customer (or potential customer) named "Amber Smith." In the card view, the contact card 712 displays information for Amber Smith including a stage or status of "new," a next reminder date of March 25$^{th}$, a selectable option to add tags to the customer's contact, and a selectable option to contact the customer via their preferred primary contact method (e.g., email). In this example, the status of "new" indicates that Amber Smith is a new contact that the agent has not yet contacted. For example, the agent may have just added information about Amber Smith to the insurtech provider 105, which in turn is stored by the insurtech provider 105 in a customer profile for Amber Smith in the data repository 112. The reminder date indicates that the next reminder for this contact is scheduled for March 25$^{th}$ and that the agent has to follow up with Amber Smith about an Aetna contract. In some embodiments, the displayed next reminder date can be a user-selectable control. The agent can select the next reminder date to perform one or more actions related to the reminder set for the customer. For example, selection of the next reminder date can cause a pop-up window to be displayed, or a new GUI to be displayed, that allows the agent to change the reminder date, add additional details to the reminder date, delete the reminder date (e.g., because the agent has completed a task associated with the reminder), mark the activity associated with the reminder date as being completed, and/or add additional reminder dates (e.g., for multiple additional tasks that need to be completed with respect to the customer associated with the contact card 712).

In some embodiments, a reminder may not be set for a customer. The agent can then add reminders for the customer. For example, the agent can add a new reminder for a date prior to expiration of the customer's current coverage plan to contact the customer to discuss policy renewal or policy updating. As another example, the agent can set a reminder for a date (such as two weeks out) to follow up with a customer regarding a sent electronic SOA form that has not yet been signed/returned. The reminder can be automatically populated with information about the customer such as the customer's name and primary contact method. The agent can include notes in a new reminder (or add notes to an existing reminder) to help the agent remember what the reminder is for or what actions should be taken on the reminder date. The insurtech provider 105 can automatically provide pop-ups or other notifications (e.g., emails, SMS messages, etc.) to the agent to alert the agent when the date for a follow up reminder occurs. These pop-ups or other notifications can be provided on the computing device 104 as well as additional computing devices used by the agent. For example, the insurtech provider 105 can communicate with both a laptop computer and a smartphone of the agent to cause both devices to provide notifications for pre-set reminders.

In some embodiments, the customer cards displayed in FIG. 7B can be displayed in a different color (e.g., green, or orange) when a reminder for that customer is approaching (e.g., within three days) or on the date of a reminder for the customer. In some embodiments, one color means that the reminder date is approaching while a different color can be used to indicate that the reminder date has been reached. In some embodiments, rather than or in addition to changing a color of some or all of a contact card to indicate an approaching reminder, the insurtech provider 105 can cause one or more icons to be displayed in the GUI 710 at the computing device 104 to indicate upcoming reminder dates. For example, different icons (or colors) can be used to indicate different types of reminders (e.g., call contact re SOA, send SOA, meeting re policy options, etc., follow-up meetings, etc.).

In some cases, when the insurtech provider 105 causes a notification to be displayed to the agent about a set reminder, additional information can be included along with the reminder. This additional information can include, for example, the customer name, the current status for the customer (e.g., electronic SOA form sent but not signed), notes made by the agent with respect to the customer, and other relevant information. In some cases, the additional information can include indications of selections made by the customer in the SOA. For example, if the reminder is a reminder that the agent has an in-person or tele-appointment with the customer to discuss insurance policy product options for the customer, the insurtech provider 105 can generate an indication of the selections made by the customer in the SOA along with the reminder for the appointment (e.g., displayed as a desktop notification, mobile app notification, email, text message, etc.) to be presented at the computing device 104 so that the agent can be better prepared to discuss the selected options for the customer (e.g., by avoiding discussing insurance policy product types that were not selected by the customer in the SOA). Any of the additional information provided with the reminder can be stored in the data repository 112 and retrieved by the insurtech provider 105 when generating the reminder.

As shown in the GUI 710, the status indication can be a control that the agent can select to manually change or update the stage or status of the customer. For example, selection of the status indication displayed as part of the contact card 712 can cause the GUI 710 to display a dropdown menu that allows the agent to select a status from among a group of statuses (e.g., stages) for the associated customer. In some embodiments, the insurtech provider 105 can automatically update the status/stage of a customer contact based on information or communications sent to the customer by the agent or received from the customer by the agent. In some cases, the status/stage can be automatically updated based on other information provided by the agent or based on actions performed by the agent. For example, the insurtech provider 105 can automatically assign a status of "new" to a newly added customer. As another example, the agent can use the selectable options presented in any of the GUIs described herein to automatically generate an email to the customer that the agent can fill out and send. This action can cause the insurtech provider 105 to automatically change the status/stage for the client from, for example, "new" to "contacted." Refer to FIG. 7A for further discussion about the status or stage of a particular customer contact.

As described above in reference to FIG. 7A, the GUI 710 also allows the agent to select each contact card to cause a profile for the customer to be displayed, as described further in reference to FIGS. 8A-C. The profile can include additional detailed information about the customer. In some embodiments, instead of or in addition to an entire contact card being user-selectable in the GUI 710, a contact card can include a specific control that can be user-selectable to cause display of the customer profile associated with the contact card.

FIGS. 8A-C illustrate an example GUI 800 for accessing a profile for a customer contact using at a computing device within the system of FIGS. 1A-D. The GUI 800 can be displayed upon user selection of a particular customer contact in one or more of the GUIs described herein. For example, the GUI 800 can be displayed when the agent selects a customer listing in the GUI 700 of FIG. 7A and/or when the agent selects a customer card in the GUI 710 of FIG. 7B. The GUI 800 can also be presented in response to the agent selecting a contacts option from the menu option 203 shown in the GUI 200 of FIGS. 2A-B. The GUI 800 can also be presented when the agent selects or clicks on one or more other options presented in the GUIs described herein.

The GUI 800 can be presented in a mobile application, web interface, or other application at the agent computing device 104 described herein. The GUI 800 can also be presented in a web interface of another type of computing device, such as a laptop, tablet, and/or computer.

Referring to the FIGS. 8A-C, the GUI 800 can present information about a customer as represented by a customer profile. In the example of FIGS. 8A-C, the GUI 800 presents a profile for "Robert Zimmerman." The GUI 800 can be presented in response to the agent selecting the customer listing 704 in the GUI 700 of FIG. 7A. The GUI 800 can present a name of the customer, selectable options 802, 804, 806, 808, and 814, a stage field 810, a reminders field 812, an activity field 818, and a notes field 820. The GUI 800 can also present a menu 816.

The selectable option 802 allows the agent to begin a video call with the customer. In some implementations, the video call may be recorded using the techniques described herein. Sometimes, when the video call is not being recorded, a notification or other disclaimer can be presented at the agent's computing device 104 indicating that the call is not being recorded.

The selectable option 804 allows the agent to call the customer. When the agent selects the option 804, the agent's computing device 104 can call the customer at the customer's saved phone number. The call can be routed through a recording number, as described in FIG. 1B, so that the call can be automatically recorded and stored.

The selectable option 806 allows the agent to view a recorded call script that the agent may be required to recite during any call. Moreover, as shown in FIG. 8C, when the agent selects the option 806, the system can cause pop-out window 830 to be displayed overlaying a portion of the GUI 800. The pop-out window 830 can output the recorded call script for the agent to recite during the call. When the agent is done reciting the call script, the agent can swipe down on the pop-out window 830 in order to remove the pop-out window 830 from view over the GUI 800. Moreover, as shown in FIG. 8C, when the pop-out window 830 is presented, the GUI 800 can be presented in a brightness setting that is less than a full brightness or highest brightness setting. For example, the GUI 800 can be shaded so that the agent's attention can be directed to the recorded call script in the pop-out window 830. Once the pop-out window 830 is removed from view, the system can display the GUI 800 in the normal brightness settings or the highest brightness settings, therefore returning the agent's attention to the information presented in the GUI 800. Refer to FIG. 4 for further discussion about the call script.

The selectable option 808 allows the agent to view, add, edit, and/or delete any tags associated with the customer contact. Selecting the option 808 can cause another GUI to be presented at the agent computing device 104. The another GUI can include options/controls for the agent to manually define tags to associate with the customer. The another GUI can also output any tags that have been automatically assigned to the customer by the system (e.g., the insurtech provider 105) using artificial intelligence (AI) or other rulesets/algorithms. Refer to FIG. 10 for further discussion about tagging the customer contact.

The selectable option 814 allows the agent to view available plans. Selecting the option 814 can cause another GUI to be presented at the agent computing device 104. This GUI can include information about various insurance plans that can be available for the customer and based on the customer's particular information. The system (e.g., the insurtech provider 105) can perform automated analysis of the stored customer information to determine one or more insurance plans that may be suitable for the customer. Those insurance plans can be presented in the GUI as a result of the agent selecting the option 814. In some embodiments, the agent can also search available plans using a search function presented in the GUI as a result of selecting the option 814.

The option 814 can be presented to visually overlay one or more features or fields presented in the GUI 800. For example, in FIG. 8A, the option 814 can visually overlay a portion of the reminders field 812, As the agent scrolls down in the GUI 800, the features presented in the GUI 800, such as the activity field 818 and the notes field 820, can be presented underneath the option 814. As shown in FIG. 8B, once the agent reaches a bottom of the GUI 800, the option 814 may no longer be presented as a visual overlay over one or more features or fields in the GUI 800.

The stage field 810 displays the stage or status for the selected customer contact. As previously described, the agent can select the stage field 810 to change the stage/status for the selected customer contact.

The reminders field 812 can include one or more reminders for the agent associated with the selected customer contact. Each reminder can include a date (or date and time) for the reminder, information about when the reminder was created and/or last updated, and/or notes related to the reminder. Each of the reminders may also be user-selectable (or a control or icon displayed as part of a reminder can be use-selectable) so that the agent can view additional information about the reminder and/or edit the reminder. Moreover, the agent can add new reminders using a selectable control ("+") presented with the reminders field 812. In some embodiments, when a reminder is changed to a completed status, the reminder can be stored in an activity history for the customer contact or in a list of completed reminders for the customer contact and may no longer be displayed in the GUI 800. In some embodiments, one or more of the reminders (or a date or time associated with the reminder) can be represented in a different indicia, such as a red color, highlighting, bold formatting, etc. This indicia can indicate that the reminder has an upcoming or current deadline and that the reminder requires attention. The indicia can beneficially attract the agent's attention to the reminder so that the agent addresses an action related to the reminder both efficiently and on-time.

The activity field 818 can display activities associated with the selected customer contact. The activities may be listed from most recent to least recent. The activities can also be listed in one or more other orders. For example, the GUI 800 can include a control that allows the agent to order or sort the activities (e.g., least to most recent). Sometimes, when a reminder is marked as complete, the system automatically converts the reminder to an activity and moves the activity from the reminders field 812 to the activity field 818. The agent can then edit the new activity to include additional information. The GUI 800 can also include a control ("+") with the activity field 812 that allows the agent to enter a new activity, including a header for the activity and additional details about the activity.

In the example of FIGS. 8A-B, the activity field 818 includes an activity 822, indicating that a call with the customer was recorded to a particular phone number. Refer to FIG. 5B for further discussion about the particular phone number. By selecting the activity 822, the agent can view information about the recorded call and have the option to download the call, as described further in reference to FIG. 6.

Still referring to the GUI 800 in FIGS. 8A-B, the notes field 820 displays entered notes for the customer contact. This can allow the agent to enter and view information for the contact to reference in future conversations with the customer.

The menu 816 can also be presented at a bottom of the GUI 800 and allow the agent to switch between various different views of the customer contact profile. For example, the menu 816 can include selectable options for the overview view shown in FIGS. 8A-B, a details view, an SOA view, and a preferences view.

In brief, the details view can display contact information for the customer (e.g., email address, phone number, mailing address, and other available contact information in the system). The details view may also include information about the customer's healthcare providers (doctors, healthcare providers, etc.), prescriptions, pharmacies, and/or current/available plans. If the customer is currently enrolled in one or more Medicare plans, the contact details field can include information on the Medicare plans (or other insurance plans) for which the customer is currently enrolled has enrolled in the past. The details view may also include one or more controls that the agent can select in order to add, edit, or delete any of the information presented in the details view. The SOA view can display current SOAs for the customer and a stage of each SOA (e.g., email sent, client signed, SOA completed). This view may also include SOA history associated with the customer. The SOA view can include selectable controls to view additional information about the SOA, view completed or in-progress electronic SOA form(s), and/or change the status for a particular SOA (e.g., change to "signed" or "completed"). The preferences view can permit the agent to step through various tabs or pages for entering preference information associated with the customer. The tabs can include, for example, "Get Started," "Health," "Prescriptions," and "Pharmacy." Any of the information described above in the details view can be inputted, by the agent, via text fields and selectable controls presented in the tabs in the preferences view.

FIG. 9 is an example pop-out window 900 for providing instructions to an insurance agent about setting up their account for interaction with the system of FIG. 1A-D. The pop-out window 900 can be presented in a mobile application, web interface, or other application at the agent computing device 104 described herein. The pop-out window 900 can also be presented in a web interface of another type of computing device, such as a laptop, tablet, and/or computer. The system described herein can display the pop-out window 900 at the computing device 104 in response to receiving agent input in a variety of GUIs described herein. As an illustrative example, the agent can select a help option presented when the user selects the menu option 203 shown and described in FIG. 2A in order to view the pop-out window 900. As another example, the agent can select one or more help options presented in the GUI 800 shown in FIGS. 8A-B to cause the system to display the pop-out window 900.

In the example of FIG. 9, the pop-out window 900 is displayed by the system to visually overlay a portion of the GUI 200 described in FIGS. 2A-B. The pop-out window 900 can also be displayed over any other GUI described herein. The pop-out window 900 can present instructions to assist the agent in setting up their account so that they can effectively and efficiently interact with potential and existing customers. The pop-out window 900 includes fields 902, 904, and 906.

Field 902 can include information about the recording phone number used to record any calls for purposes of storing and recording the calls. The field 902 can include an indication of the particular phone number assigned to the agent, which can be used to automatically route any inbound or outbound calls to a call recording service. Refer to FIG. 1B for further discussion about routing, recording, and storing calls. The field 902 can also include a selectable option to view the agent's account information in another GUI. The account information can include additional information about the particular phone number assigned to the agent for purposes of routing calls for recording and storage.

Field 904 can include information about setting up lead campaigns specific for the agent. The field 904 can include a selectable option to set up the agent's lead campaigns in another GUI. As a result of setting up lead campaigns, the agent can receive leads when their activity status is set to "online." Refer to FIGS. 5A-D for further discussion about setting up lead campaigns.

Field 906 can include information about changing the agent's activity status, for example, from "offline" to "online." The field 906 can include a selectable option to "check in." This selectable option can function the same as or similar to the activity toggle feature 202 described in reference to FIGS. 2A-B. Upon selecting the option presented in the field 906, the system can display the GUIs described in reference to FIGS. 5A-D. As a result, the agent can toggle their activity status between "offline" and "online" so that the agent can begin receiving leads and other communications with existing and/or potential customers.

FIG. 10 is an example pop-out window 1002 for filtering customer information according to tags while using computing device within the system of FIGS. 1A-D. The pop-out window 1002 can be presented in a mobile application, web interface, or other application at the agent computing device 104 described herein. The pop-out window 1002 can also be presented in a web interface of another type of computing device, such as a laptop, tablet, and/or computer.

The pop-out window 1002 can be presented, by the system, to visually overlay a GUI 1000, where the GUI 1000 can represent any one or more of the GUIs described throughout this disclosure. For example, the GUI 1000 can be the GUI 700 described in FIG. 7A or the GUI 710 in FIG. 8B, and the pop-out window 1002 can be presented at the computing device 104 in response to the agent selecting a filtering option (e.g., control, button) presented in the GUI 700 or the GUI 710. As another example, the GUI 1000 can be the GUI 800 described in FIGS. 8A-C, and the pop-out window 1002 can be presented at the computing device 104 in response to the agent selecting the option 808 to view and/or add tags to the customer contact.

The pop-out window 1002 provides the agent with various selectable options to filter and/or sort how information is presented in the GUI 1000. The pop-out window 1002 includes selectable tabs 1004, 1006, and 1008. The tab 1004 can be selected by the agent to filter information presented in the GUI 1000 according to stage of activity/communication between the agent and a customer or multiple customers. Upon selecting the tab 1004, the system can display different stages that the agent can select to filter the information presented in the GUI 1000. The tab 1006 can be selected by the agent to filter information presented in the GUI 1000 according to reminders (e.g., types of reminders, dates/times associated with the reminders). Upon selecting the tab 1006, the system can display different information about reminders that the agent can select in order to filter and/or sort the information presented in the GUI 1000.

The tab 1008 can be selected by the agent to filter and/or sort information presented in the GUI 1000 according to one or more tags, the tags having been determined/generated manually by the agent and/or automatically by the system (e.g., the insurtech provider 105). In the example of FIG. 10, the tags tab 1008 has been selected by the agent. The pop-out window 1002 therefore displays tags 1010A-N that have been manually determined/generated by the agent and automatically by the system. The agent can select one or more of the tags 1010A-N in order to view information in the GUI 1000 that have been assigned the selected tag(s) 1010A-N.

As described herein, the tags 1010A-N can be assigned (as metadata set to a customer contact) to customers manually by the agent (e.g., via the option 808 in the GUI 800 of FIG. 8A) and/or automatically by the system using AI or other rulesets/algorithms. Some of the tags 1010A-N can be preset values, as defined by the system. The agent can also create additional tags that can then be applied/assigned to customer contacts.

The agent can manually assign one or more of the tags 1010A-E and/or 1010F-N to customer contacts. Each of the tags 1010A-E can, for example, represent insurance plans or other products. For example, tag 1010A represents "Medicare Advantage product," tag 1010B represents "Prescription Drug Plan," tag 1010C represents "Medicare Advantage with Prescription Drug Plan," tag 1010D represents "Medicare Supplement," and tag 1010E represents "Switcher." Each of the tags 1010F-N can, for example, represent attributes of a customer that can be automatically determined by the system (and/or manually applied to the customer by the agent). The tag 1010F can represent "Cross-sell," tag 1010G represents "Up sell," tag 1010H represents "Call Lead," tag 1010I represents "Data Lead," and tag 1010N represents "My Tag." The system can run analytics rulesets and/or algorithms, such as AI techniques, on the backend to information stored for each customer contact in order to determine how to tag the customer contact. The system can automatically tag a customer contact with one or more of the tags 1010A-N. When the system tags the customer contact, the system can also determine a confidence value or likelihood corresponding to an activity/other information associated with the tag.

Among the tags 1010A-N, the tag 1010F representing cross-sells and the tag 1010G representing up sell indicates likelihood that a particular customer may switch to another insurance plan. As an illustrative example, a customer can be enrolled in a plan that does not include dental benefits. The system can determine, with some level of confidence, that the customer likely would want to switch to another plan that includes dental benefits, so the system can tag the customer's profile with the cross-sell tag 1010F. When the agent sees that the customer has been assigned this tag, the agent can better determine what information to present to the customer to provide the customer with alternative plans rather than (or in addition to) an option to renew their currently-enrolled plan. Among the tags 1010A-N, the tag 1010N "My Tag" can represent any tag that the agent generated as a custom tag.

Figure 11:
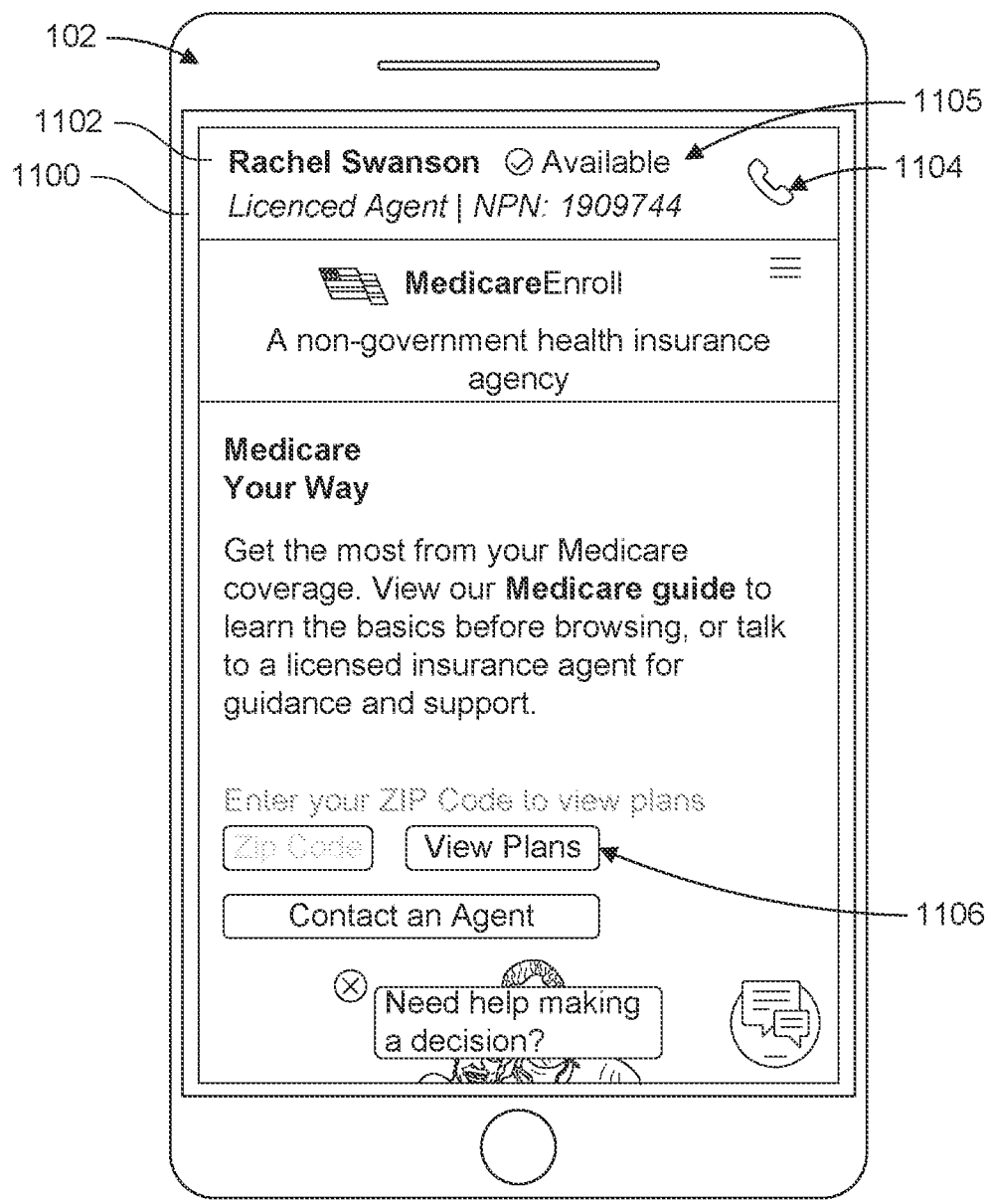
FIG. 11 illustrates an example GUI for viewing information to enroll in an insurance plan at a computing device within the system of FIGS. 1A-D.

FIG. 11 illustrates an example GUI 1100 for viewing information to enroll in an insurance plan at the computing device 102 within the system of FIGS. 1A-D. The GUI 1100 can be presented in a web interface at the customer computing device 102 in response to the customer computing device 102 receiving a pURL from the agent computing device 104 described herein (e.g., via text, email, other notification). The customer at the computing device 102 can click on or select the pURL to cause the computing device 102 to launch the GUI 1100 in a web browser at the computing device 102.

The GUI 1100 can present information about an insurance plan, such as a quote for the insurance plan. The GUI 1100 can also present information comparing the insurance plan to one or more other insurance plans. The GUI 1100 can present a selectable option 1106 to view the insurance plan and/or other insurance plans.

The GUI 1100 can also present agent information 1102. The agent information 1102 can indicate the agent who sent the pURL to the customer at the customer computing device 102. The agent information 1102 can also indicate when the agent is available or otherwise toggled their activity status to being online. For example, the GUI 1100 can present a graphical feature 1105, which can indicate whether the agent is online or otherwise available. The agent information 1102 can also include contact information 1104, such as a phone number and/or email address. Therefore, when the agent is online and the graphical feature 1105 is visible/presented in the GUI 1100, the customer can reach out to the agent using their contact information 1104. The graphical feature 1105 can be dynamically updated in real-time when the agent toggles, at their computing device, between an online activity status and an offline activity status. For example, if the agent toggles their activity status to offline using the features presented at their computing device, the GUI 1100 can be dynamically updated in real-time at the customer computing device 102 by removing the graphical feature 1105 from presentation in the GUI 1100. In some implementations, the graphical feature 1105 can be updated to reflect that the agent is offline or unavailable.

Figure 12:
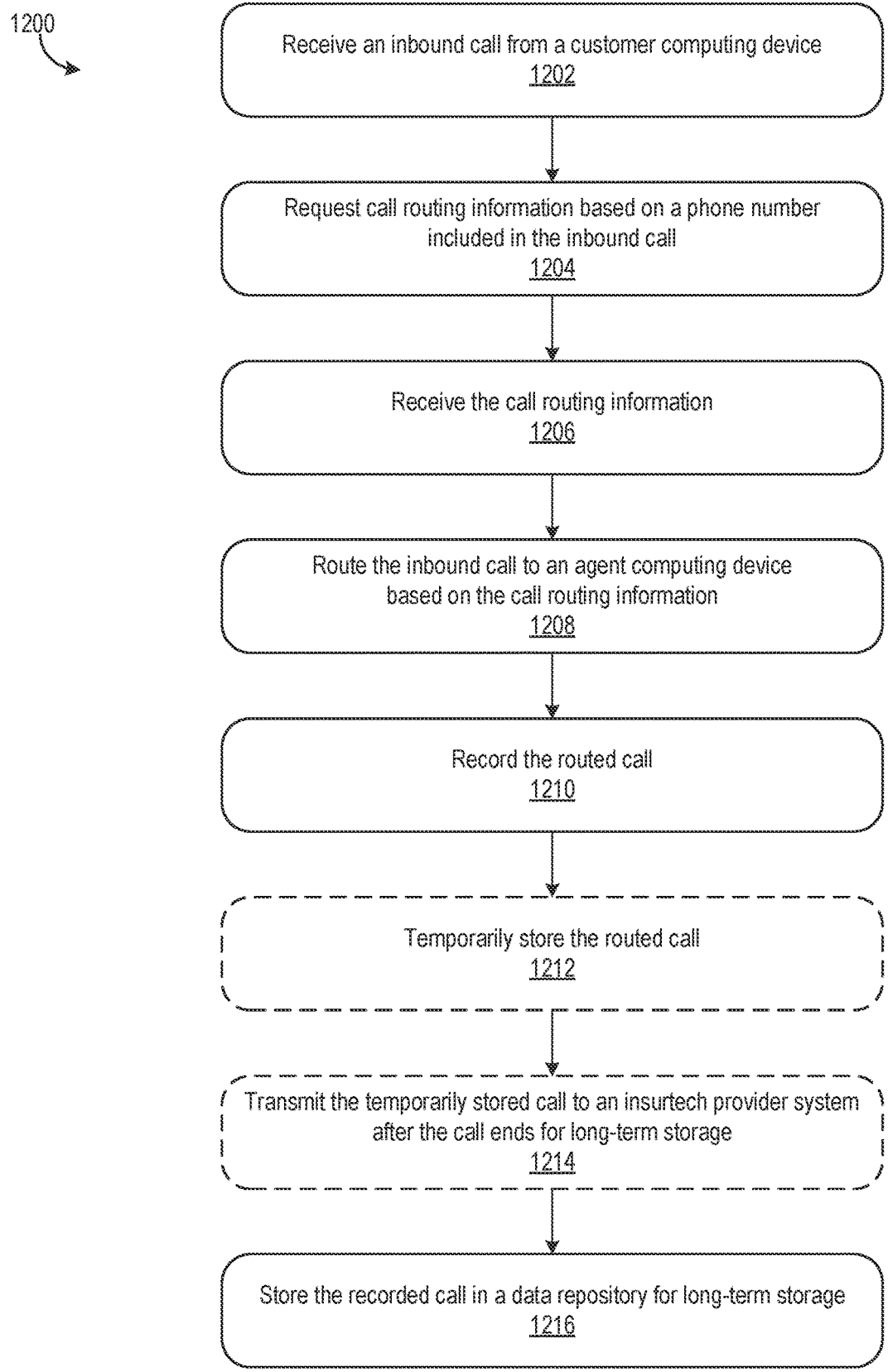
FIG. 12 is a flowchart of a process for recording and storing calls for improved compliance with regulatory requirements, in accordance with some embodiments.

FIG. 12 is a flowchart of a process 1200 for recording and storing calls for improved compliance with regulatory requirements, in accordance with some embodiments. In other words, the process 1200 can be performed for improved recordkeeping of calls for facilitation of insurance enrollment. Also, some or all of the process 1200 can be implemented for recordings of in-person conversations gathered via the device 104 (e.g., as described in FIGS. 16A-16H below) to achieve improved recordkeeping of such recordings for facilitation of insurance enrollment. The process 1200 is the same as or similar to the process described in reference to FIG. 1B. The process 1200 can be performed by the call service system 110 described in at least FIGS. 1A-B. The process 1200 can also be performed by one or more components of the insurtech provider 105 described herein. The process 1200 can also be performed by one or more other computing systems, devices, computers, networks, cloud-based systems, and/or cloud-based services. For illustrative purposes, the process 1200 is described from the perspective of a computer system.

Referring to the process 1200 in FIG. 12, the computer system can receive an inbound call from a customer computing device in block 1202. The inbound call can be part of an insurance lead described herein, in which an insurance customer, such as an existing or potential customer, can contact an insurance agent. The inbound call can include a phone number of the insurance agent to be contacted. In some implementations, the inbound call can include metadata that can be used to identify the insurance agent to which the call is directed. The metadata can include a unique identified assigned to the insurance agent. The metadata can include a phone number that masks the insurance agent's actual phone number. Therefore, when the inbound call is made using the masking phone number, the computer system can identify a relationship between the masking phone number and an actual phone number of the insurance agent, then route the inbound call to the actual phone number of the insurance agent.

In block 1204, the computer system can request call routing information based on a phone number included in the inbound call. In some implementations where the computer system is a call service system, the computer system can request the call routing information from an insurtech provider described herein. In implementations where the computer system is the insurtech provider, the computer system can simply request the call routing information from a data repository or other computing system that may maintain/store the call routing information. In some implementations, the call service system can receive the call routing information from the data repository, especially in scenarios in which the call service system is part of the insurtech provider. The computer system can determine the call routing information based on associating the phone number of the inbound call with an insurance agent profile. As described above, if the inbound call includes a unique identifier associated with the insurance agent, then the computer system can determine or retrieve/receive the call routing information based on associating the unique identifier with the insurance agent profile. Associating the phone number or unique identifier with the insurance agent profile can be performed to determine who to route the call to and who to associate the call with.

The computer system can receive the call routing information in block 1206. As mentioned above, the computer system can receive the call routing information from the insurtech provider. The computer system can also receive the call routing information directly from the data repository or other computing system that maintains the call routing information.

In block 1208, the computer system can route, based on the call routing information, the inbound call to a phone number of an agent, which the agent can then pick up at an agent computing device. For example, the computer system can facilitate the call between the insurance customer at the customer computing device and the insurance agent at the agent computing device. As a result, the customer and agent can communicate directly with each other. The agent can receive the call from the customer at the agent's computing device as a push notification, notification, message, or other type of alert. As described in reference to some of the GUIs presented herein, the computer system can also transmit information to the agent computing device that causes the agent computing device to output, in a GUI display presented at the computing device, a call script. The call script can be presented in response to the agent selecting an option in the GUI display to view the call script. The call script can also be automatically presented in the GUI display in response to the routed call being performed between the agent and customer computing devices.

In some implementations, if the agent's activity status is set to online, then the inbound call can be directly routed to a phone number of the agent. If, on the other hand, the agent's activity status is set to offline, the inbound call may not be routed directly to the agent's phone number. The call can be sent, in some implementations, to a voicemail of the agent. In some implementations, the call can be routed to another agent computing device. In some implementations, the call can be put into a queue so that when the agent's activity status is set to online, the inbound call can be routed to the agent computing device. In yet some implementations, the call can be routed to a general contact center agent phone number, rather than a field agent phone number.

The computer system can record the routed call in block 1210. The call can be recorded as the call is being performed between the customer and agent computing devices. In other words, the call can be recorded in real-time. Additionally, the process 1200 can be implemented such that block 1210 provides a recording of an in-person conversation gathered via the device 104 (e.g., as described in FIGS. 16A-16H below), which is then processed like a recorded call in the subsequent blocks 1212-1216 in FIG. 12.

Optionally, the computer system can temporarily store the routed call in block 1212. The call can be stored temporarily while the call is being performed between the customer and agent computing devices. In some implementations, the call can be temporarily stored for a threshold amount of time after the call is performed, then the call can be routed to another system for longer-term storage, as described further below. The call can be temporarily stored in local memory or other local storage accessible to the computer system.

Optionally, the computer system can transmit the temporarily stored call to the insurtech provider system (e.g., the insurtech provider 105 described in at least FIG. 1A), after the call ends, for long-term storage (block 1214). Sometimes, the insurtech provider system can request the call from the computer system. The request can be made a threshold amount of time after the call is performed and recorded. For example, the insurtech provider system can request recorded calls in batches (e.g., once every 10 hours, every 12 hours, every 24 hours, etc.). The insurtech provider system can also request the call once the call while the call is being made and/or after the call has been made.

The computer system can store the recorded call in a data repository for long-term storage in block 1216. The call can be stored in association with the insurance agent profile (e.g., via the unique identifier of the agent). The call can also be stored in association with a customer contact profile associated with the customer computing device. The call can also be stored for a threshold period of time. The threshold period of time can vary based on regulatory requirements. The threshold period of time can also vary based on one or more other factors, conditions, and/or requirements that may apply to the particular computer system and/or services provided by insurance companies. In some implementations, the call can be stored by the insurtech provider. In some implementations, the call can be stored by the call service system.

As described in reference to the GUIs presented and described herein, the computer system can retrieve the recorded call from the data repository based on receiving a request for the recorded call from the agent computing device. The computer system can then provide the retrieved call to the agent computing device, to be presented in a GUI display with selectable options to play back and/or download the recorded call.

Figure 13:
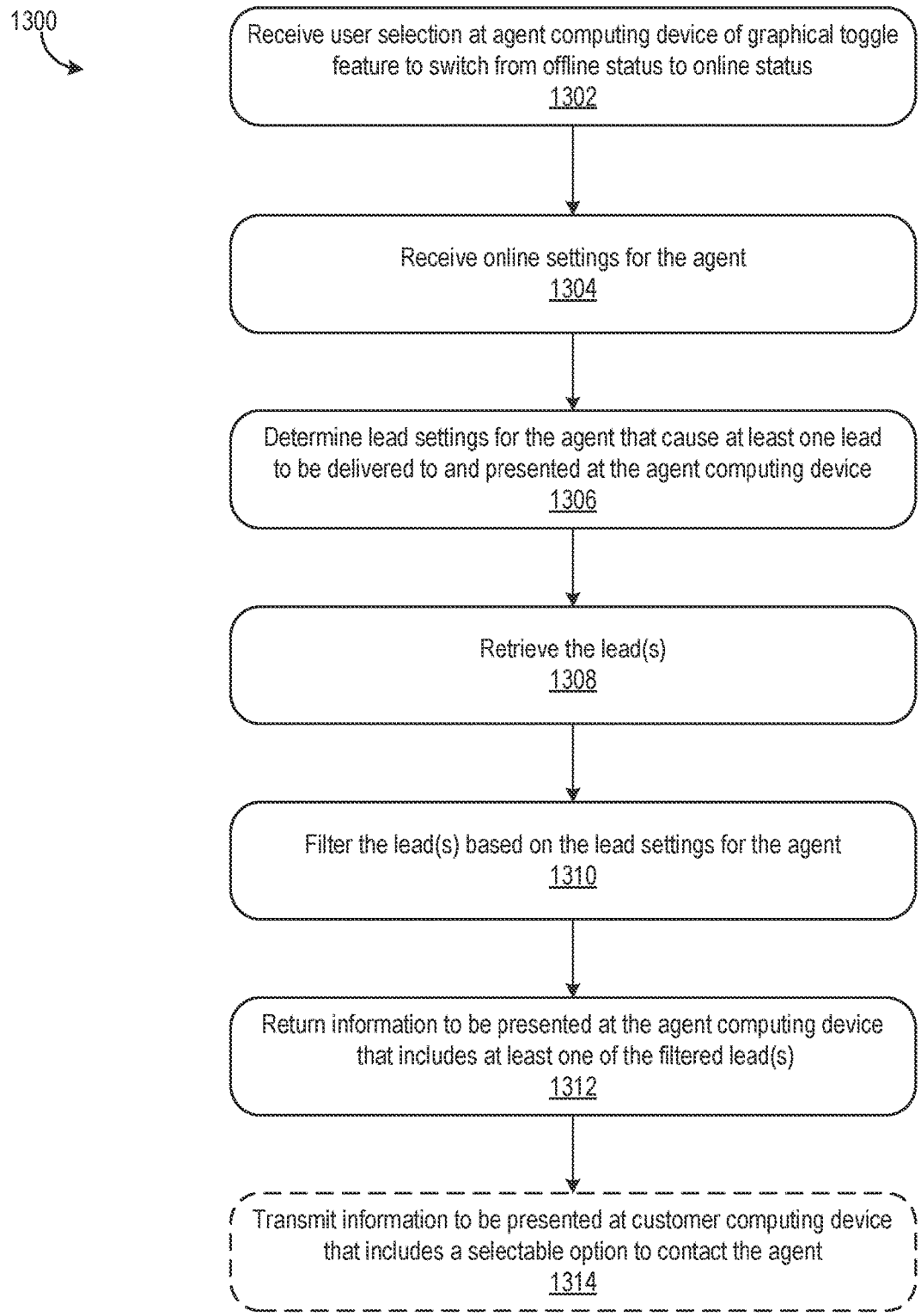
FIG. 13 is a flowchart of a process for toggling between an offline status and an online status, in accordance with some embodiments.

FIG. 13 is a flowchart of a process 1300 for toggling between an offline status and an online status, in accordance with some embodiments. In other words, the process 1300 can be performed for toggling an activity state of an insurance agent to provide facilitation of insurance enrollment. The process 1300 is the same as or similar to processes described in reference to FIGS. 1D, 2A-B, and 5A-E. The process 1300 can be performed by one or more components of the insurtech provider 105 described herein. The process 1300 can also be performed by one or more other computing systems, devices, computers, networks, cloud-based systems, and/or cloud-based services. For illustrative purposes, the process 1300 is described from the perspective of a computer system.

Referring to the process 1300 in FIG. 13, the computer system can receive user selection at an agent computing device of a graphical toggle feature to switch from an offline status to an online status (block 1302). The graphical toggle feature can be presented in a GUI display of the agent computing device. For example, the computer system can transmit information to the agent computing device to cause the agent computing device to present the graphical toggle feature in any one or more GUI displays presented at the agent computing device. In response to receiving the user selection of the graphical toggle feature, the computer system can update an activity status of the agent to an online status for at least one service provided by the computing system to the agent at the agent computing device. The at least one service can include a first insurance provider service and a second insurance provider service, where each of the first and second insurance provider services include different sets of leads. For example, the agent may sell both Medicare and life insurance. Switching the toggle feature to the online status can cause the computer system to update the agent's activity status to online for both Medicare and life insurance sales. This can advantageously help the agent to synchronize their workload and provide efficient performance of tasks related to either of the services that the agent provides. In some implementations, switching the toggle feature to the online status can cause the computer system to only update the agent's activity status to online for one service that the agent works for/in (e.g., one of the services that the agent selects to be affected by the toggle feature and/or the service that is currently presented at the GUI display of the agent computing device).

In block 1304, the computer system can receive online settings for the agent. The online settings can be received based on receiving user selection of the graphical toggle feature. As described in reference to FIGS. 5A-E, the agent can provide user input in multiple GUI displays that can be used by the computer system to establish the online settings for the agent. The online settings, as described herein, can indicate a type of leads that the agent would like to receive when their activity status is online, a frequency of receiving those leads, a source for those leads, a phone number at which to receive the leads, etc. Therefore, the online settings can include a user-selected lead-type, the lead-type being at least one of a call lead-type and a data lead-type. The online settings can also be a user-selected lead-source, the lead-source being at least one of a group of services that provide leads to the agent. The online settings can also include a call number at which the agent can be called by customers. The online settings can include a mapping between a recording service number and the call number. The recording service number can be used, by a call service system, to record a call between the agent and customer computing devices, as described in reference to FIG. 12.

The online settings, once generated based on the user input, can be stored in a data repository in association with an insurance agent profile of the agent. These online settings can then be retrieved from the data repository in block 1304. In some implementations, when the agent selects the graphical toggle feature in block 1302, the agent can be presented with one or more of the GUIs described in FIGS. 5A-E from which the agent can establish/adjust/determine their online settings. The online settings can then be received by the computer system instead of being pulled from the data repository.

The computer system can determine lead settings for the agent that cause at least one lead to be delivered to and presented at the agent computing device (block 1306). The lead settings can be determined based on the received online settings for the agent. Each of the leads can indicate a customer interested in enrolling in an insurance plan and/or an existing customer of the agent. Refer to FIG. 1D for further discussion.

The computer system can retrieve the lead(s) in block 1308. As described in reference to FIG. 1D, the lead(s) can be retrieved from one or more other computing systems, such as lead providing systems. The lead(s) can also be generated at another time and retrieved from a data repository.

Sometimes, the computer system can also filter the lead(s) based on the lead settings for the agent (block 1310). For example, the computer system can retrieve leads that were generated during a threshold period of time in block 1308. In block 1310, the computer system can then filter out any leads that are data leads, assuming the agent identified in their lead settings that they only desire to receive call leads.

The computer system can return information to be presented at the agent computing device that includes at least one of the filtered lead(s) (block 1312). The information can include, for example, a selectable option to pick up a call lead and speak to an associated customer. As another example, the information can include a selectable option to view and respond to an email or website form inquiring about a particular insurance plan. One or more other types of information can be presented in block 1312.

Optionally, the computer system can transmit information to be presented at the customer computing device that includes a selectable option to contact the agent (block 1314). As described herein, if the agent's activity status is set to online, then the agent can be reached/contacted by the customer. Therefore, the customer's computing device can dynamically update a GUI presented thereon to include a selectable button or other graphical element to contact the agent. The computer system can also transmit information to be presented in the GUI display of the customer computing device that indicates whether the agent is online. When the agent is not online (e.g., their activity status is set to offline), the option, button, or other graphical element may still be presented in the GUI but can be non-selectable.

In some implementations, the computer system can have a lead routing engine and/or algorithm configured to route leads to various agents at their respective computing devices. The lead routing engine can receive information from the computing devices of the agents about which agents are online, which agents set up campaigns (e.g., lead settings) for particular areas codes associated with the leads, and whether an agent is available to take a lead call. Various other information may also be used by the lead routing engine to determine to whom to route the lead calls. Sometimes, if no agents are available (or satisfy criteria to receive the lead call), then the lead routing engine can route the lead call to a contact center agent, rather than a field agent.

In some implementations, the lead routing engine can determine whether to send a lead to the agent based on the agent's location information. For example, the mobile application can present a notification at the agent's computing device asking if their geolocation information can be collected from the computing device. Once the agent accepts, their geolocation information can be collected at predetermined time intervals when the mobile application is open at the agent computing device (e.g., every 5 minutes, every 10 minutes, every 15 minutes, every 20 minutes). If the agent's location is within some threshold distance of a zip code or area code associated with a lead, then the lead routing engine can send that lead to the agent at their computing device.

Figure 14A:
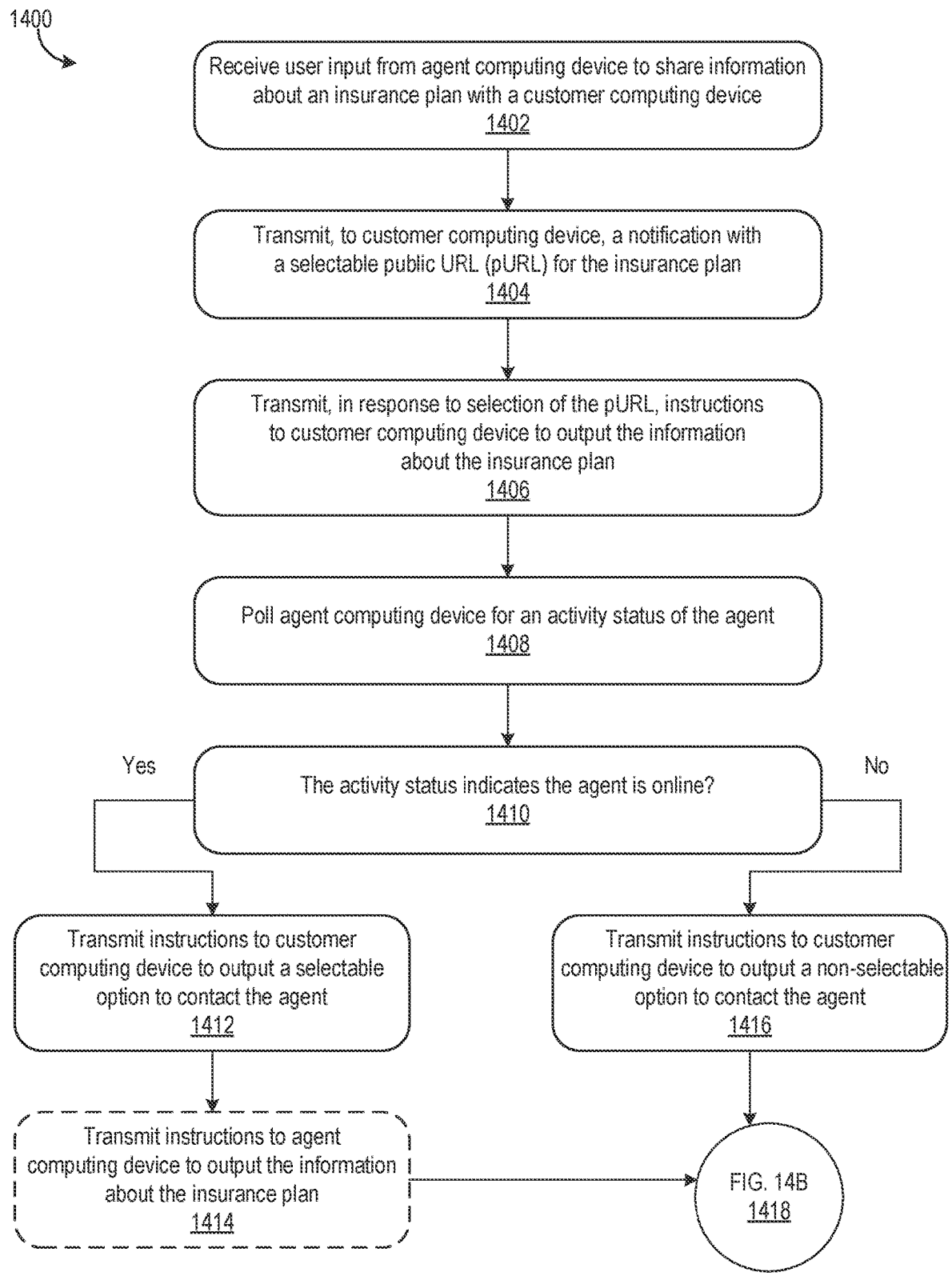
FIGS. 14A-B is a flowchart of a process for providing insurance enrollment information at a computing device of an insurance customer in accordance with some embodiments.
Figure 14B:
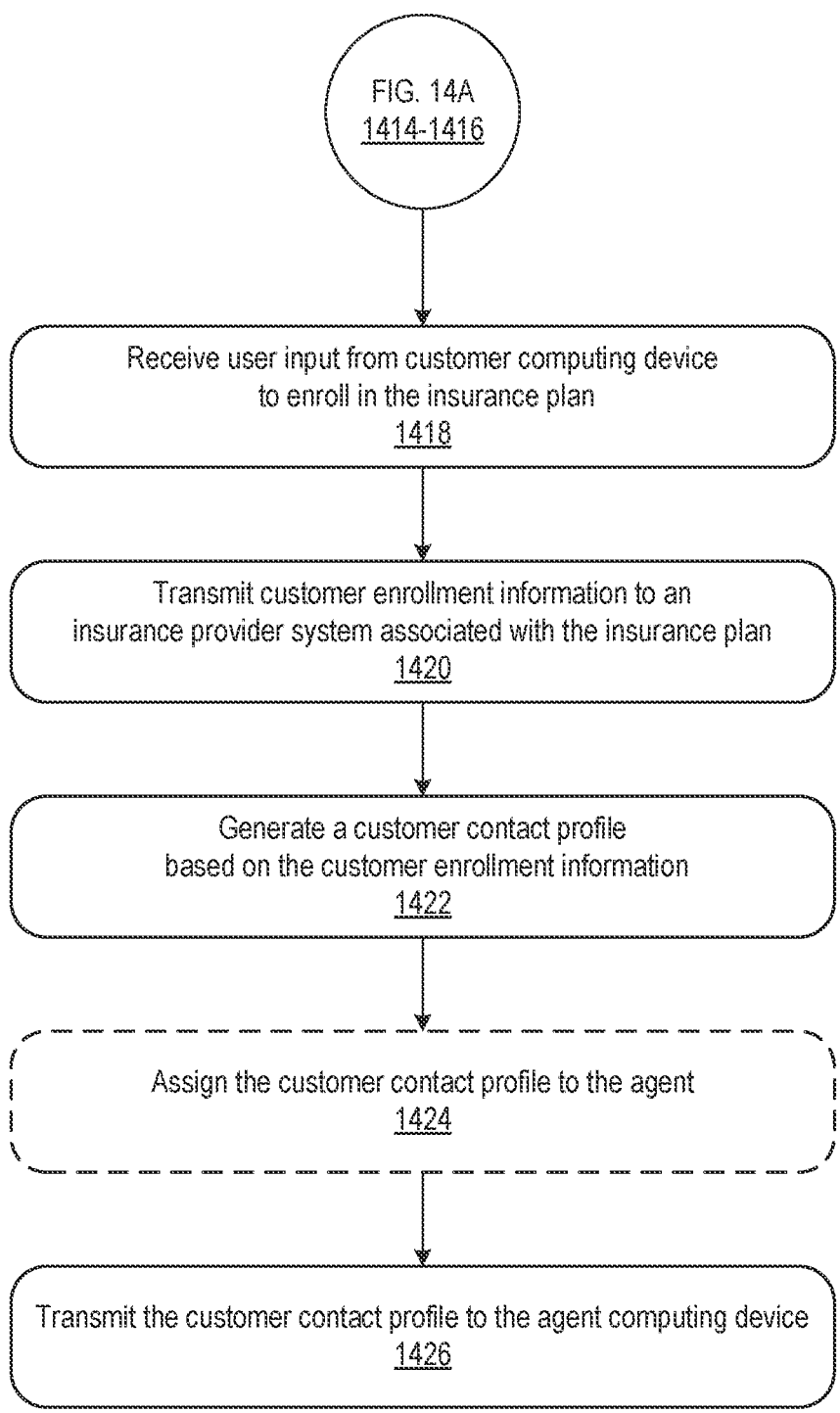

FIGS. 14A-B is a flowchart of a process 1400 for providing insurance enrollment information at a computing device of an insurance customer in accordance with some embodiments. In other words, the process 1400 can provide facilitation of insurance enrollment between insurance agents and insurance customers using personalized URLs (pURLs). The process 1400 is the same as or similar to processes described in reference to FIG. 1C. The process 1400 can be performed by one or more components of the insurtech provider 105 described herein. The process 1400 can also be performed by one or more other computing systems, devices, computers, networks, cloud-based systems, and/or cloud-based services. For illustrative purposes, the process 1400 is described from the perspective of a computer system.

Referring to the process 1400 in both FIGS. 14A-B, the computer system can receive user input from an agent computing device to share information about an insurance plan with a customer computing device (block 1402).

The computer system can transmit, to a customer computing device, a notification with a selectable pURL for the insurance plan (block 1404). The pURL can be associated with/assigned to the particular agent or their computing device. The notification, in some implementations, can be generated by the agent computing device and/or generated by the computer system in response to the receiving the user input from the agent computing device to share the information about the insurance plan with the customer computing device. The pURL in the notification can cause the information about the insurance plan to be outputted in the GUI display at the customer computing device, such as in a webpage accessible via the Internet or web at the customer computing device.

As an illustrative example, the agent can receive a request from the customer to view an insurance plan at the customer's device. The agent can select an option presented at their device to generate and transmit, to the customer device, a pURL linking to the information about the insurance plan. The pURL can provide for information about the insurance plan that typically is presented to the agent to also be presented and made available to the customer at the customer's computing device. The pURL can be transmitted to the customer device in a notification, such as an email, text message, or push notification. The customer can then select/click on the pURL to cause the information about the insurance plan to be presented at the customer device in a web interface. The information can be presented in a web browser at the customer device.

The computer system can transmit, in response to selection of the pURL, instructions to the customer computing device to output the information about the insurance plan (block 1406). The computer system can use the pURL to determine what information to present at the customer computing device. Once the computer system identifies what information to present, the computer system can retrieve, from an insurance provider computing system and/or a data repository, the information about the insurance plan. The information can include options to enroll in the insurance plan, view rates associated with the insurance plan, and/or communicate with the agent at the agent computing device about the insurance plan. At least one of the options can be user-selectable and at least one of the options may be non-selectable. For example, as described herein, the option to communicate with the agent may be non-selectable if the agent's activity status is set to offline. The option to communicate with the agent can be dynamically updated in real-time based on receiving an indication from the agent computing device that the agent provided user input toggle from the offline activity status to an online activity status.

Accordingly, the computer system can poll the agent computing device for an activity status of the agent in block 1408.

The computer system can determine whether the activity status of the agent indicates that the agent is online (block 1410).

If the agent is online, the computer system can transmit instructions to the customer computing device to output a selectable option to contact the agent in block 1412. For example, as described above, the computer system can dynamically update the GUI display to present the option to communicate with the insurance agent at the agent computing device as a user-selectable option.

Optionally, the computer system can also transmit instructions to the agent computing device to output the information about the insurance plan (block 1414). As a result, the agent and the customer can view the same information about the insurance plan at a same time. The information about the insurance plan can concurrently be presented at both the agent and customer computing devices. The computer system can then proceed to block 1418 described further below.

Referring back to block 1410, if the activity status indicates that the agent is not online (e.g., the agent is offline), then the computer system can transmit instructions to the customer computing device to output a non-selectable option to contact the agent (block 1416). In other words, the computer system can transmit, to the customer computing device, instructions that, when executed, cause the customer computing device to present the option to communicate with the insurance agent at the agent computing device as a non-selectable option based on a determination that the activity status of the agent indicates that the agent is offline. The computer system can then proceed to block 1418.

In block 1418, the computer system can receive user input from the customer computing device to enroll in the insurance plan. The customer can select, for example, the option to enroll in the insurance plan, which is presented at the customer computing device with the other information about the insurance plan.

The computer system can transmit customer enrollment information to the insurance provider system associated with the insurance plan in block 1420 (e.g., the insurance providers computing systems 114A-N described in at least FIG. 1A). For example, the computer system can transmit enrollment information for the customer. The enrollment information can include at least a customer-provided payment method for the insurance plan and a customer-signed insurance plan policy.

The computer system can also generate a customer contact profile based on the customer enrollment information (block 1422). The customer contact profile can be generated with information about the customer. For example, the information can include contact information, the insurance plan, and/or the enrollment information. In some implementations, block 1422 can be performed before or during block 1420. Sometimes, the profile may already be generated and thus block 1422 can be skipped. For example, the profile can be generated when the customer makes a call to the agent, communication is initially established between the customer and agent, and/or communication is initially established between the customer and the computer system.

Optionally, the computer system can assign the customer contact profile to the agent (block 1424). Sometimes, the customer can already be assigned to the agent. For example, the customer can automatically be assigned to the agent at block 1402, when the agent selects an option to share the information about the insurance plan with the customer. As another example, the customer can automatically be assigned to the agent when the agent selects information about leads they would like to receive. The customer can also be automatically assigned to the agent once the agent accepts a lead for the customer and/or the agent sets their activity status to online.

The computer system can also transmit the customer contact profile to the agent computing device in block 1426. The customer contact profile can then be presented in one or more GUIs described herein at the agent computing device so that the agent can manage communications, activity, information, and/or reminders associated with that customer.

Figure 15A:
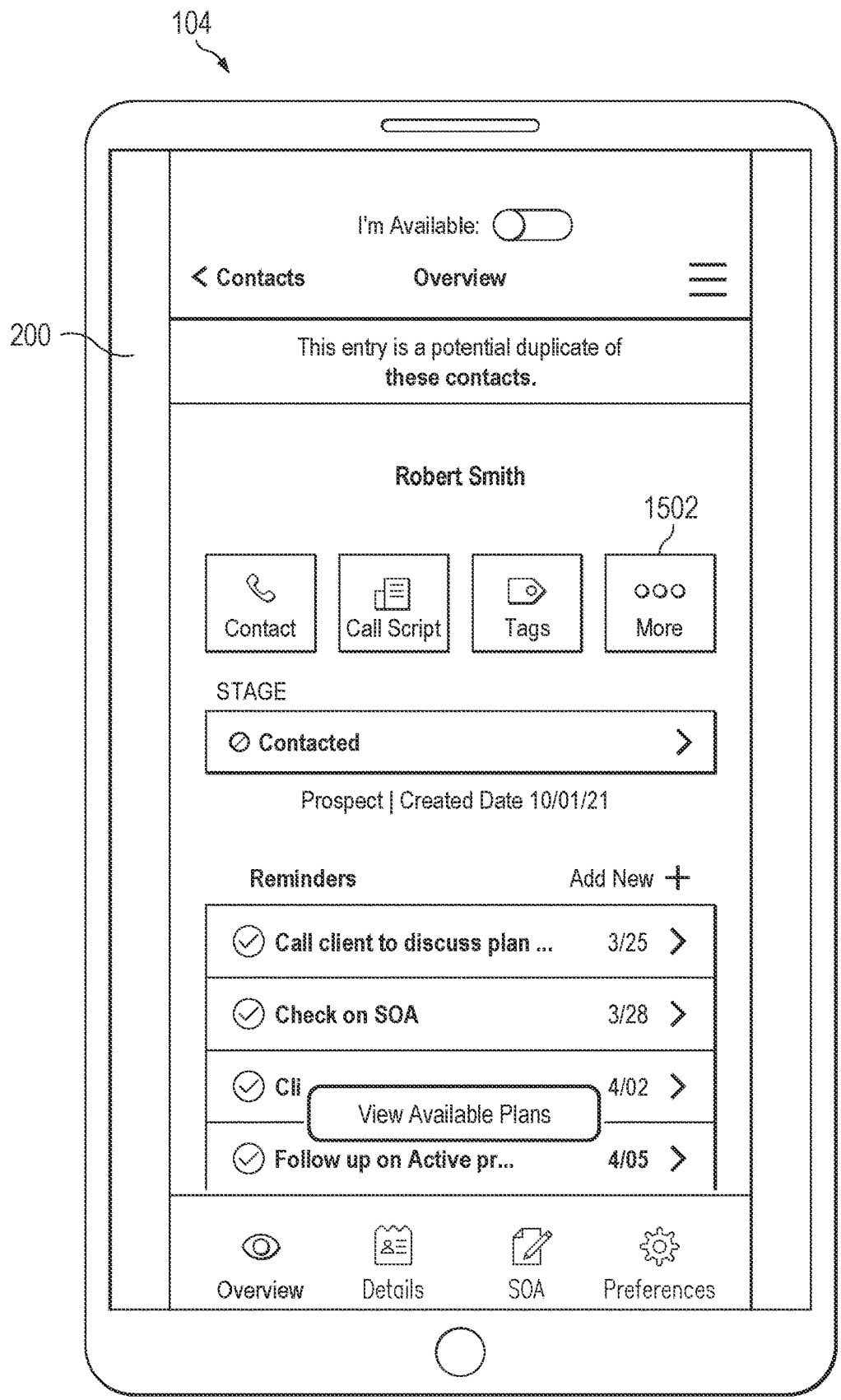
FIGS. 15A-15H illustrate an example GUI and process for recording and storing in person conversations.
Figure 15B:
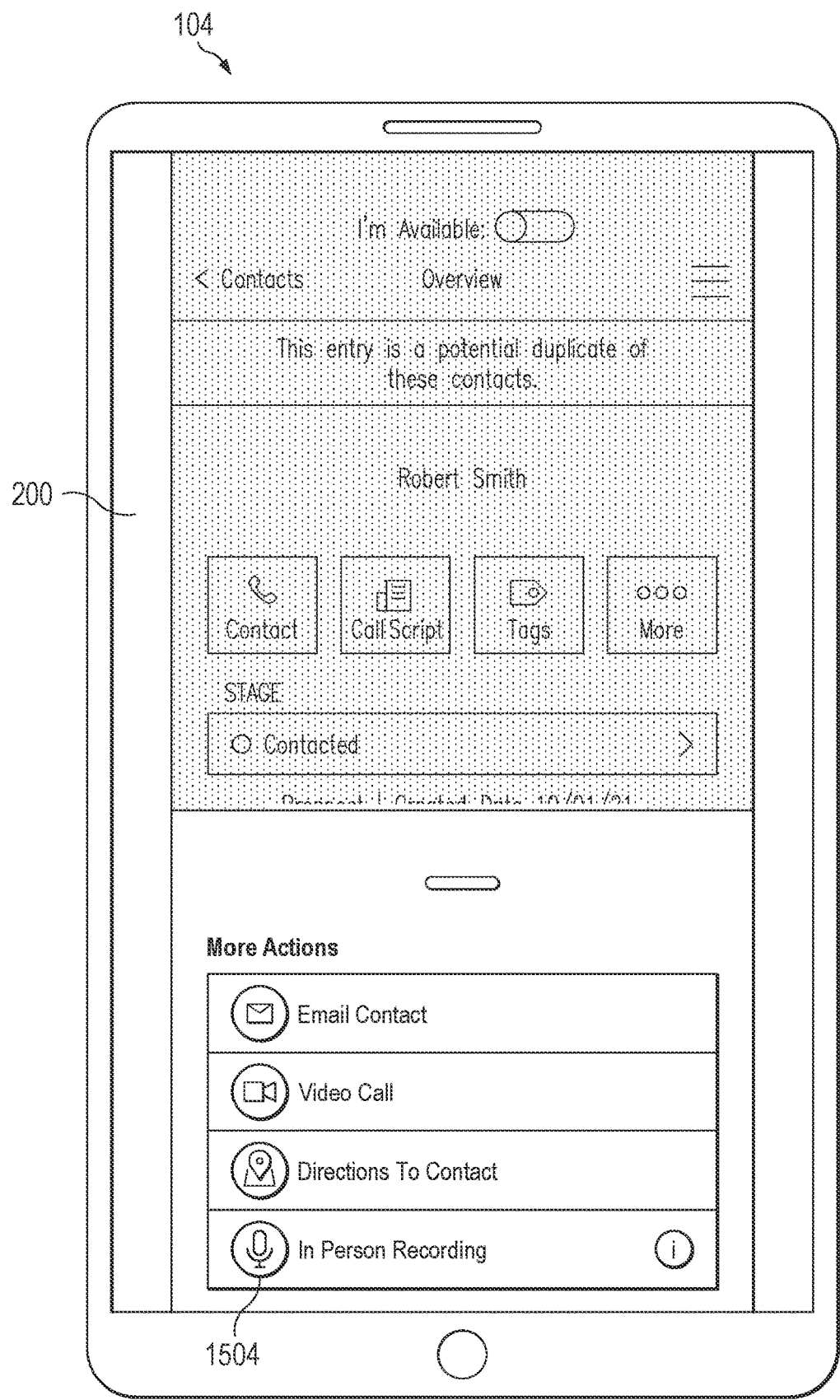

FIGS. 15A-15H illustrate an example GUI and process for recording in-person conversations via the agent computing device 104 and storing such recordings in a manner consistent with implementations described above in FIGS. 1A-B and 12. Referring to FIG. 15A, the agent computing device 104 can display a GUI 200 with functionality for recording and automatically storing in-person conversations. GUI 200 in FIG. 15A is displaying contact information for a "Robert Smith" who has been previously contacted. If an in-person conversation is to occur, the agent can use the agent computing device 104 to record and store the in-person conversation, as well as receive guidance and additional information related to the conversation. The agent can press the "more" button 1502 to access a modal or pop-up window as illustrated in FIG. 15B.

Figure 15C:
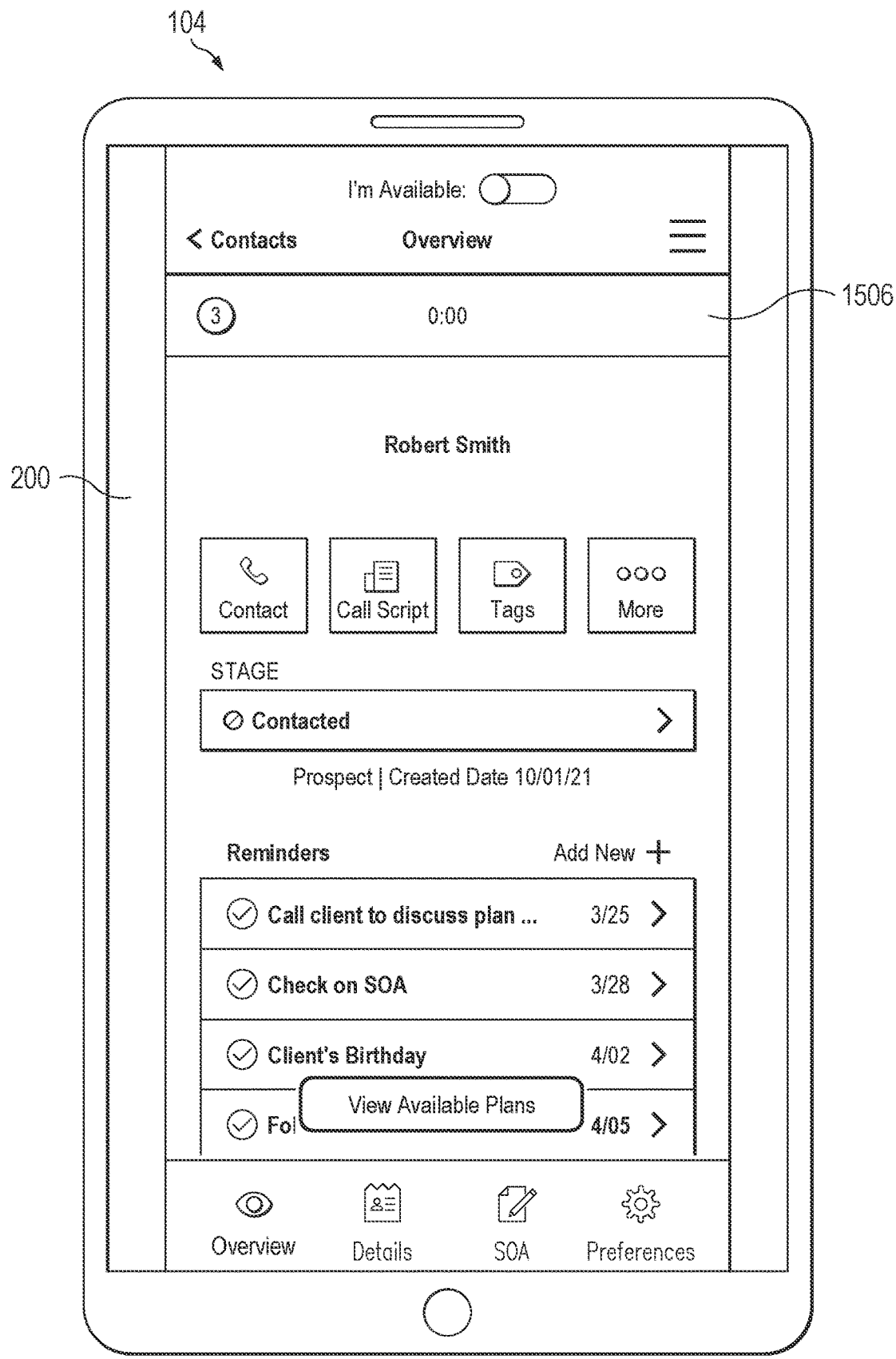
Figure 15D:
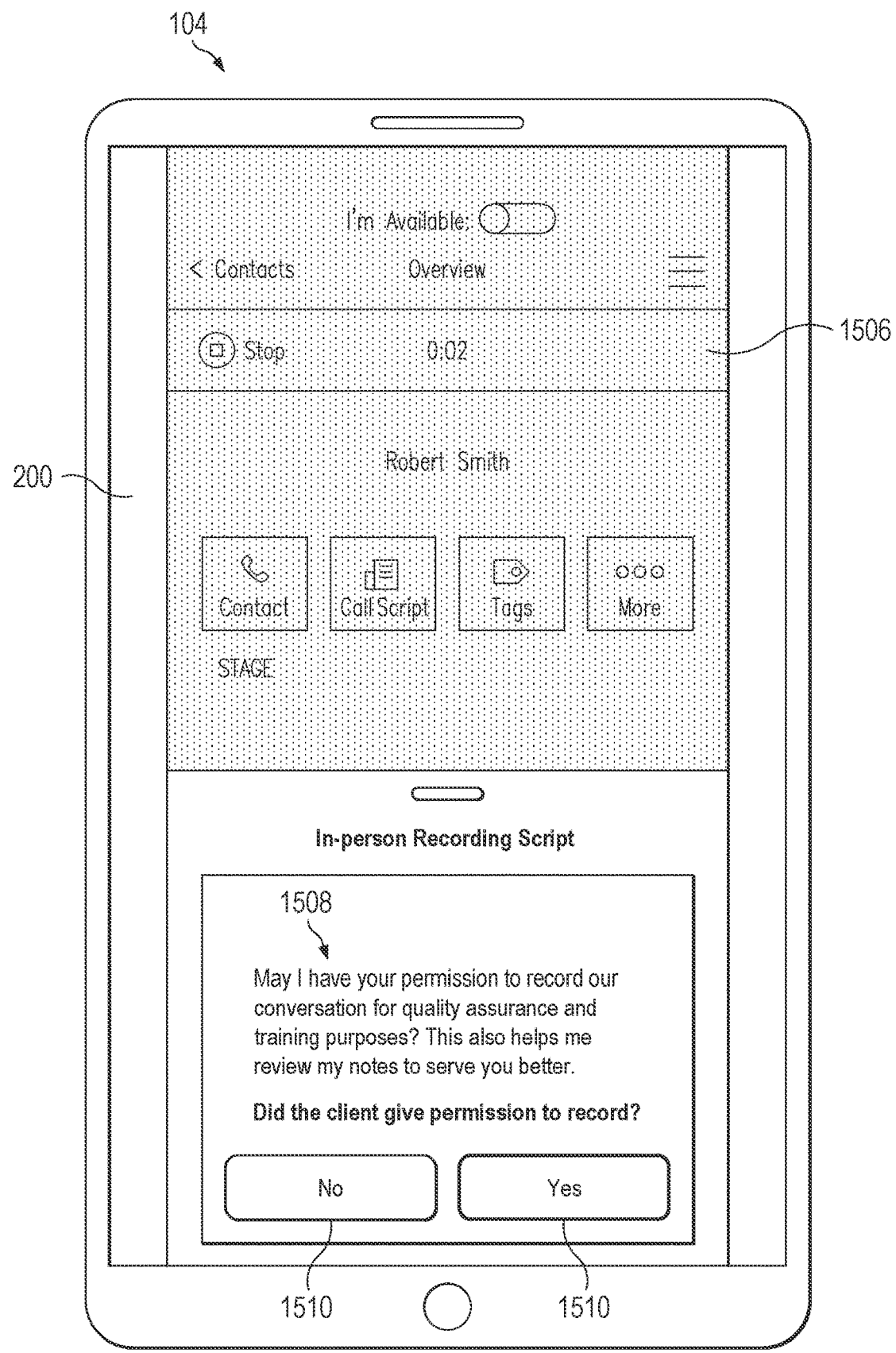

If the agent then selects the "In Person Recording" button 1504, the GUI 200 of agent computing device 104 can return to a contact screen, except with a recording indicator 1506, which is depicted in the example shown in FIG. 15C as a bar with a timer near the top of GUI 200. This indicates that the agent computing device 104 is recording using a local microphone. As recording is initiated the GUI 200 can present a pop-up or modal window 1508 as illustrated in FIG. 15D. This pop-up can provide the agent with a script or prompt to direct the conversation. In some implementations, the pop-up 1508 includes one or more interactive GUI elements such as buttons, sliders, drop down menus, etc. In the illustrated example, the pop-up 1508 directs the agent to obtain permission to record the conversation, and includes a "No" and "yes" buttons 1510. These buttons 1510 can modify the behavior of the agent computing device 104. For example, if the client did not give permission, and the agent presses the "No" button 1510, the agent computing device 104 can stop recording. Further, if permission is granted, and the agent presses the "yes" button 1510, the pop-up 1508 can disappear and the GUI 200 can return to the contact screen. In some implementations, additional pop-ups can appear sequentially, directing the agent through the conversation and requesting inputs as necessary to assist the agent in gathering required information.

Figure 15E:
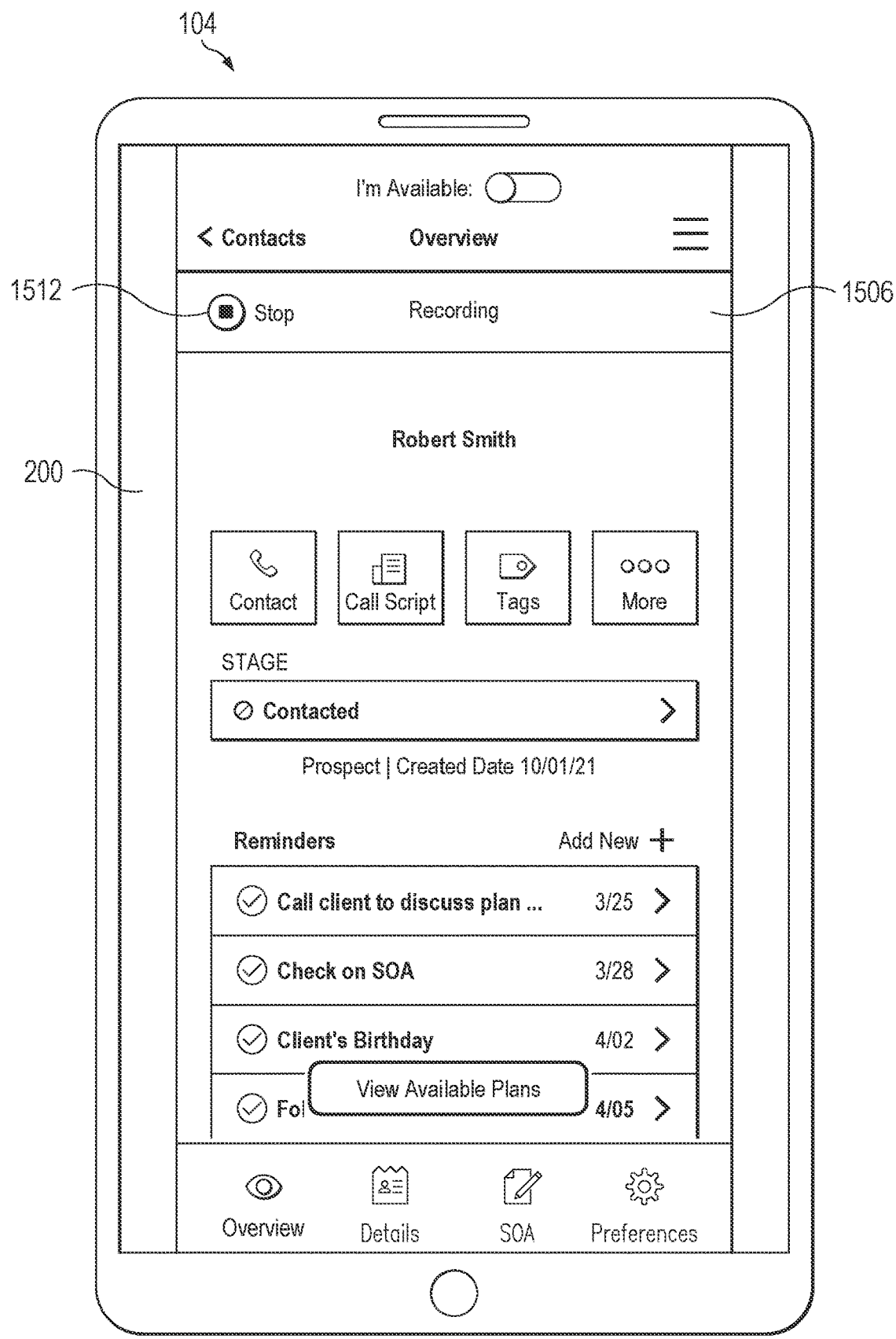
Figure 15F:
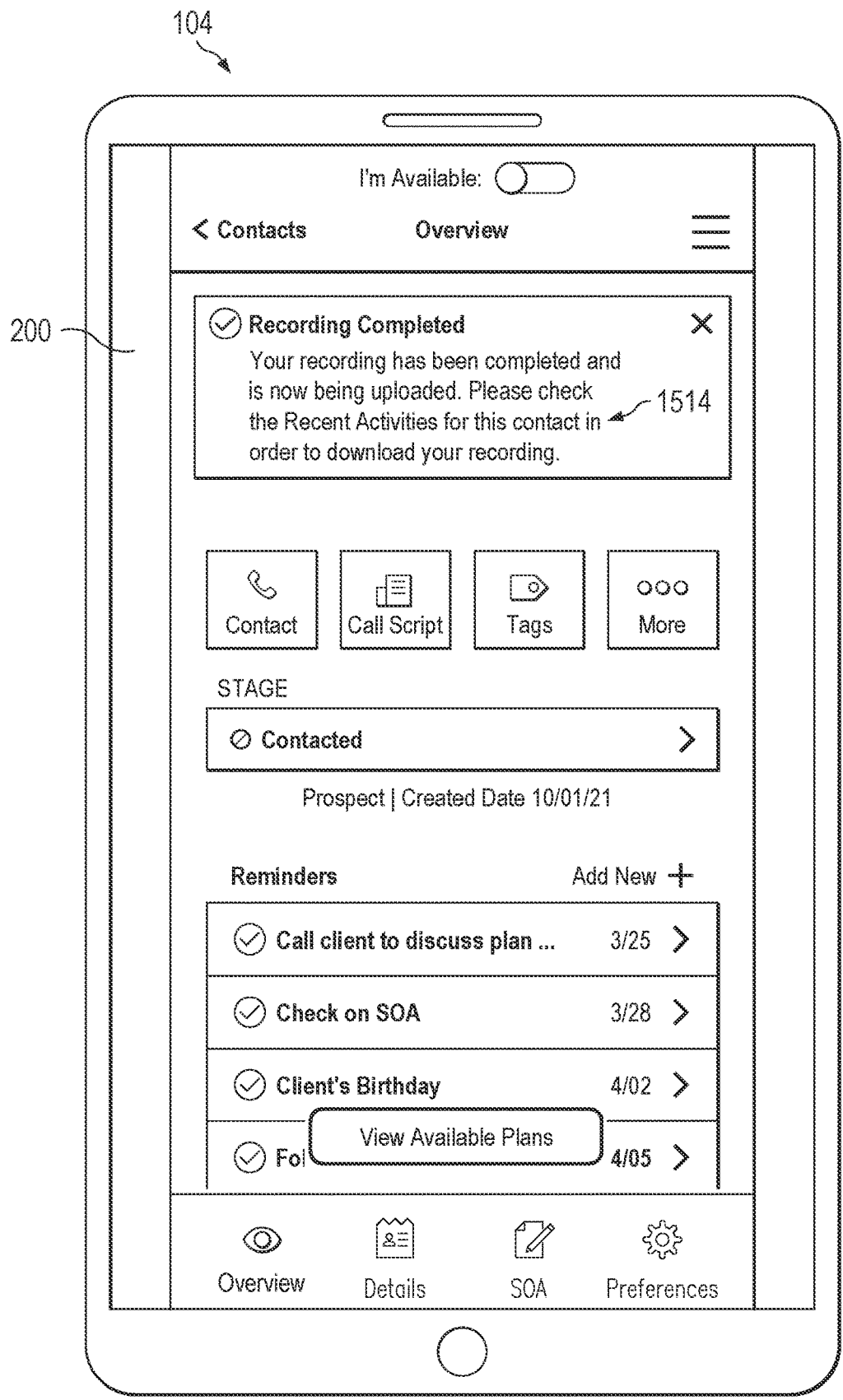

FIG. 15E illustrates a recording agent computing device 104 with the recording indicator 1506 and an interactive element within the recording indicator 1506. In the illustrated example a "stop" button 1512 is provided which ends the recording. Upon pressing the "stop" button 1512, a notification 1514 can be displayed indicating that the recording is stopped and identifying a location at which the recording is stored, as illustrated in FIG. 15F.

In general, the conversation is initially stored locally at the agent computing device 104. The agent computing device 104 can, upload the recorded conversation to a backend system such as insurtech provider 105, which maintains data repository 112 as discussed above with respect to FIG. 1A. Then, the recorded conversation can be archived according to the above-described implementations in FIGS. 1A-1B and 12, and optionally, made available for access on other/alternative agent computing devices 104 (e.g., the agent's laptop, or other different device than that used to record the conversation, etc.).

Figure 15G:
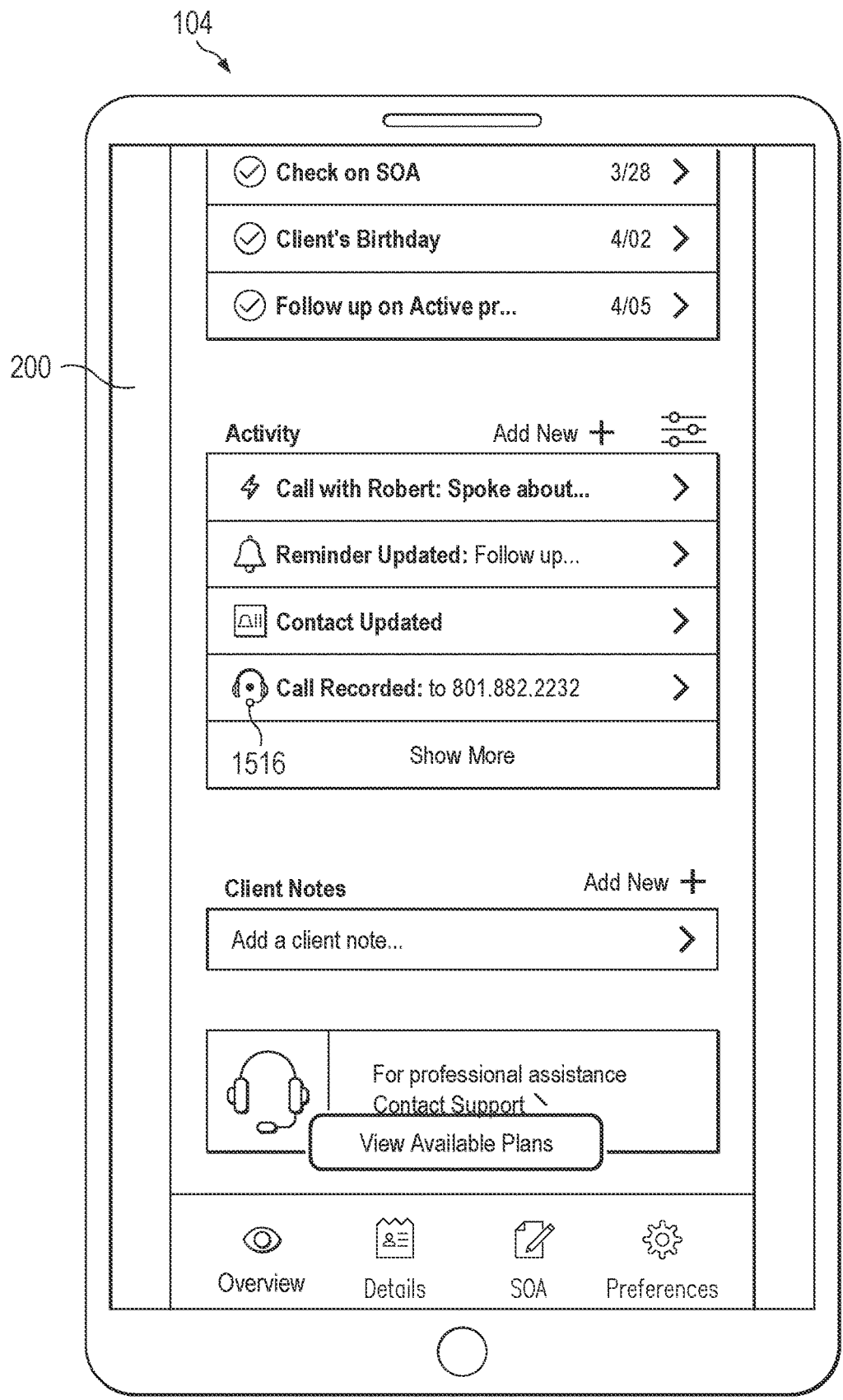
Figure 15H:
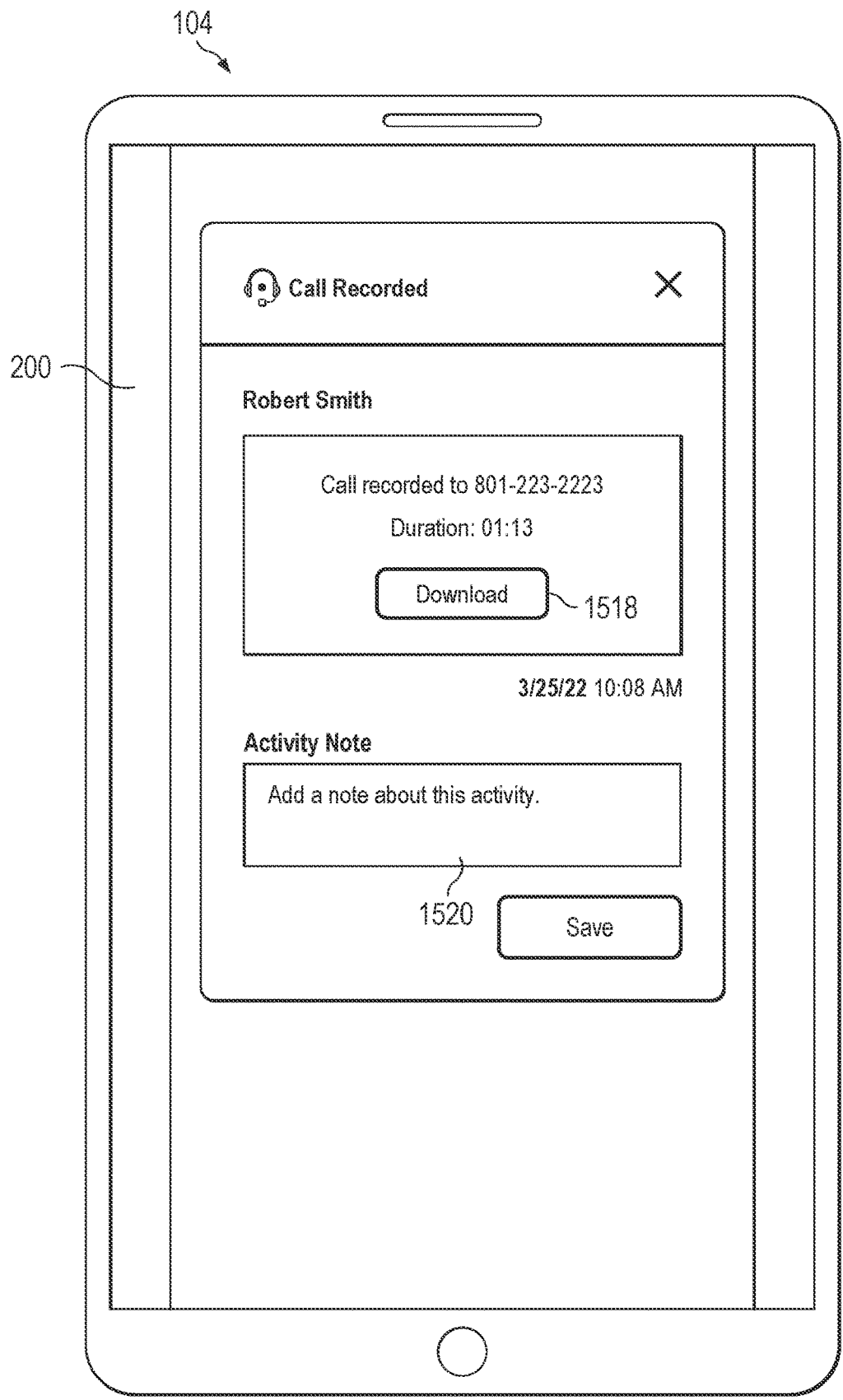

FIG. 15G illustrates an activity log in which the call recorded indicator 1516 is present. After recording an in-person (or telephonic) conversation, the agent can select this call recorded indicator 1516, and be directed to a page such as the one illustrated in FIG. 15G. FIG. 15H illustrates GUI 200 providing the agent with the option to download the conversation 1518, or add and save personal notes regarding the conversation in GUI element 1520.

Figure 16:
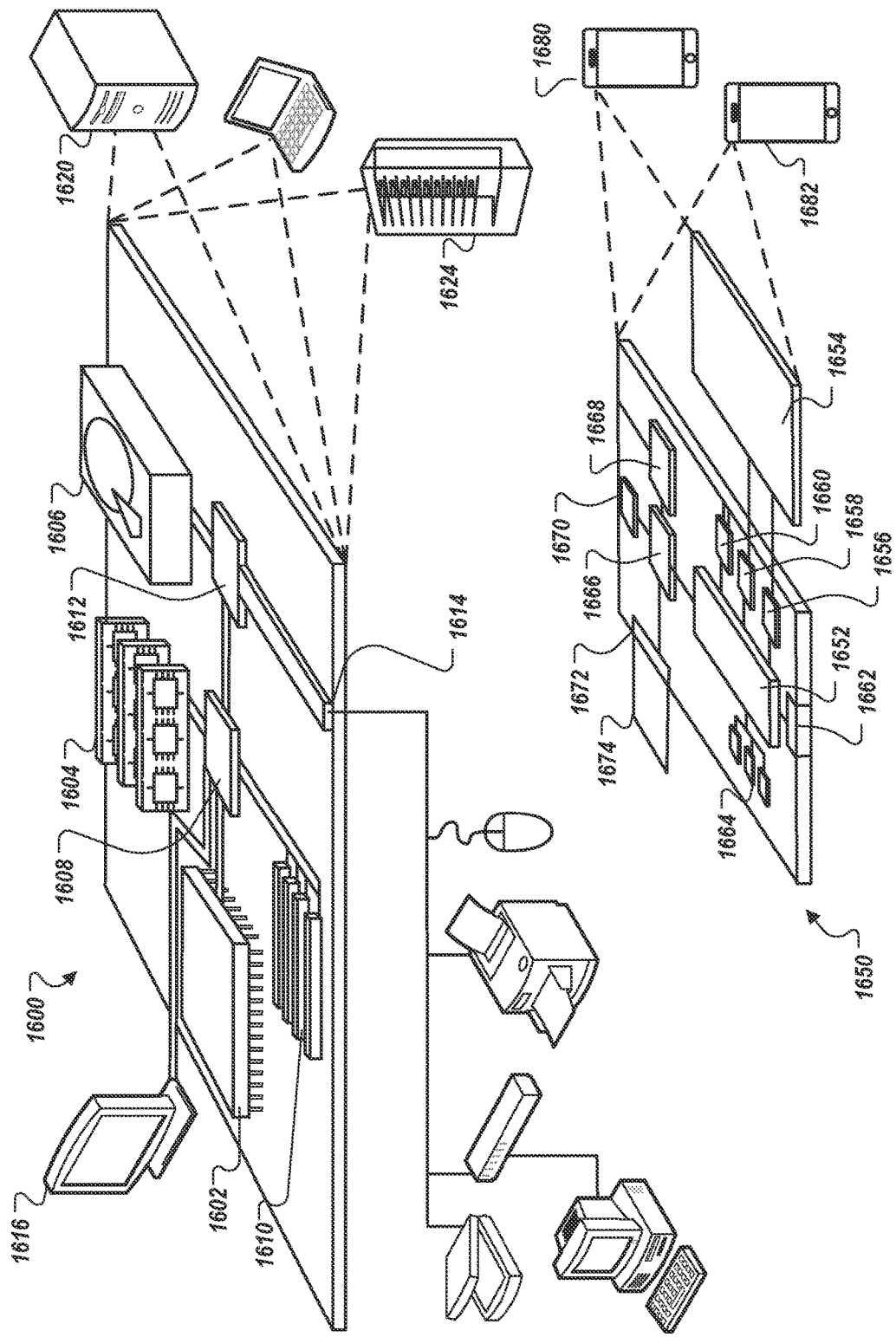
FIG. 16 is a schematic diagram that shows an example of a computing device and a mobile computing device.

FIG. 16 shows an example of a computing device 1600 and an example of a mobile computing device that can be used to implement the techniques described here. The computing device 1600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit embodiments of the inventions described and/or claimed in this document.

The computing device 1600 includes a processor 1602, a memory 1604, a storage device 1606, a high-speed interface 1608 connecting to the memory 1604 and multiple high-speed expansion ports 1610, and a low-speed interface 1612 connecting to a low-speed expansion port 1614 and the storage device 1606. Each of the processor 1602, the memory 1604, the storage device 1606, the high-speed interface 1608, the high-speed expansion ports 1610, and the low-speed interface 1612, are interconnected using various busses, and can be mounted on a common motherboard or in other manners as appropriate. The processor 1602 can process instructions for execution within the computing device 1600, including instructions stored in the memory 1604 or on the storage device 1606 to display graphical information for a GUI on an external input/output device, such as a display 1616 coupled to the high-speed interface 1608. In other embodiments, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1604 stores information within the computing device 1600. In some embodiments, the memory 1604 is a volatile memory unit or units. In some embodiments, the memory 1604 is a non-volatile memory unit or units. The memory 1604 can also be another form of computer-readable medium, such as a magnetic or optical disk.

The storage device 1606 is capable of providing mass storage for the computing device 1600. In some embodiments, the storage device 1606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1604, the storage device 1606, or memory on the processor 1602.

The high-speed interface 1608 manages bandwidth-intensive operations for the computing device 1600, while the low-speed interface 1612 manages lower bandwidth-intensive operations. Such allocation of functions is exemplary only. In some embodiments, the high-speed interface 1608 is coupled to the memory 1604, the display 1616 (e.g., through a graphics processor or accelerator), and to the high-speed expansion ports 1610, which can accept various expansion cards (not shown). In the embodiment, the low-speed interface 1612 is coupled to the storage device 1606 and the low-speed expansion port 1614. The low-speed expansion port 1614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1600 can be implemented in a number of different forms, as shown in the figure. For example, it can be implemented as a standard server 1620, or multiple times in a group of such servers. In addition, it can be implemented in a personal computer such as a laptop computer 1622. It can also be implemented as part of a rack server system 1624. Alternatively, components from the computing device 1600 can be combined with other components in a mobile device (not shown), such as a mobile computing device 1650. Each of such devices can contain one or more of the computing device 1600 and the mobile computing device 1650, and an entire system can be made up of multiple computing devices communicating with each other.

The mobile computing device 1650 includes a processor 1652, a memory 1664, an input/output device such as a display 1654, a communication interface 1666, and a transceiver 1668, among other components. The mobile computing device 1650 can also be provided with a storage device, such as a micro-drive or other device, to provide additional storage. Each of the processor 1652, the memory 1664, the display 1654, the communication interface 1666, and the transceiver 1668, are interconnected using various buses, and several of the components can be mounted on a common motherboard or in other manners as appropriate.

The processor 1652 can execute instructions within the mobile computing device 1650, including instructions stored in the memory 1664. The processor 1652 can be implemented as a chipset of chips that include separate and multiple analog and digital processors. The processor 1652 can provide, for example, for coordination of the other components of the mobile computing device 1650, such as control of user interfaces, applications run by the mobile computing device 1650, and wireless communication by the mobile computing device 1650.

The processor 1652 can communicate with a user through a control interface 1658 and a display interface 1656 coupled to the display 1654. The display 1654 can be, for example, a TFT (Thin-Film-Transistor Liquid Crystal Display) display or an OLED (Organic Light Emitting Diode) display, or other appropriate display technology. The display interface 1656 can comprise appropriate circuitry for driving the display 1654 to present graphical and other information to a user. The control interface 1658 can receive commands from a user and convert them for submission to the processor 1652. In addition, an external interface 1662 can provide communication with the processor 1652, so as to enable near area communication of the mobile computing device 1650 with other devices. The external interface 1662 can provide, for example, for wired communication in some embodiments, or for wireless communication in other embodiments, and multiple interfaces can also be used.

The memory 1664 stores information within the mobile computing device 1650. The memory 1664 can be implemented as one or more of a computer-readable medium or media, a volatile memory unit or units, or a non-volatile memory unit or units. An expansion memory 1674 can also be provided and connected to the mobile computing device 1650 through an expansion interface 1672, which can include, for example, a SIMM (Single In Line Memory Module) card interface. The expansion memory 1674 can provide extra storage space for the mobile computing device 1650, or can also store applications or other information for the mobile computing device 1650. Specifically, the expansion memory 1674 can include instructions to carry out or supplement the processes described above, and can include secure information also. Thus, for example, the expansion memory 1674 can be provide as a security module for the mobile computing device 1650, and can be programmed with instructions that permit secure use of the mobile computing device 1650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some embodiments, a computer program product is tangibly embodied in an information carrier. The computer program product contains instructions that, when executed, perform one or more methods, such as those described above. The computer program product can be a computer- or machine-readable medium, such as the memory 1664, the expansion memory 1674, or memory on the processor 1652. In some embodiments, the computer program product can be received in a propagated signal, for example, over the transceiver 1668 or the external interface 1662.

The mobile computing device 1650 can communicate wirelessly through the communication interface 1666, which can include digital signal processing circuitry where necessary. The communication interface 1666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1668 using a radio-frequency. In addition, short-range communication can occur, such as using a Bluetooth, WiFi, or other such transceiver (not shown). In addition, a GPS (Global Positioning System) receiver module 1670 can provide additional navigation- and location-related wireless data to the mobile computing device 1650, which can be used as appropriate by applications running on the mobile computing device 1650.

The mobile computing device 1650 can also communicate audibly using an audio codec 1660, which can receive spoken information from a user and convert it to usable digital information. The audio codec 1660 can likewise generate audible sound for a user, such as through a speaker, e.g., in a handset of the mobile computing device 1650. Such sound can include sound from voice telephone calls, can include recorded sound (e.g., voice messages, music files, etc.) and can also include sound generated by applications operating on the mobile computing device 1650.

The mobile computing device 1650 can be implemented in a number of different forms, as shown in the figure. For example, it can be implemented as a cellular telephone 1680. It can also be implemented as part of a smart-phone 1682, personal digital assistant, or other similar mobile device.

Various embodiments of the systems and techniques described here can be realized in digital electronic circuitry, integrated circuitry, specially designed ASICs (application specific integrated circuits), computer hardware, firmware, software, and/or combinations thereof. These various embodiments can include embodiment in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an embodiment of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific embodiment details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A computer-implemented method comprising:
transmitting, by a computing system to a first remote computing device associated with a potential customer, instructions that, when executed, cause the first remote computing device to display insurance plan information in a graphical user interface (GUI) of the first remote computing device, wherein the insurance plan information includes displayed options in the GUI (i) to enroll in an insurance plan, (ii) to view rates associated with the insurance plan, and (iii) to communicate with an insurance agent associated with a second remote computing device;
polling, by the computing system, the second remote computing device of the insurance agent for an activity status of the insurance agent; and
in response to a determination that the activity status of the insurance agent indicates that the insurance agent is online, transmitting by the computing system to the first remote computing device instructions that, when executed, cause the first remote computing device to dynamically update in the graphical user interface so that the displayed option (iii) changes from a non-selectable option to a user-selectable option.

2. The computer-implemented method of claim 1, further comprising:
transmitting, by the computing system to the first remote computing device, a notification with a personalized uniform resource locator (URL) associated with the insurance plan, wherein the notification is generated by the second remote computing device, wherein user-selection received at the first remote computing device of the personalized URL in the notification causes the insurance plan information to be presented in the GUI at the first remote computing device.

3. The computer-implemented method of claim 1, further comprising retrieving, by the computing system from an insurance provider computing system, the insurance plan information to be presented in the GUI at the first remote computing device.

4. The computer-implemented method of claim 1, further comprising, in response to a determination that the activity status of the insurance agent indicates that the insurance agent is offline, transmitting by the computing system to the first remote computing device instructions that, when executed, cause the first remote computing device to present the displayed option (iii) as a non-selectable option in the GUI at the first remote computing device.

5. The computer-implemented method of claim 1, further comprising:
receiving, by the computing system from the first remote computing device, user input indicating selection of the displayed option (i) to enroll in the insurance plan;
transmitting, by the computing system to an insurance provider system, enrollment information for the customer, wherein the enrollment information includes at least a customer-provided payment method for the insurance plan and a customer-signed insurance plan policy;
generating, by the computing system, a customer contact profile including information about the customer, the insurance plan, and the enrollment information; and
providing, by the computing system to the second remote computing device, the customer contact profile for presentation in a GUI at the second remote computing device.

6. The computer-implemented method of claim 5, further comprising assigning, by the computing system, the customer to the insurance agent as a client of the insurance agent.

7. The computer-implemented method of claim 1, wherein the user-selectable option is a button.

8. The computer-implemented method of claim 1, further comprising transmitting, by the computing system to the second remote computing device and in response to the determination that the activity status of the insurance agent indicates that the insurance agent is online, instructions that, when executed, cause the second remote computing device to output in the GUI of the second remote computing device the insurance plan information that is concurrently being presented in the GUI of the first remote computing device.

9. The computer-implemented method of claim 8, wherein the first and second remote computing devices are configured to present the same insurance plan information at a same time.

10. The computer-implemented method of claim 1, further comprising:
receiving, by the computing system from the second remote computing device, user-selection of an option to share the insurance plan information with the customer at the first remote computing device; and
in response to receiving the user-selection of the option to share the insurance plan information, transmitting, by the computing system to the first remote computing device, the instructions that, when executed, cause the first remote computing device to output in the GUI the insurance plan information.

11. The computer-implemented method of claim 10, wherein the instructions include a personalized URL that, when selected by the user at the first remote computing device, causes the first remote computing device to present the insurance plan information in the GUI.

12. The computer-implemented method of claim 11, wherein the instructions cause the first remote computing device to present the insurance plan information in a web browser launched at the first remote computing device.

13. A system comprising:
one or more computers; and
a computer-readable storage device coupled to the one or more computers and having instructions stored thereon which, when executed by the one or more computer, cause the one or more computers to perform operations comprising:
transmitting, by a computing system to a first remote computing device associated with a potential customer, instructions that, when executed, cause the first remote computing device to display insurance plan information in a graphical user interface (GUI) of the first remote computing device, wherein the insurance plan information includes displayed options in the GUI (i) to enroll in an insurance plan, (ii) to view rates associated with the insurance plan, and (iii) to communicate with an insurance agent associated with a second remote computing device;

polling, by the computing system, the second remote computing device of the insurance agent for an activity status of the insurance agent; and in response to a determination that the activity status of the insurance agent indicates that the insurance agent is online, transmitting by the computing system to the first remote computing device instructions that, when executed, cause the first remote computing device to dynamically update in the graphical user interface so that the displayed option (iii) changes from a non-selectable option to a user-selectable option.

14. The system of claim 13, the operations further comprising:

transmitting, by the computing system to the first remote computing device, a notification with a personalized uniform resource locator (URL) associated with the insurance plan, wherein the notification is generated by the second remote computing device, wherein user-selection received at the first remote computing device of the personalized URL in the notification causes the insurance plan information to be presented in the GUI at the first remote computing device.

15. The system of claim 13, the operations further comprising retrieving, by the computing system from an insurance provider computing system, the insurance plan information to be presented in the GUI at the first remote computing device.

16. The system of claim 13, the operations further comprising, in response to a determination that the activity status of the insurance agent indicates that the insurance agent is offline, transmitting by the computing system to the first remote computing device instructions that, when executed, cause the first remote computing device to present the displayed option (iii) as a non-selectable option in the GUI at the first remote computing device.

17. The system of claim 13, the operations further comprising:

receiving, by the computing system from the first remote computing device, user input indicating selection of the displayed option (i) to enroll in the insurance plan;

transmitting, by the computing system to an insurance provider system, enrollment information for the customer, wherein the enrollment information includes at least a customer-provided payment method for the insurance plan and a customer-signed insurance plan policy;

generating, by the computing system, a customer contact profile including information about the customer, the insurance plan, and the enrollment information; and providing, by the computing system to the second remote computing device, the customer contact profile for presentation in a GUI at the second remote computing device.

18. A non-transitory computer-readable storage medium coupled to one or more processors and having instructions stored thereon which, when executed by the one or more processors, cause the one or more processors to perform operations comprising:

transmitting, by a computing system to a first remote computing device associated with a potential customer, instructions that, when executed, cause the first remote computing device to display insurance plan information in a graphical user interface (GUI) of the first remote computing device, wherein the insurance plan information includes displayed options in the GUI (i) to enroll in an insurance plan, (ii) to view rates associated with the insurance plan, and (iii) to communicate with an insurance agent associated with a second remote computing device;

polling, by the computing system, the second remote computing device of the insurance agent for an activity status of the insurance agent; and in response to a determination that the activity status of the insurance agent indicates that the insurance agent is online, transmitting by the computing system to the first remote computing device instructions that, when executed, cause the first remote computing device to dynamically update in the graphical user interface so that the displayed option (iii) changes from a non-selectable option to a user-selectable option.

19. The computer-readable medium of claim 18, further comprising:

transmitting, by the computing system to the first remote computing device, a notification with a personalized uniform resource locator (URL) associated with the insurance plan, wherein the notification is generated by the second remote computing device, wherein user-selection received at the first remote computing device of the personalized URL in the notification causes the insurance plan information to be presented in the GUI at the first remote computing device.

20. The computer-readable medium of claim 18, further comprising retrieving, by the computing system from an insurance provider computing system, the insurance plan information to be presented in the GUI at the first remote computing device.

* * * * *